US012809456B2

(12) United States Patent
Salter et al.

(10) Patent No.: US 12,809,456 B2
(45) Date of Patent: Nov. 24, 2026

(54) METHOD AND DEVICE FOR VISUALIZING MULTI-MODAL INPUTS

(71) Applicant: Apple Inc., Cupertino, CA (US)

(72) Inventors: Thomas G. Salter, Foster City, CA (US); Brian W. Temple, Santa Clara, CA (US); Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 18/272,261

(22) PCT Filed: Jan. 11, 2022

(86) PCT No.: PCT/US2022/011922
§ 371 (c)(1),
(2) Date: Jul. 13, 2023

(87) PCT Pub. No.: WO2022/155113
PCT Pub. Date: Jul. 21, 2022

(65) Prior Publication Data

US 2024/0248532 A1 Jul. 25, 2024

Related U.S. Application Data

(60) Provisional application No. 63/286,188, filed on Dec. 6, 2021, provisional application No. 63/137,204, filed on Jan. 14, 2021.

(51) Int. Cl.
*G06F 3/01* (2006.01)
*G06T 19/00* (2011.01)
*G09G 3/00* (2006.01)

(52) U.S. Cl.
CPC .............. *G06F 3/013* (2013.01); *G06F 3/012* (2013.01); *G06T 19/006* (2013.01); *G09G 3/001* (2013.01);

(Continued)

(58) Field of Classification Search
CPC .......... G06F 3/013; G06F 3/012; G06F 3/017; G06T 19/006; G06T 2200/24; G09G 3/001; G09G 2354/00
See application file for complete search history.

(56) References Cited

U.S. PATENT DOCUMENTS 8,659,433 B2 2/2014 Petrou
8,781,162 B2 7/2014 Zhu et al.
(Continued)

FOREIGN PATENT DOCUMENTS

WO 2019204161 A1 10/2019

OTHER PUBLICATIONS

PCT International Search Report and Written Opinion dated Jun. 13, 2022, PCT International Application No. PCT/ US2022/011922, pp. 1-19.

*Primary Examiner* — Bryan Earles
(74) *Attorney, Agent, or Firm* — Fernando & Partners, LLP

(57) ABSTRACT

In one implementation, a method for visualizing multi-modal inputs includes: displaying a first user interface element within an extended reality (XR) environment; determining a gaze direction based on first input data; in response to determining that the gaze direction is directed to the first user interface element, displaying a focus indicator with a first appearance in association with the first user interface element; detecting a change in pose of at least one of a head pose or a body pose of a user of the computing system; and, in response to detecting the change of pose, modifying the focus indicator from the first appearance to a second appearance different from the first appearance.

25 Claims, 40 Drawing Sheets

(52) U.S. Cl.
CPC ...... *G06T 2200/24* (2013.01); *G09G 2354/00* (2013.01)

(56) References Cited

U.S. PATENT DOCUMENTS

| | | | | |
|---|---|---|---|---|
| 9,285,872 | B1 | 3/2016 | Raffle et al. | |
| 11,430,414 | B2 * | 8/2022 | Grieves | G09G 5/373 |
| 11,580,709 | B2 * | 2/2023 | Busto | G06F 3/016 |
| 2014/0372944 | A1 | 12/2014 | Mulcahy et al. | |
| 2015/0212576 | A1 * | 7/2015 | Ambrus | G06F 3/0482 345/156 |
| 2016/0026242 | A1 * | 1/2016 | Burns | G06F 3/04817 345/633 |
| 2017/0123491 | A1 | 5/2017 | Hansen et al. | |
| 2019/0188471 | A1 | 6/2019 | Osterhout et al. | |
| 2019/0235729 | A1 * | 8/2019 | Day | G06F 3/04812 |
| 2019/0377487 | A1 * | 12/2019 | Bailey | G06F 1/163 |
| 2023/0071037 | A1 * | 3/2023 | Kim | G06F 3/04886 |

* cited by examiner

METHOD AND DEVICE FOR VISUALIZING MULTI-MODAL INPUTS

TECHNICAL FIELD

The present disclosure generally relates to visualizing inputs and, in particular, to systems, methods, and methods for visualizing multi-modal inputs.

BACKGROUND

Various scenarios may involve selecting a user interface (UI) element by based on gaze direction and head motion (e.g., nodding). However, a user may not be aware that head motion controls the UI element.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
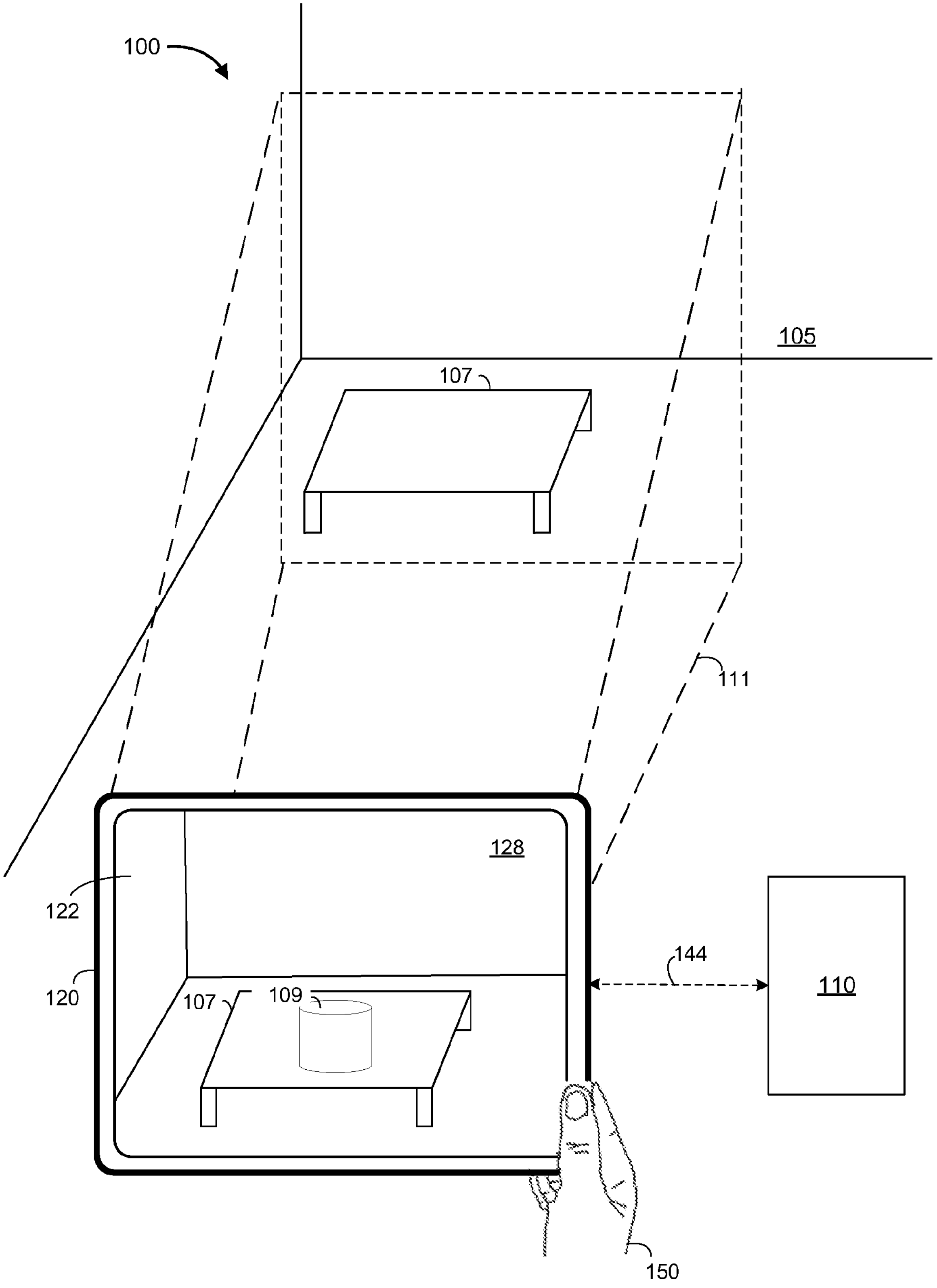
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for visualizing multi-modal inputs. According to some implementations, the method is performed at a computing system including non-transitory memory and one or more processors, wherein the computing system is communicatively coupled to a display device and one or more input devices. The method includes: displaying, via the display device, a first user interface element within an extended reality (XR) environment: determining a gaze direction based on first input data from the one or more input devices: in response to determining that the gaze direction is directed to the first user interface element, displaying, via the display device, a focus indicator with a first appearance in association with the first user interface element: detecting, via the one or more input devices, a change in pose of at least one of a head pose or a body pose of a user of the computing system: and in response to detecting the change of pose, modifying the focus indicator by changing the focus indicator from the first appearance to a second appearance different from the first appearance.

Various implementations disclosed herein include devices, systems, and methods for visualizing multi-modal inputs. According to some implementations, the method is performed at a computing system including non-transitory memory and one or more processors, wherein the computing system is communicatively coupled to a display device and one or more input devices. The method includes: presenting, via the display device, a user interface (UI) element within a UI: and obtaining a gaze vector based on first input data from the one or more input devices, wherein the gaze vector is associated with a gaze direction of a user. In accordance with a determination that the gaze vector satisfies an attention criterion associated with the UI element, the method also includes: obtaining a head vector based on second input data from the one or more input devices, wherein the head vector is associated with a head pose of the user: and presenting, via the display device, a head position indicator at a first location within the UI. The method further includes: after presenting the head position indicator at the first location, detecting, via the one or more input devices, a change to one or more values of the head vector: updating presentation of the head position indicator from the first location to a second location within the UI based on the change to the one or more values of the head vector: and in accordance with a determination that the second location for the head position indicator coincides with a selectable region of the UI element, performing an operation associated with the UI element.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs: the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an extended reality (XR) experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in their hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120) presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as their hands. In some implementations, the input data indicates joint positions and/or joint orientations of the user 150. In some implementations, the remote input devices include feedback devices such as speakers, lights, or the like.

Figure 2:
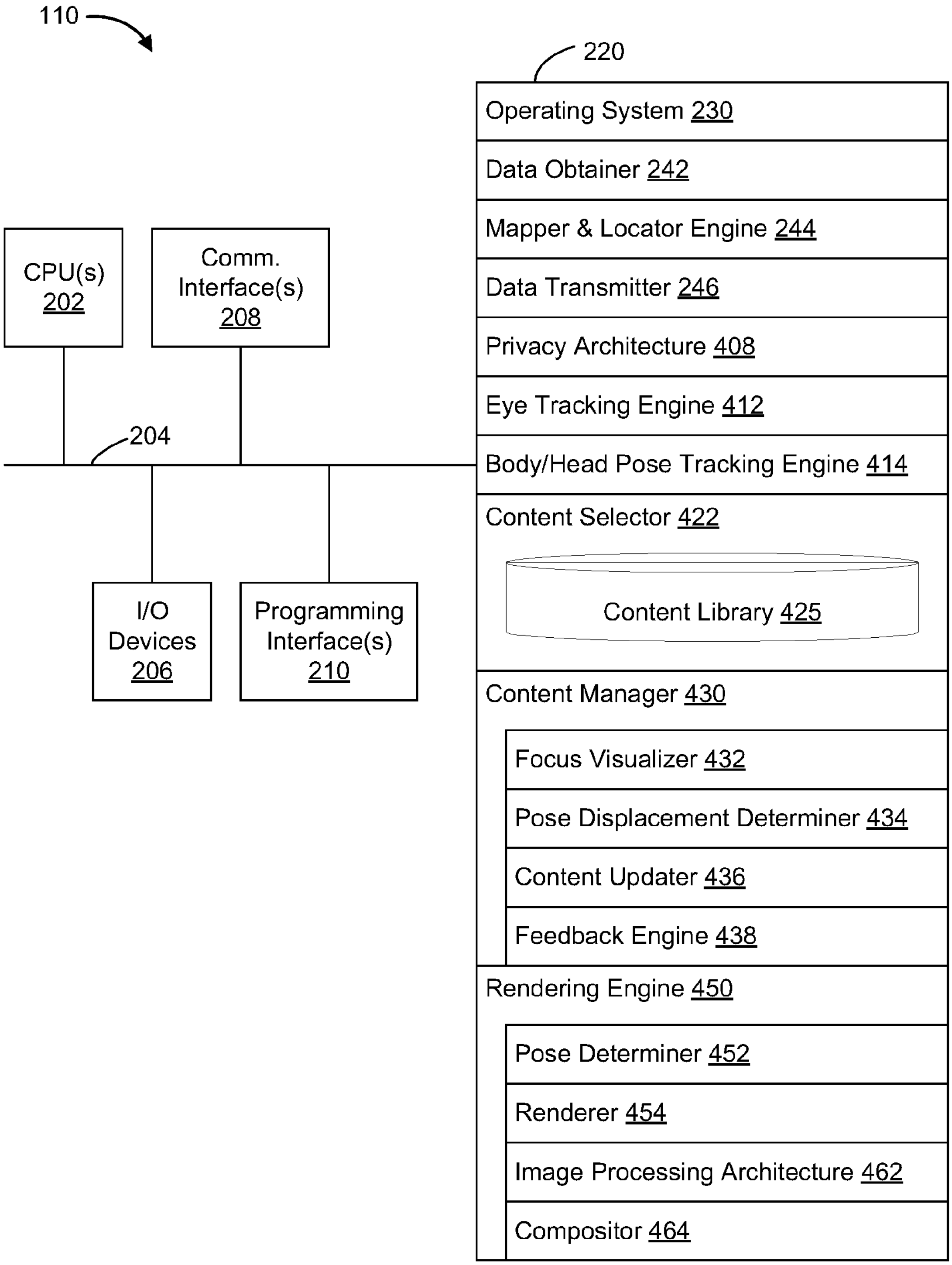
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest input data and filter user information and/or identifying information within the input data based on one or more privacy filters. The privacy architecture 408 is described in more detail below with reference to FIG. 4A. To that end, in various implementations, the privacy architecture 408 includes instructions and/or logic therefor, and heuristics and metadata therefor.

Figure 4A:
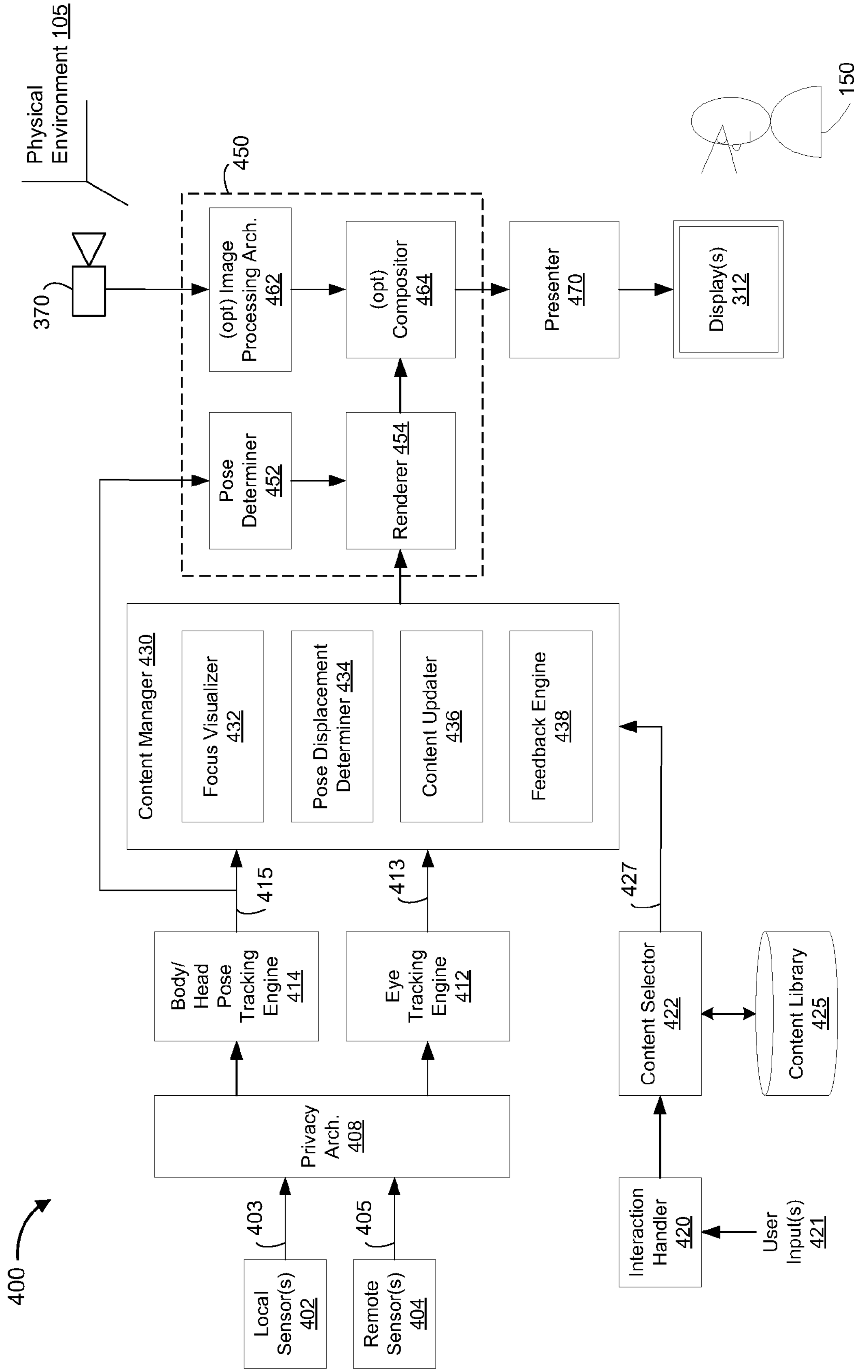
FIG. 4A is a block diagram of an example content delivery architecture in accordance with some implementations.
Figure 4B:
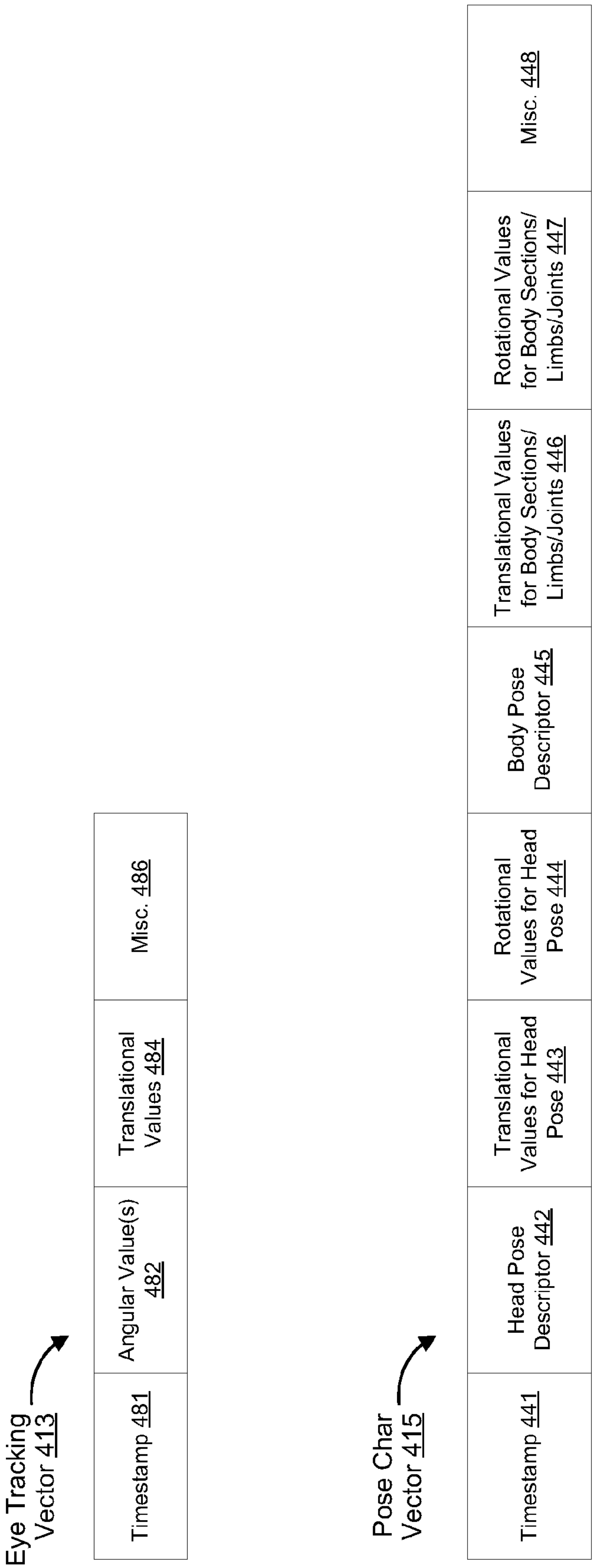
FIG. 4B illustrates an example data structure for a pose characterization vector in accordance with some implementations.

In some implementations, an eye tracking engine 412 is configured to obtain (e.g., receive, retrieve, or determine/generate) an eye tracking vector 413 (sometimes also referred to herein as a "gaze vector" or a "gaze direction") as shown in FIG. 4B (e.g., with a gaze direction) based on the input data and update the eye tracking vector 413 over time. For example, the eye tracking vector 413 (or gaze direction) indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

For example, the eye tracking vector 413 corresponds to or includes a UI element (or an identifier associated therewith) that has been selected, identified or targeted by the eye tracking engine 412 based on the gaze direction. As such, in some implementations, the eye tracking vector 413 indicates the target or focus of the eye tracking engine 412 such as a specific UI element, XR content portion, or the like. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head pose tracking engine 414 is configured to determine a pose characterization vector 415 based on the input data and update the pose characterization vector 415 over time. For example, as shown in FIG. 4B, the pose characterization vector 415 includes a head pose descriptor 442 (e.g., upward, downward, neutral, etc.), translational values for the head pose 443, rotational values for the head pose 444, a body pose descriptor 445 (e.g., standing, sitting, prone, etc.), translational values for body section/limbs/joints 446, rotational values for the body section/limbs/joints 447, and/or the like. The body/head pose tracking engine 414 is described in more detail below with reference to FIG. 4A. To that end, in various implementations, the body/head pose tracking engine 414 includes instructions and/or logic therefor, and heuristics and metadata therefor. In some implementations, the eye tracking engine 412 and the body/head pose tracking engine 414 may be located on the electronic device 120 in addition to or in place of the controller 110.

In some implementations, a content selector 422 is configured to select XR content (sometimes also referred to herein as "graphical content" or "virtual content") from a content library 425 based on one or more user requests and/or inputs (e.g., a voice command, a selection from a user interface (UI) menu of XR content items, and/or the like). The content selector 422 is described in more detail below with reference to FIG. 4A. To that end, in various implementations, the content selector 422 includes instructions and/or logic therefor, and heuristics and metadata therefor.

In some implementations, the content library 425 includes a plurality of content items such as audio/visual (A/V) content and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

In some implementations, a content manager 430 is configured to manage and update the layout, setup, structure, and/or the like for the XR environment 128 including one or more of XR content, one or more user interface (UI) elements associated with the XR content, and a focus indicator in association with one of the one or more UI elements. The content manager 430 is described in more detail below with reference to FIG. 4A. To that end, in various implementations, the content manager 430 includes instructions and/or logic therefor, and heuristics and metadata therefor. In some implementations, the content manager 430 includes a focus visualizer 432, a pose displacement determiner 434, a content updater 436, and a feedback engine 438.

In some implementations, a focus visualizer 432 is configured to generate a focus indicator in association with a respective UI element when the gaze direction (e.g., the eye tracking vector 413 in FIG. 4B) is directed to the respective UI element. Various examples of the focus indicator are described below with reference to the sequences of instances in FIGS. 5A-5E, 6A-6D, and 7A-7E.

In some implementations, the focus visualizer 432 is configured to generate a head position indicator based on a head vector associated with the pose characterization vector 415 (e.g., a ray emanating from a predefined portion of the head of the user such as their chin, nose, center of forehead, centroid of face, center point between eyes, etc.) when the gaze direction (e.g., the eye tracking vector 413 in FIG. 4B also referred to herein as a "gaze vector") satisfies a threshold time period relative to a UI element. Various examples of the head position indicators are described below with reference to FIGS. 10D, 10E, 10I, 10J, and 10N-10P. To that end, in various implementations, the focus visualizer 432 includes instructions and/or logic therefor, and heuristics and metadata therefor.

In some implementations, a pose displacement determiner 434 is configured to detect a change in pose of at least one of a head pose or a body pose of the user 150 and determine an associated displacement value or difference between pose characterization vectors 415 over time. In some implementations, the pose displacement determiner 434 is configured to determine that the displacement value satisfies a threshold displacement metric and, in response, cause an operation associated with the respective UI element to be performed. To that end, in various implementations, the pose displacement determiner 434 includes instructions and/or logic therefor, and heuristics and metadata therefor.

In some implementations, in response to the change in pose of at least one of a head pose or a body pose of the user 150, the content updater 436 is configured to modify an appearance of the focus indicator from a first appearance to a second appearance such as to indicate a magnitude of the change in the pose of at least one of the head pose or the body pose of the user 150. Various examples of changes to the appearance of the focus indicator are described below with reference to the sequences of instances in FIGS. 5A-5E, 6A-6D, and 7A-7E.

In some implementations, in response to the change in pose of at least one of a head pose or a body pose of the user 150, the content updater 436 is configured to modify a location of the head position indicator from a first location to a second location. Various examples of changes to the head position indicator are described below with reference to FIGS. 10D, 10E, 10I, 10J, and 10N-10P. To that end, in various implementations, the content updater 436 includes instructions and/or logic therefor, and heuristics and metadata therefor.

In some implementations, a feedback engine 438 is configured to generate sensory feedback (e.g., visual feedback such as text or lighting changes, audio feedback, haptic feedback, etc.) when the focus indicator is displayed, when the appearance of the focus indicator changes, when the focus indicator is removed, and/or the like. Various examples of sensory feedback are described below with reference to the sequences of instances in FIGS. 5A-5E, 6A-6D, 7A-7E, and 10A-10Q. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the XR content, one or more UI elements associated with the XR content, and/or a focus indicator in association with one of the one or more UI elements. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configuration but may be removed for fully VR or optical see-through configurations.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the eye tracking engine 412, the body/head pose tracking engine 414, the content selector 422, the content manager 430, and the rendering engine 450 are shown as residing on a single device (e.g., the controller 110), it should be understood that in other implementations, any combination of the data obtainer 242, the mapper and locator engine 244, the data transmitter 246, the privacy architecture 408, the eye tracking engine 412, the body/head pose tracking engine 414, the content selector 422, the content manager 430, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
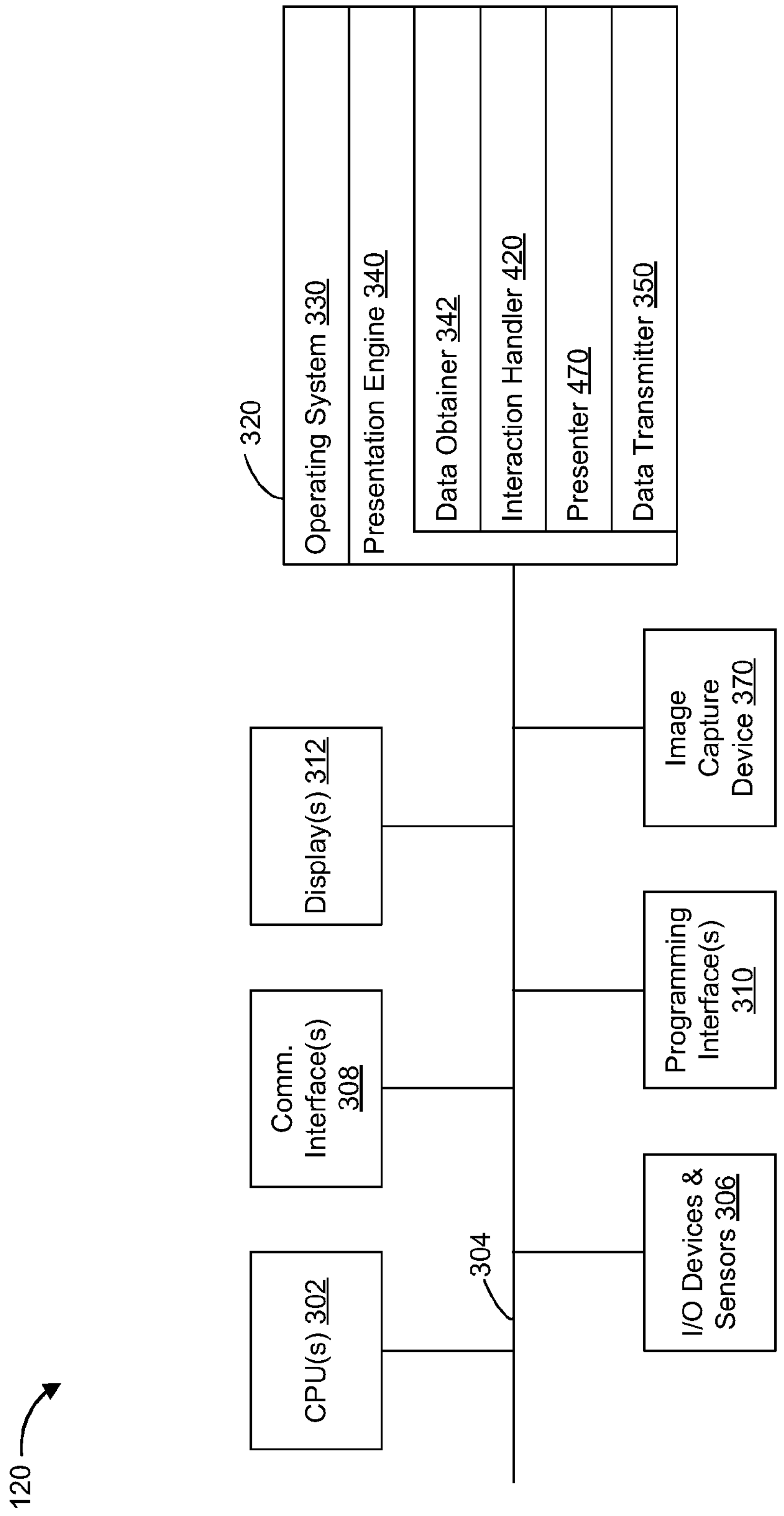
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370) (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370) includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 520, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions with the presented A/V content and/or XR content (e.g., gestural inputs detected via hand tracking, eye gaze inputs detected via eye tracking, voice commands, etc.). To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the XR content, one or more UI elements associated with the XR content, and a focus indicator in association with one of the one or more UI elements) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350) may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of an example content delivery architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 400 is included in a computing system such as the controller 110 shown in FIGS. 1 and 2: the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits content delivery architecture 400 or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400 from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the eye tracking engine 412 obtains the local sensor data 403 and the remote sensor data 405 after having been subjected to the privacy architecture 408. In some implementations, the eye tracking engine 412 obtains (e.g., receives, retrieves, or determines/generates) an eye tracking vector 413 (sometimes also referred to herein as a "gaze vector" or a "gaze direction") based on the input data and updates the eye tracking vector 413 over time. For example, the eye tracking vector 413 corresponds to or includes a UI element (or an identifier associated therewith) that has been selected, identified or targeted by the eye tracking engine 412 based on the gaze direction. As such, in some implementations, the eye tracking vector 413 indicates the target or focus of the eye tracking engine 412 such as a specific UI element, XR content portion, or the like.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., instantaneous and/or rate of change of roll, pitch, and yaw values), one or more translational values 484 for the current gaze direction (e.g., instantaneous and/or rate of change of x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the body/head pose tracking engine 414 obtains the local sensor data 403 and the remote sensor data 405 after it has been subjected to the privacy architecture 408. In some implementations, the body/head pose tracking engine 414 determines a pose characterization vector 415 based on the input data and updates the pose characterization vector 415 over time. FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 441 (e.g., the most recent time the pose characterization vector 415 was updated), a head pose descriptor 442 (e.g., upward, downward, neutral, etc.), translational values for the head pose 443, rotational values for the head pose 444, a body pose descriptor 445 (e.g., standing, sitting, prone, etc.), translational values for body section/limbs/joints 446, rotational values for the body section/limbs/joints 447, and/or miscellaneous information 448. One of ordinary skill in the art will appreciate that the data structure for the pose characterization vector 415 in FIG. 4B is merely an example that may include different information portions in various other implementations and be structured in myriad ways in various other implementations.

According to some implementations, the interaction handler 420 obtains (e.g., receives, retrieves, or detects) one or more user inputs 421 provided by the user 150 that are associated with selecting A/V content and/or XR content for presentation. For example, the one or more user inputs 421 correspond to a gestural input selecting XR content from a UI menu detected via hand tracking, an eye gaze input selecting XR content from the UI menu detected via eye tracking, a voice command selecting XR content from the UI menu detected via a microphone, and/or the like. In some implementations, the content selector 422 selects XR content 427 from the content library 425 based on one or more user inputs 421 (e.g., a voice command, a selection from a menu of XR content items, and/or the like).

In various implementations, the content manager 430 manages and updates the layout, setup, structure, and/or the like for the XR environment 128 including one or more of XR content, one or more user interface (UI) elements associated with the XR content, and a focus indicator in association with one of the one or more UI elements. To that end, the content manager 430 includes the focus visualizer 432, the pose displacement determiner 434, the content updater 436, and the feedback engine 438.

In some implementations, the focus visualizer 432 generates a focus indicator in association with a respective UI element when the eye tracking vector 413 is directed to the respective UI element for at least a threshold time period (e.g., a dwell threshold time). Various examples of the focus indicator are described below with reference to the sequences of instances in FIGS. 5A-5E, 6A-6D, and 7A-7E.

In some implementations, the pose displacement determiner 434 detects a change in pose of at least one of a head pose or a body pose of the user 150 and determines an associated displacement value or difference between pose characterization vectors 415 over time. In some implementations, the pose displacement determiner 434 determines that the displacement value satisfies a threshold displacement metric and, in response, causes an operation associated with the respective UI element to be performed.

In some implementations, in response to the change in pose of at least one of a head pose or a body pose of the user 150, the content updater 436 modifies an appearance of the focus indicator from a first appearance to a second appearance to indicate a magnitude of the change in pose. Various examples of changes to the appearance of the focus indicator are described below with reference to the sequences of instances in FIGS. 5A-5E, 6A-6D, and 7A-7E.

In some implementations, the feedback engine 438 generates sensory feedback (e.g., visual feedback such as text or lighting changes, audio feedback, haptic feedback, etc.) when the focus indicator is displayed, when the appearance of the focus indicator changes, when the focus indicator is removed, and/or the like.

According to some implementations, the pose determiner 452 determines a current camera pose of the electronic device 120 and/or the user 150 relative to the XR environment 128 and/or the physical environment 105. In some implementations, the renderer 454 renders the XR content 427, one or more UI elements associated with the XR content, and a focus indicator in association with one of the one or more UI elements according to the current camera pose relative thereto.

According to some implementations, the optional image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the optional compositor 464 composites the rendered XR content with the processed image stream of the physical environment 105 from the image processing architecture 562 to produce rendered image frames of the XR environment 128. In various implementations, the presenter 470 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

FIGS. 5A-5E illustrate a sequence of instances 510, 520, 530, 540, and 550 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 510, 520, 530, 540, and 550 are rendered and presented by a computing system such as the controller 110 shown in FIGS. 1 and 2: the electronic device 120 shown in FIGS. 1 and 3: and/or a suitable combination thereof.

As shown in FIGS. 5A-5E, the content delivery scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in their hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

Figure 5A:
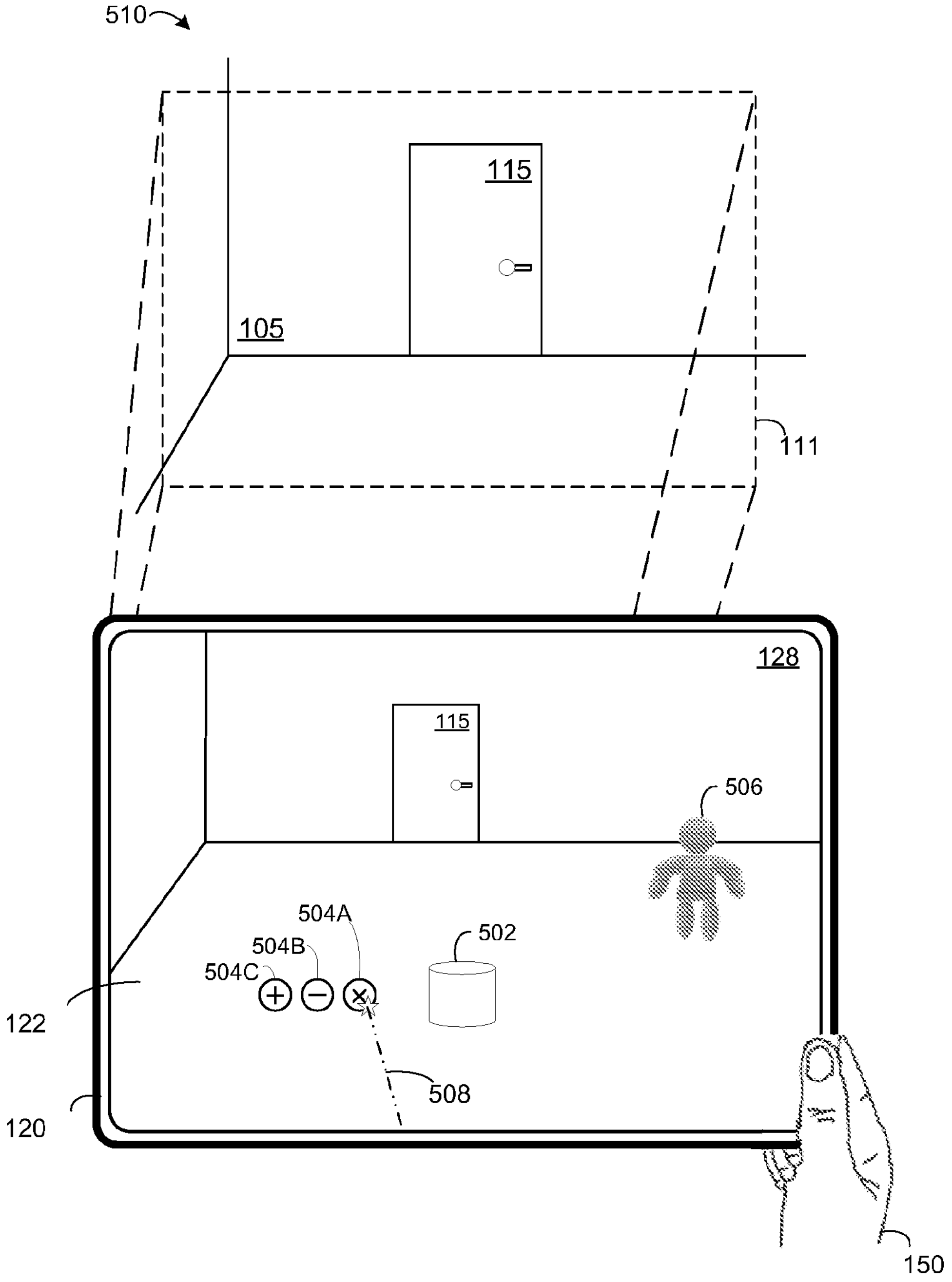
FIGS. 5A-5E illustrate a sequence of instances for a content delivery scenario in accordance with some implementations.

As shown in FIG. 5A, during the instance 510 (e.g., associated with time $T_1$) of the content delivery scenario, the electronic device 120 presents an XR environment 128 including XR content 502 (e.g., a 3D cylinder) and a virtual agent 506. As shown in FIG. 5A, the XR environment 128 includes a plurality of UI elements 504A, 504B, and 504C, which, when selected, cause an operation or action within the XR environment 128 to be performed such as removing the XR content 502, manipulating the XR content 502, modifying the XR content 502, displaying a set of options, displaying a menu of other XR content that may be instantiated into the XR environment 128, and/or the like. For example, the operations or actions associated with the plurality of UI elements 504A, 504B, and 504C may include one of: translating the XR content 502 within the XR environment 128, rotating the XR content 502 within the XR environment 128, modifying the configuration or components of the XR content 502, modifying a shape or size of the XR content 502, modifying an appearance of the XR content 502 (e.g., a texture, color, brightness, contrast, shadows, etc.), modifying lighting associated with the XR environment 128, modifying environmental conditions associated with the XR environment 128, and/or the like.

As shown in FIG. 5A, the XR environment 128 also includes a visualization 508 of the gaze direction of the user 150 relative to the XR environment 128. One of ordinary skill in the art will appreciate that the visualization 508 may be removed in various implementations or replaced with other forms or configurations in various other implementations. As shown in FIG. 5A, during the instance 510, the visualization 508 of the gaze direction of the user 150 is directed to the UI element 504A.

Figure 5B:
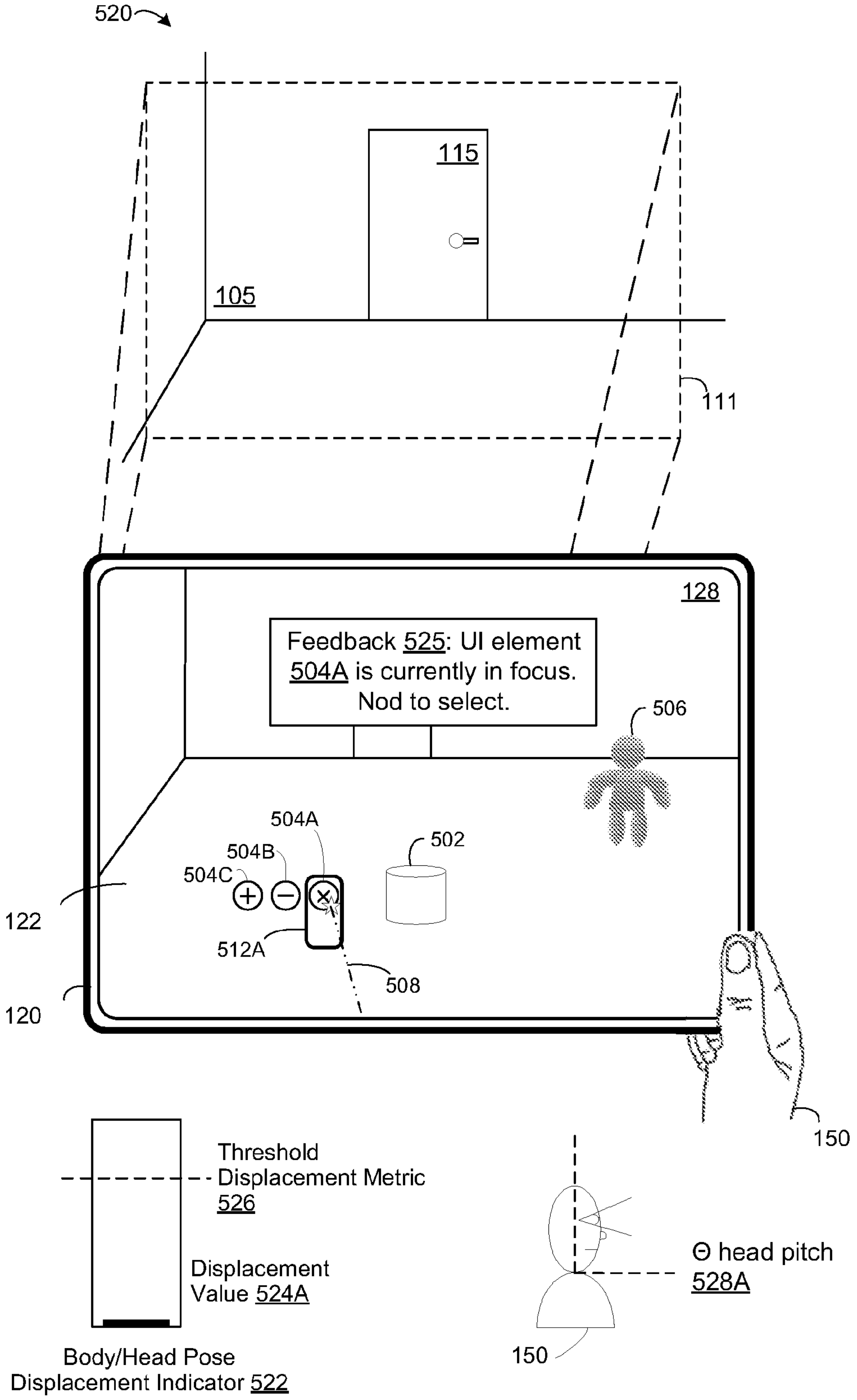

In response to detecting that the gaze direction of the user 150 has been directed to the UI element 504A for at least a threshold amount of time (e.g., X seconds), the electronic device 120 presents a focus indicator 512A with a first appearance in association with the UI element 504A. As shown in FIG. 5B, during the instance 520 (e.g., associated with time $T_2$) of the content delivery scenario, the electronic device 120 presents the XR environment 128 with the focus indicator 512A (e.g., a slide bar) with the first appearance (e.g., a first (top) position relative to the UI element 504A) surrounding the UI element 504A. As shown in FIG. 5B, the XR environment 128 may optionally include textual feedback 525 indicating that: "The UI element 504A is currently in focus. Nod to select."

FIG. 5B illustrates a body/head pose displacement indicator 522 with a displacement value 524A for the instance 520, which corresponds to a difference between a current head pitch value 528A and an origin head pitch value (e.g., 90 degrees for a neutral head pose). In this example, the displacement value 524A is near zero because the current head pitch value 528A is near 90 degrees. As shown in FIG. 5B, a threshold displacement metric 526, which, when exceeded or breached, causes performance of an operation associated with the UI element that is in focus (e.g., the UI element 504A in FIG. 5B). As shown in FIG. 5B, the displacement value 524A is below the threshold displacement metric 526.

Figure 5C:
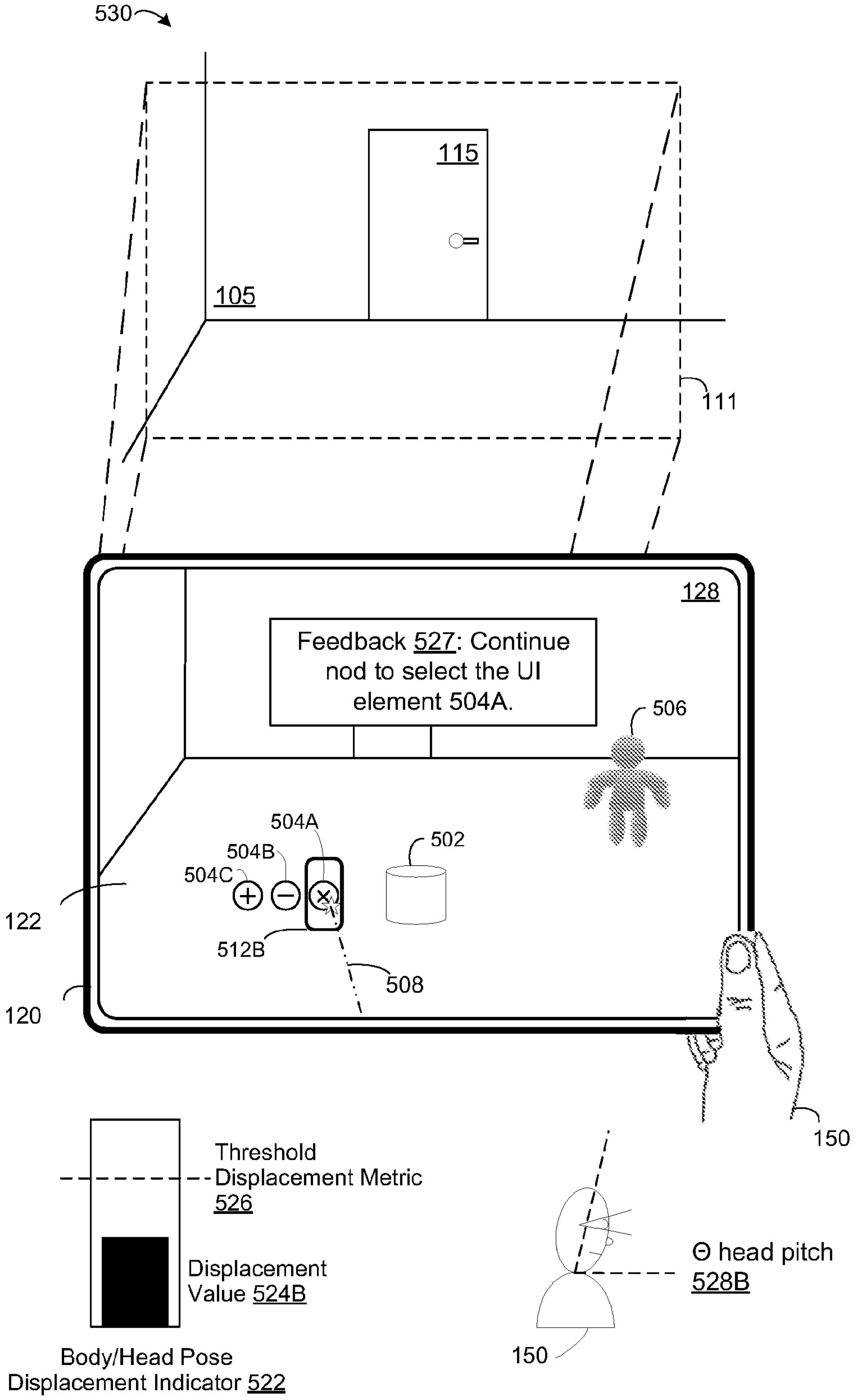

In response to detecting a change in a head pose of the user 150 while the gaze direction is still directed at the UI element 504A, the electronic device 120 modifies the focus indicator to indicate a magnitude of the change in the head pose of the user 150 by changing the focus indicator from the first appearance to a second appearance. As shown in FIG. 5C, during the instance 530 (e.g., associated with time $T_3$) of the content delivery scenario, the electronic device 120 presents the XR environment 128 with the focus indicator 512B (e.g., the slide bar) with the second appearance (e.g., a second (middle) position relative to the UI element 504A) surrounding the UI element 504A. As shown in FIG. 5C, the XR environment 128 may optionally include textual feedback 527 indicating that: "Continue to nod to select the UI element 504A."

FIG. 5C illustrates the body/head pose displacement indicator 522 with a displacement value 524B for the instance 530, which corresponds to a difference between a current head pitch value 528B (e.g., approximately 60 degrees) and the origin head pitch value (e.g., 90 degrees for the neutral head pose). In this example, the displacement value 524B in FIG. 5C is greater than the displacement value 524A in FIG. 5B, but the displacement value 524B is below the threshold displacement metric 526.

Figure 5D:
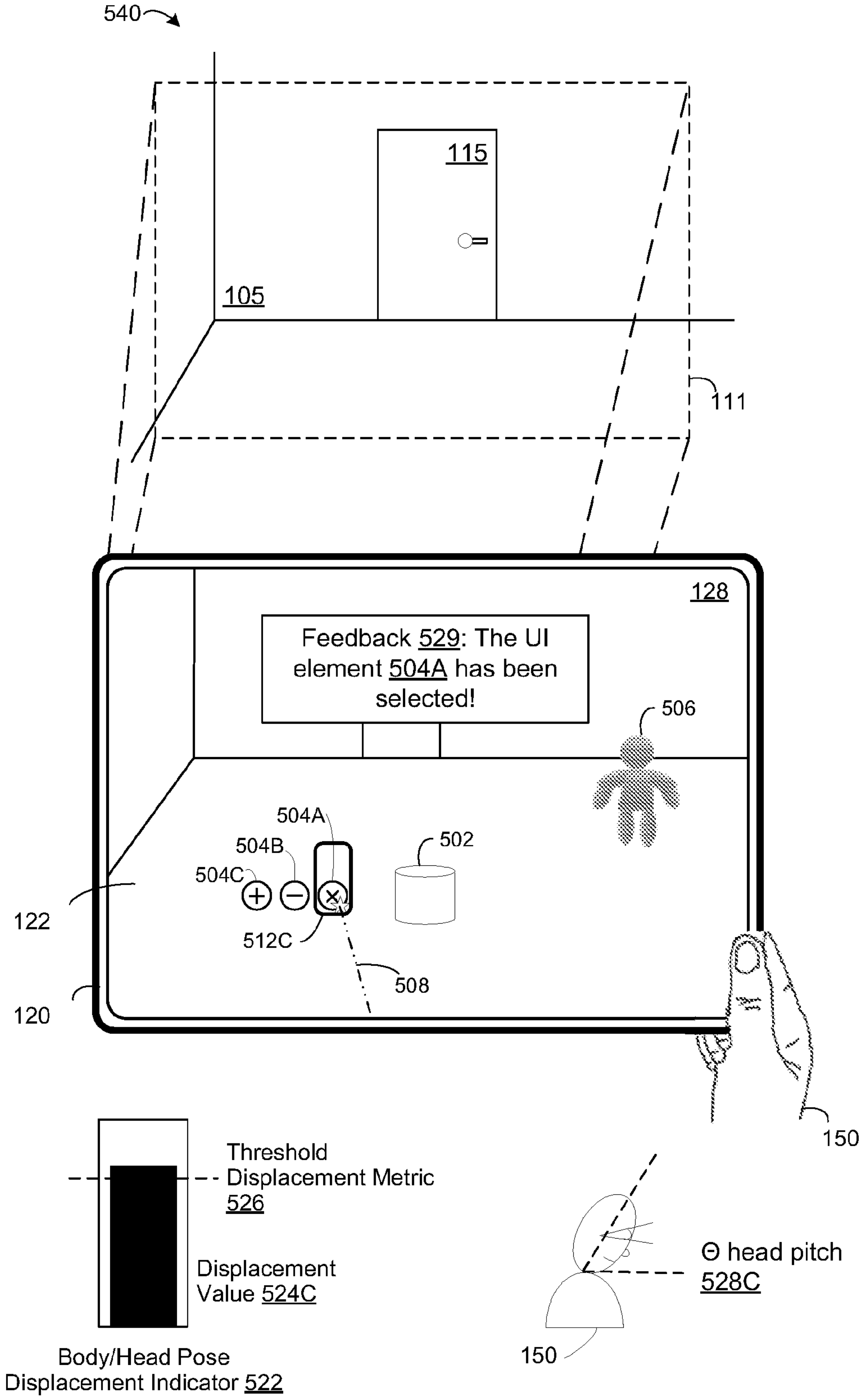

In response to detecting a further change in the head pose of the user 150 while the gaze direction is still directed at the UI element 504A, the electronic device 120 modifies the focus indicator to indicate the magnitude of the change in the head pose of the user 150 by changing the focus indicator from the second appearance to a third appearance. As shown in FIG. 5D, during the instance 540 (e.g., associated with time $T_4$) of the content delivery scenario, the electronic device 120 presents the XR environment 128 with the focus indicator 512C (e.g., the slide bar) with the third appearance (e.g., a third (bottom) position relative to the UI element 504A) surrounding the UI element 504A. As shown in FIG. 5D, the XR environment 128 may optionally include textual feedback 529 indicating that: "The UI element 504A has been selected!"

FIG. 5D illustrates the body/head pose displacement indicator 522 with a displacement value 524C for the instance 540, which corresponds to a difference between a current head pitch value 528C (e.g., approximately 45 degrees) and the origin head pitch value (e.g., 90 degrees for the neutral head pose). In this example, the displacement value 524C in FIG. 5D is greater than the displacement value 524B in FIG. 5C, and the displacement value 524C exceeds the threshold displacement metric 526.

Figure 5E:
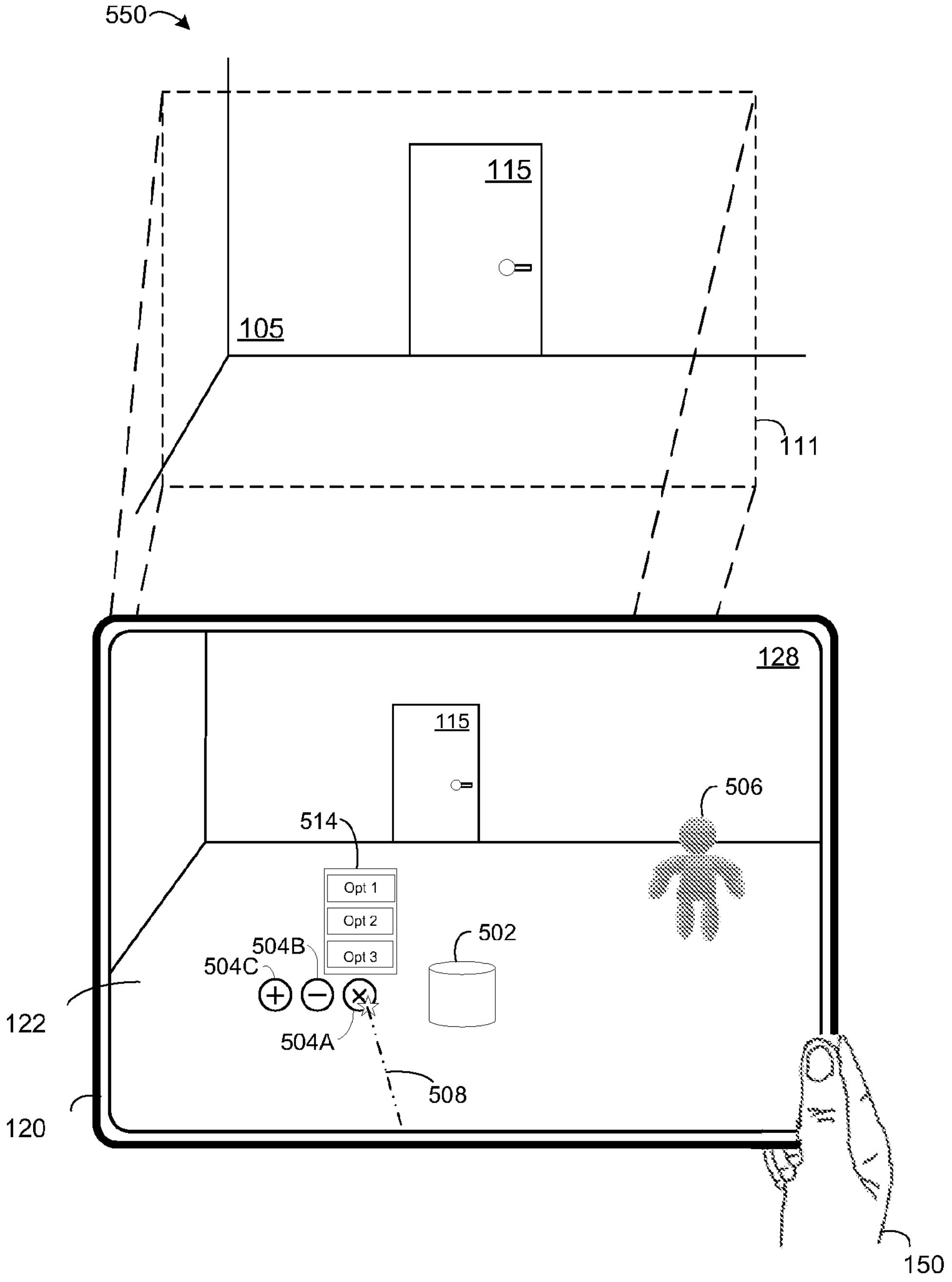

In response to determining that the displacement value 524C exceeds the threshold displacement metric 526, the electronic device 120 activates the UI element 504A or, in other words, performs an operation associated with the UI element 504A. As shown in FIG. 5E, during the instance 550 (e.g., associated with time $T_5$) of the content delivery scenario, the electronic device 120 presents the XR environment 128 including a set of options 514 associated with the UI element 504A.

FIGS. 6A-6D illustrate a sequence of instances 610, 620, 630, and 640 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610, 620, 630, and 640 are rendered and presented by a computing system such as the controller 110 shown in FIGS. 1 and 2; the electronic device 120 shown in FIGS. 1 and 3: and/or a suitable combination thereof. FIGS. 6A-6D are similar to and adapted from FIGS. 5A-5E. As such, similar references numbers are used in FIGS. 5A-5E and FIGS. 6A-6D. Furthermore, only the differences between FIGS. 5A-5E and FIGS. 6A-6D are described for the sake of brevity.

Figure 6A:
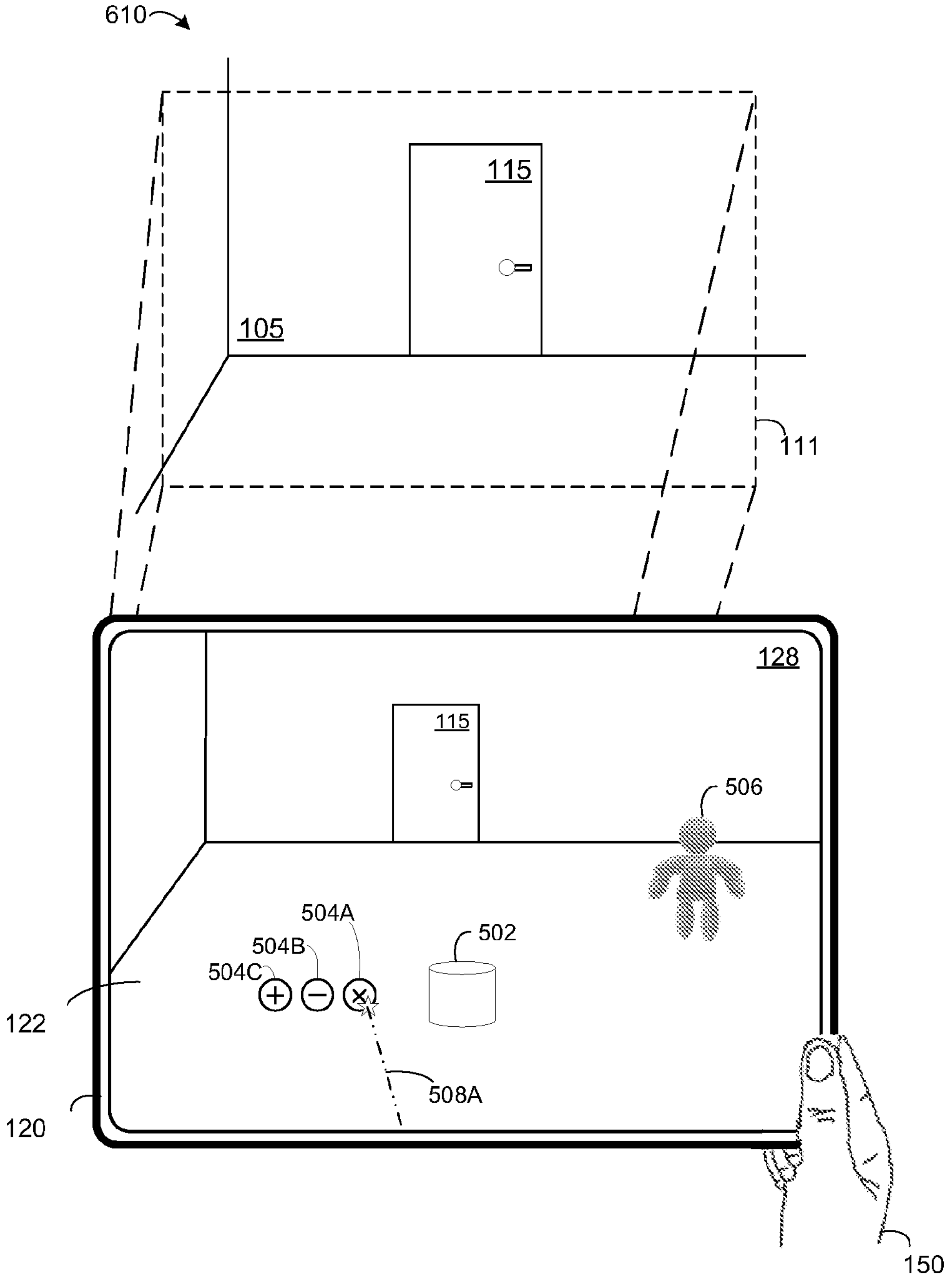
FIGS. 6A-6D illustrate another sequence of instances for a content delivery scenario in accordance with some implementations.

As shown in FIG. 6A, during the instance 610 (e.g., associated with time T1) of the content delivery scenario, the electronic device 120 presents an XR environment 128 including: the virtual agent 506, the XR content 502 (e.g., a 3D cylinder), and the plurality of UI elements 504A, 504B, and 504C. As shown in FIG. 6A, the XR environment 128 also includes a visualization 508A of a first gaze direction of the user 150 relative to the XR environment 128.

Figure 6B:
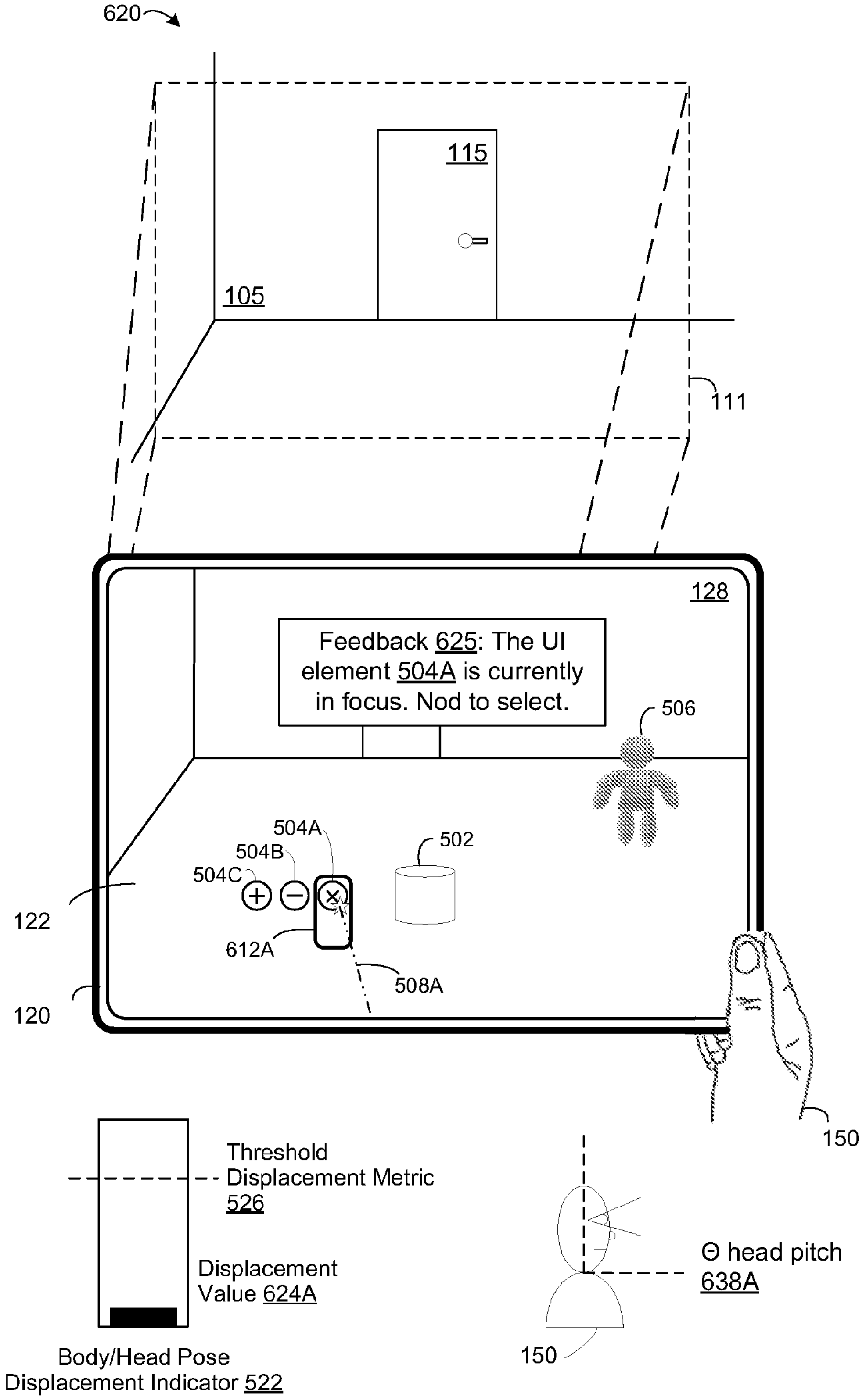

In response to detecting that the first gaze direction of the user 150 has been directed to the UI element 504A for at least a threshold amount of time (e.g., X seconds), the electronic device 120 presents a focus indicator 612A with a first appearance in association with the UI element 504A. As shown in FIG. 6B, during the instance 620 (e.g., associated with time $T_2$) of the content delivery scenario, the electronic device 120 presents the XR environment 128 with the focus indicator 612A (e.g., a slide bar) with the first appearance (e.g., a first (top) position relative to the UI element 504A) surrounding the UI element 504A. As shown in FIG. 6B, the XR environment 128 may optionally include textual feedback 625 indicating that: "The UI element 504A is currently in focus. Nod to select."

FIG. 6B illustrates the body/head pose displacement indicator 522 with a displacement value 624A for the instance 620, which corresponds to a difference between a current head pitch value 638A and an origin head pitch value (e.g., 90 degrees for a neutral head pose). In this example, the displacement value 624A is near zero because the current head pitch value 638A is near 90 degrees. As shown in FIG. 6B, the threshold displacement metric 526, which, when exceeded or breached, causes performance of an operation associated with the UI element that is in focus (e.g., the UI element 504A in FIG. 6B). As shown in FIG. 6B, the displacement value 624A is below the threshold displacement metric 526.

Figure 6C:
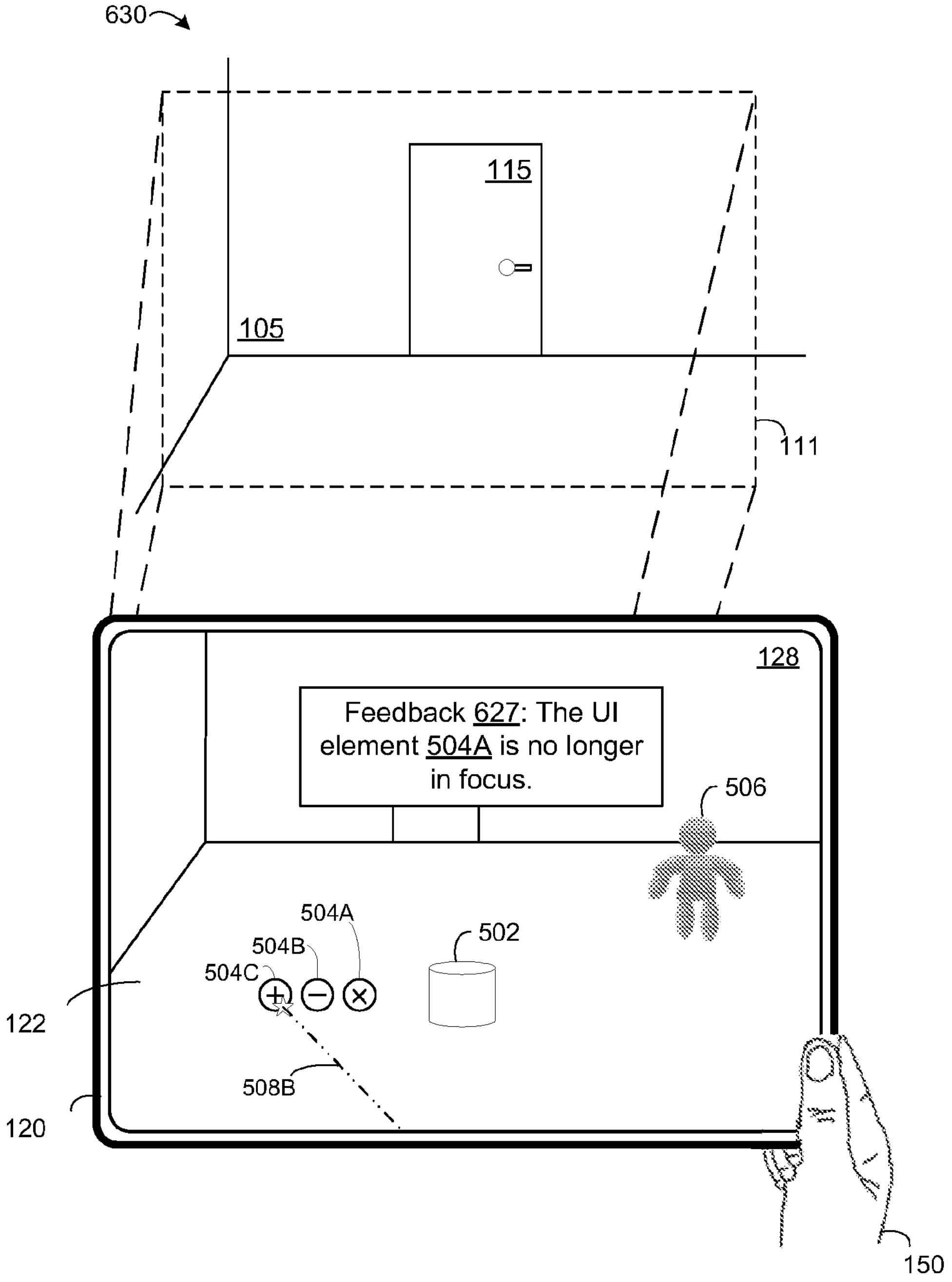

In response to detecting that the gaze direction of the user 150 is no longer directed to the UI element 504A, the electronic device 120 removes the focus indicator 612A from the XR environment 128. As shown in FIG. 6C, during the instance 630 (e.g., associated with time $T_3$) of the content delivery scenario, the electronic device 120 presents the XR environment 128 including textual feedback 627 indicating that: "The UI element 504A is no longer in focus." As shown in FIG. 6C, the XR environment 128 also includes a visualization 508B of a second gaze direction of the user 150 relative to the XR environment 128, which is directed to the UI element 504C.

Figure 6D:
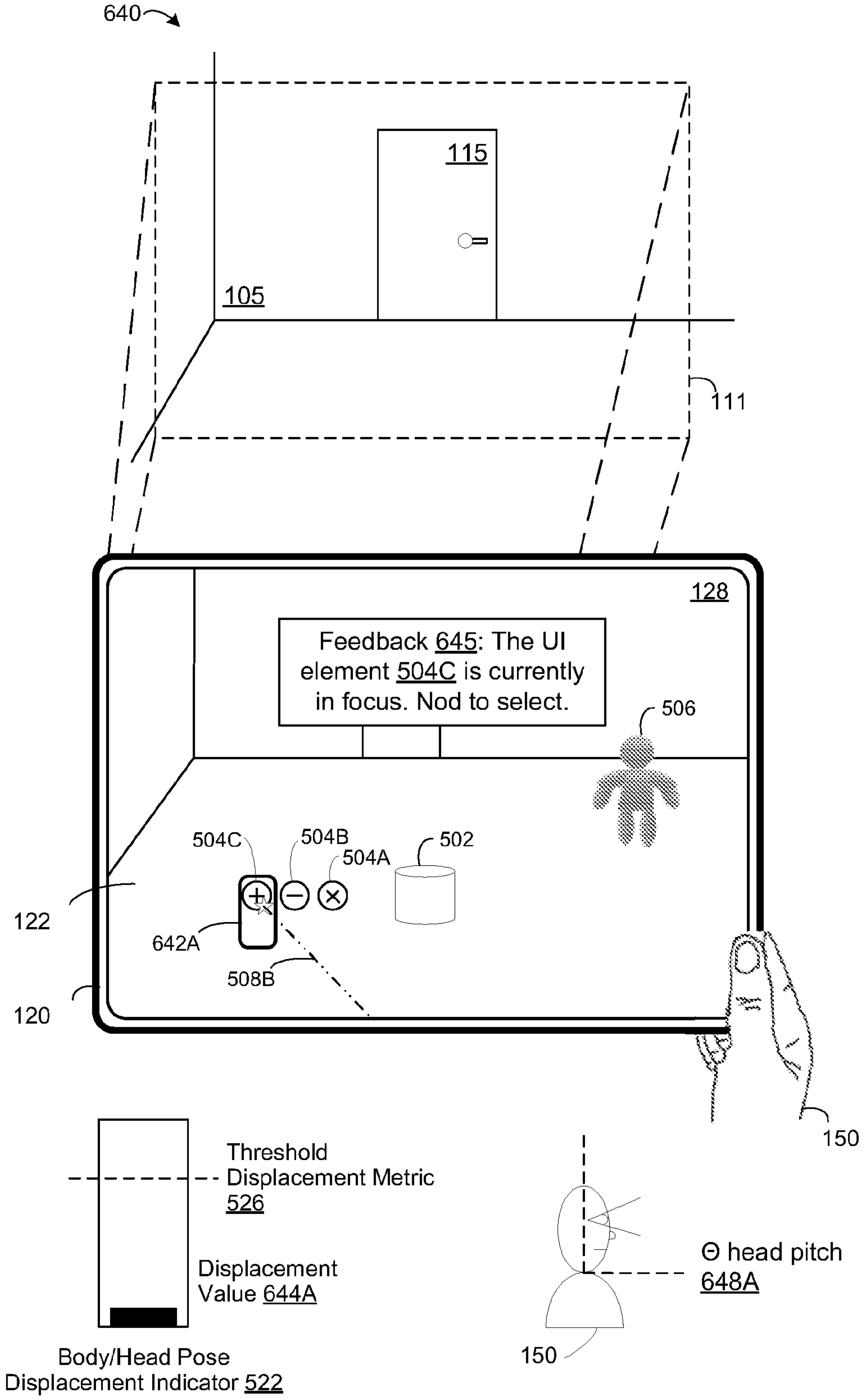

In response to detecting that the second gaze direction of the user 150 has been directed to the UI element 504C for at least the threshold amount of time (e.g., X seconds), the electronic device 120 presents a focus indicator 642A with a first appearance in association with the UI element 504C. As shown in FIG. 6D, during the instance 640 (e.g., associated with time $T_4$) of the content delivery scenario, the electronic device 120 presents the XR environment 128 with the focus indicator 642A (e.g., a slide bar) with the first appearance (e.g., a first (top) position relative to the UI element 504A) surrounding the UI element 504C. As shown in FIG. 6D, the XR environment 128 may optionally include textual feedback 645 indicating that: "The UI element 504C is currently in focus. Nod to select."

FIG. 6D illustrates the body/head pose displacement indicator 522 with a displacement value 644A for the instance 640, which corresponds to a difference between a current head pitch value 648A and an origin head pitch value (e.g., 90 degrees for a neutral head pose). In this example, the displacement value 644A is near zero because the current head pitch value 648A is near 90 degrees. As shown in FIG. 6D, the threshold displacement metric 526, which, when exceeded or breached, causes performance of an operation associated with the UI element that is in focus (e.g., the UI element 504C in FIG. 6D). As shown in FIG. 6D, the displacement value 644A is below the threshold displacement metric 526.

FIGS. 7A-7E illustrate a sequence of instances 710, 720, 730, and 740 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 710, 720, 730, and 740 are rendered and presented by a computing system such as the controller 110 shown in FIGS. 1 and 2: the electronic device 120 shown in FIGS. 1 and 3: and/or a suitable combination thereof. FIGS. 7A-7E are similar to and adapted from FIGS. 5A-5E. As such, similar references numbers are used in FIGS. 5A-5E and FIGS. 7A-7E. Furthermore, only the differences between FIGS. 5A-5E and FIGS. 7A-7E are described for the sake of brevity.

Figure 7A:
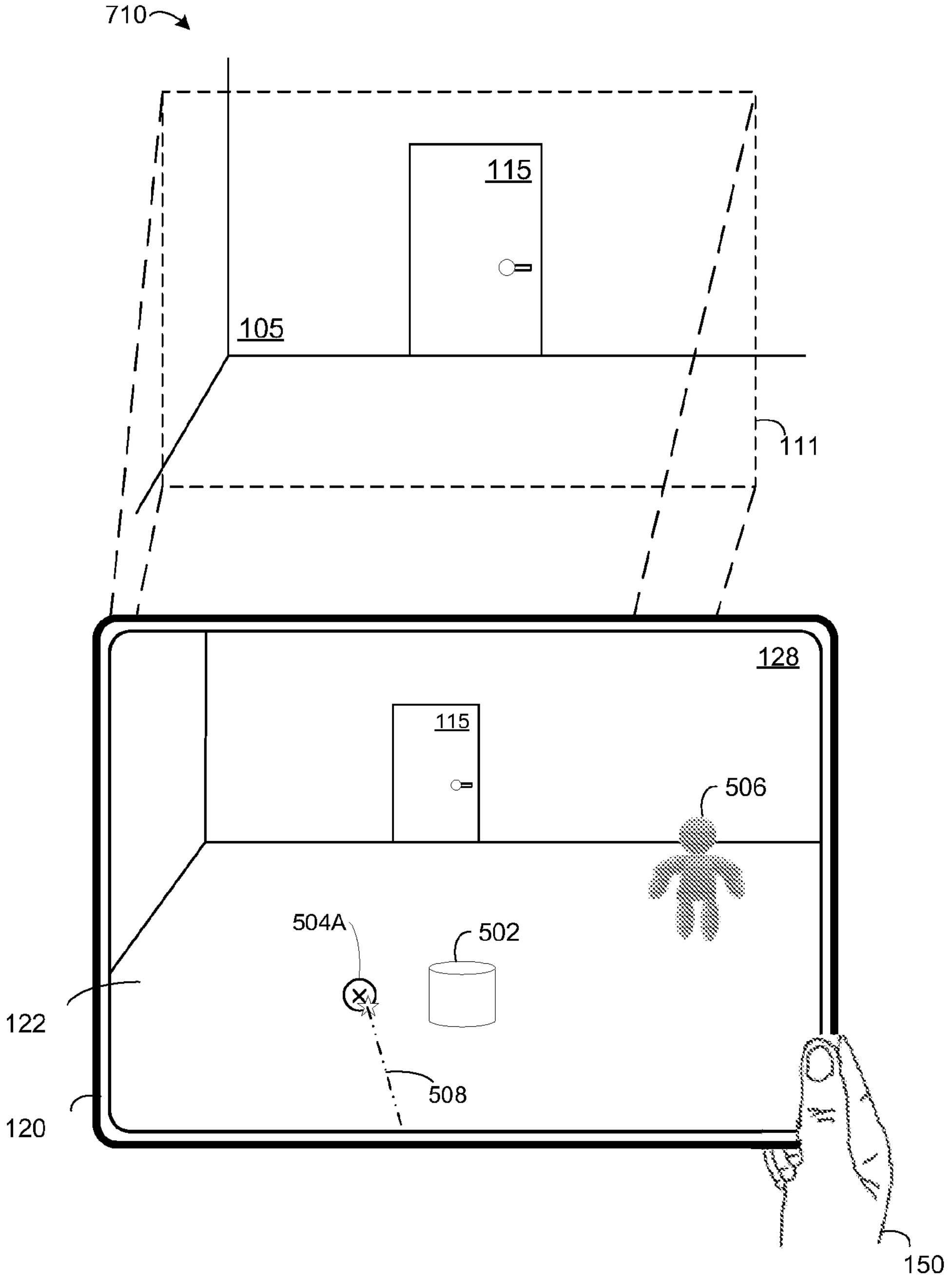
FIGS. 7A-7E illustrate yet another sequence of instances for a content delivery scenario in accordance with some implementations.

As shown in FIG. 7A, during the instance 710 (e.g., associated with time T1) of the content delivery scenario, the electronic device 120 presents an XR environment 128 including: the virtual agent 506, the XR content 502 (e.g., a 3D cylinder), and the UI element 504A associated with the XR content 502. As shown in FIG. 7A, the XR environment 128 also includes the visualization 508 of a gaze direction of the user 150 relative to the XR environment 128.

Figure 7B:
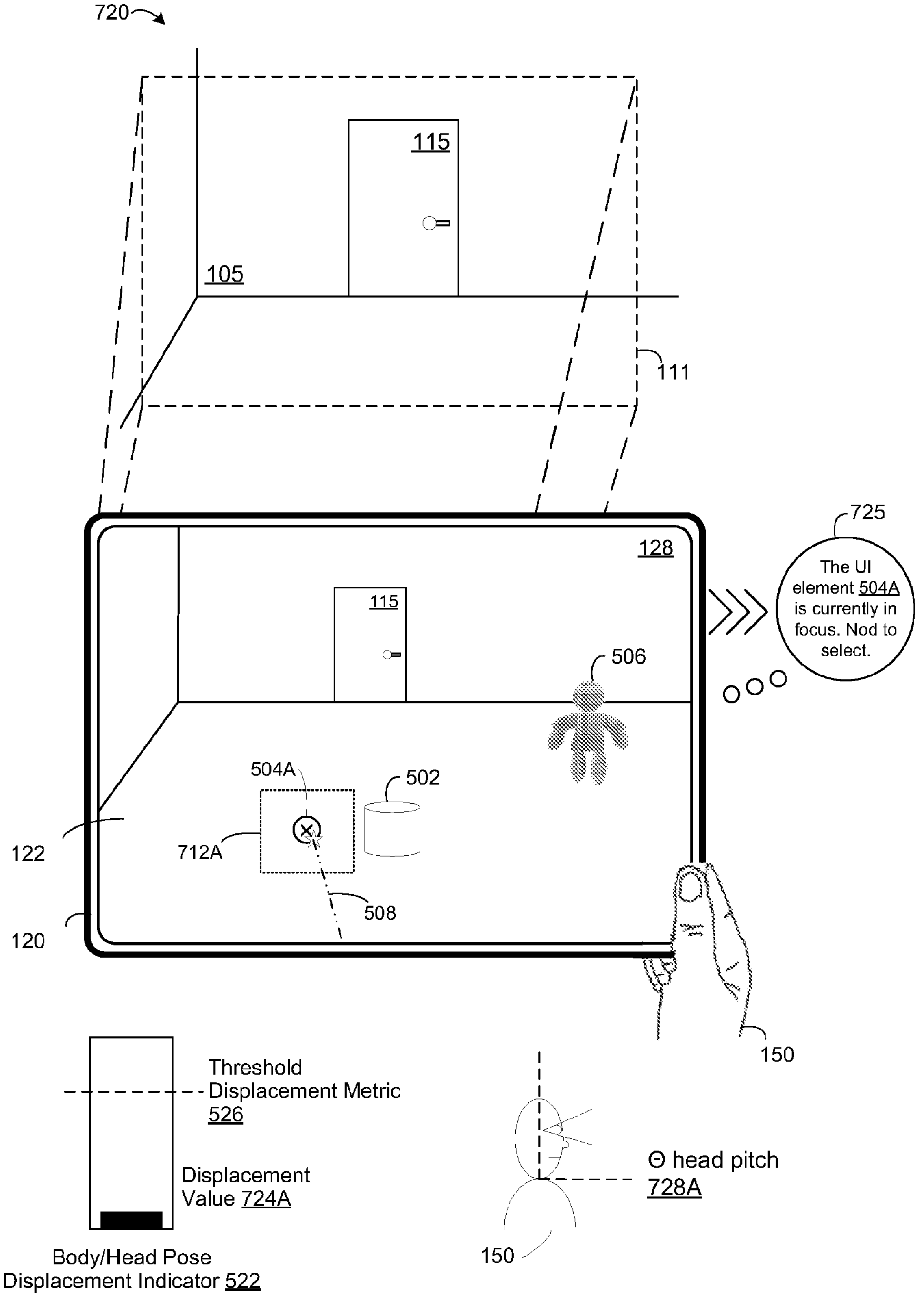

In response to detecting that the gaze direction of the user 150 has been directed to the UI element 504A for at least a threshold amount of time (e.g., X seconds), the electronic device 120 presents a focus indicator 712A with a first appearance in association with the UI element 504A. As shown in FIG. 7B, during the instance 720 (e.g., associated with time $T_2$) of the content delivery scenario, the electronic device 120 presents the XR environment 128 with the focus indicator 712A (e.g., a bounding box) with the first appearance (e.g., a first size) surrounding the UI element 504A. As shown in FIG. 7B, the electronic device 120 may optionally output audio feedback 725 indicating that: "The UI element 504A is currently in focus. Nod to select."

FIG. 7B illustrates the body/head pose displacement indicator 522 with a displacement value 724A for the instance 720, which corresponds to a difference between a current head pitch value 728A and an origin head pitch value (e.g., 90 degrees for a neutral head pose). In this example, the displacement value 724A is near zero because the current head pitch value 728A is near 90 degrees. As shown in FIG. 7B, the threshold displacement metric 526, which, when exceeded or breached, causes performance of an operation associated with the UI element that is in focus (e.g., the UI element 504A in FIG. 7B). As shown in FIG. 7B, the displacement value 724A is below the threshold displacement metric 526.

Figure 7C:
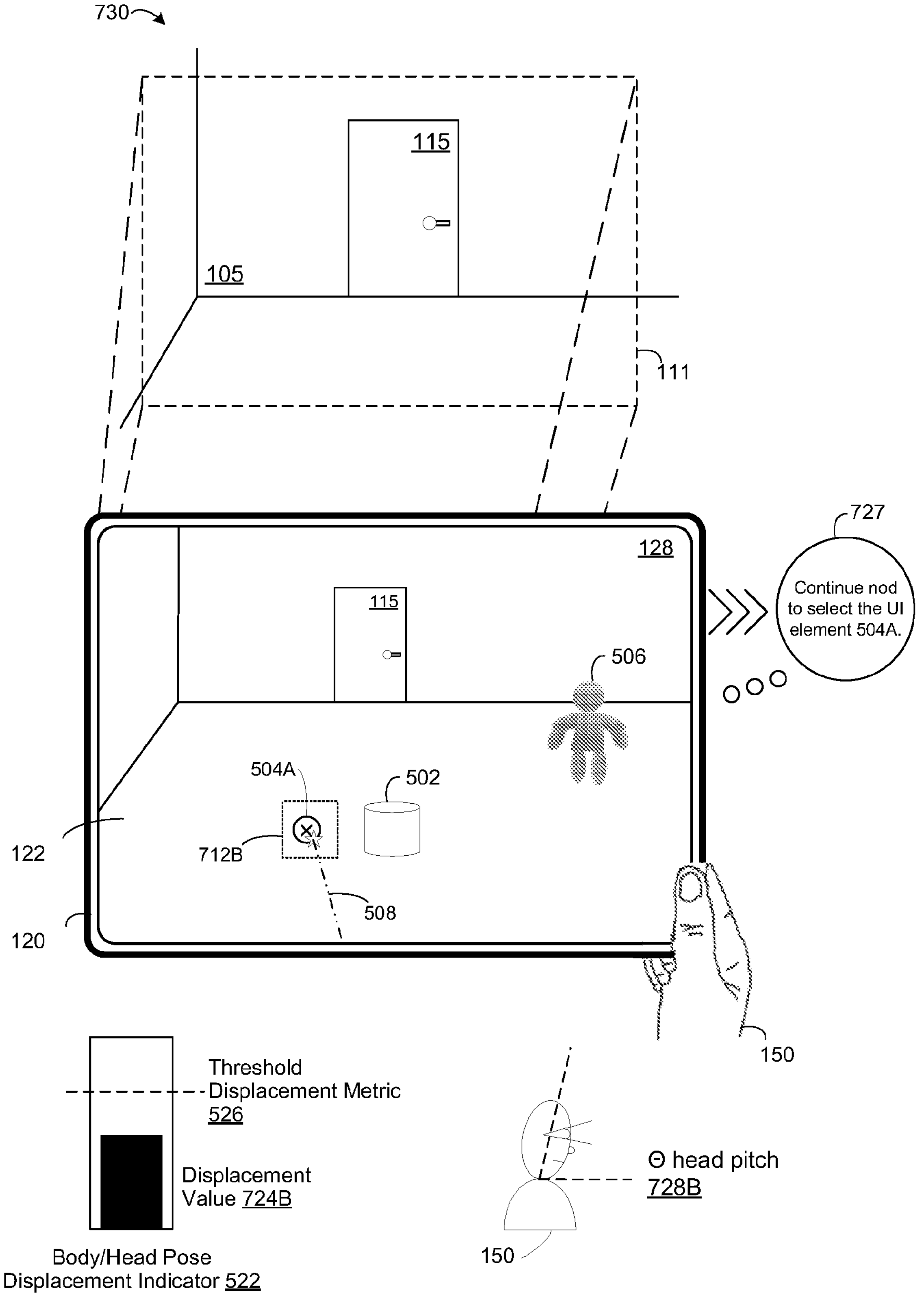

In response to detecting a change in a head pose of the user 150 while the gaze direction is still directed at the UI element 504A, the electronic device 120 modifies the focus indicator to indicate a magnitude of the change in the head pose of the user 150 by changing the focus indicator from the first appearance to a second appearance. As shown in FIG. 7C, during the instance 730 (e.g., associated with time $T_3$) of the content delivery scenario, the electronic device 120 presents the XR environment 128 with the focus indicator 712B (e.g., the bounding box) with the second appearance (e.g., a second size that is smaller than the first size) surrounding the UI element 504A. As shown in FIG. 7C, the electronic device 120 may optionally output audio feedback 727 indicating that: "Continue to nod to select the UI element 504A."

FIG. 7C illustrates the body/head pose displacement indicator 522 with a displacement value 724B for the instance 730, which corresponds to a difference between a current head pitch value 728B (e.g., approximately 60 degrees) and the origin head pitch value (e.g., 90 degrees for the neutral head pose). In this example, the displacement value 724B in FIG. 7C is greater than the displacement value 724A in FIG. 7B, but the displacement value 724B is below the threshold displacement metric 526.

Figure 7D:
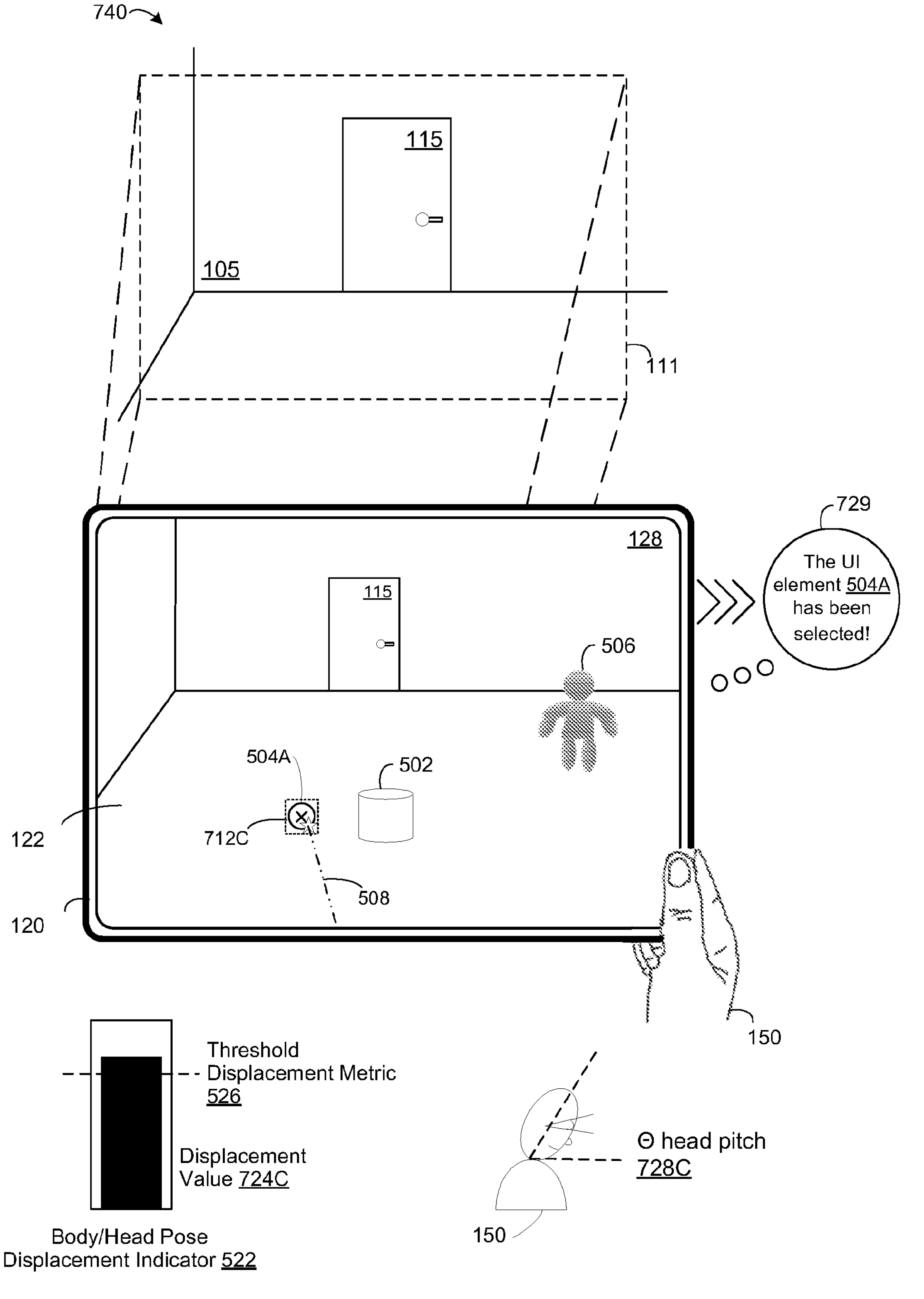

In response to detecting a further change in the head pose of the user 150 while the gaze direction is still directed at the UI element 504A, the electronic device 120 modifies the focus indicator to indicate the magnitude of the change in the head pose of the user 150 by changing the focus indicator from the second appearance to a third appearance. As shown in FIG. 7D, during the instance 740 (e.g., associated with time $T_4$) of the content delivery scenario, the electronic device 120 presents the XR environment 128 with the focus indicator 712C (e.g., the bounding box) with the third appearance (e.g., a third size smaller than the second size) surrounding the UI element 504A. As shown in FIG. 7D, the electronic device 120 may optionally output audio feedback 729 indicating that: "The UI element 504A has been selected!"

FIG. 7D illustrates the body/head pose displacement indicator 522 with a displacement value 724C for the instance 740, which corresponds to a difference between a current head pitch value 728C (e.g., approximately 45 degrees) and the origin head pitch value (e.g., 90 degrees for the neutral head pose). In this example, the displacement value 724C in FIG. 7D is greater than the displacement value 724B in FIG. 7C, and the displacement value 724C exceeds the threshold displacement metric 526.

Figure 7E:
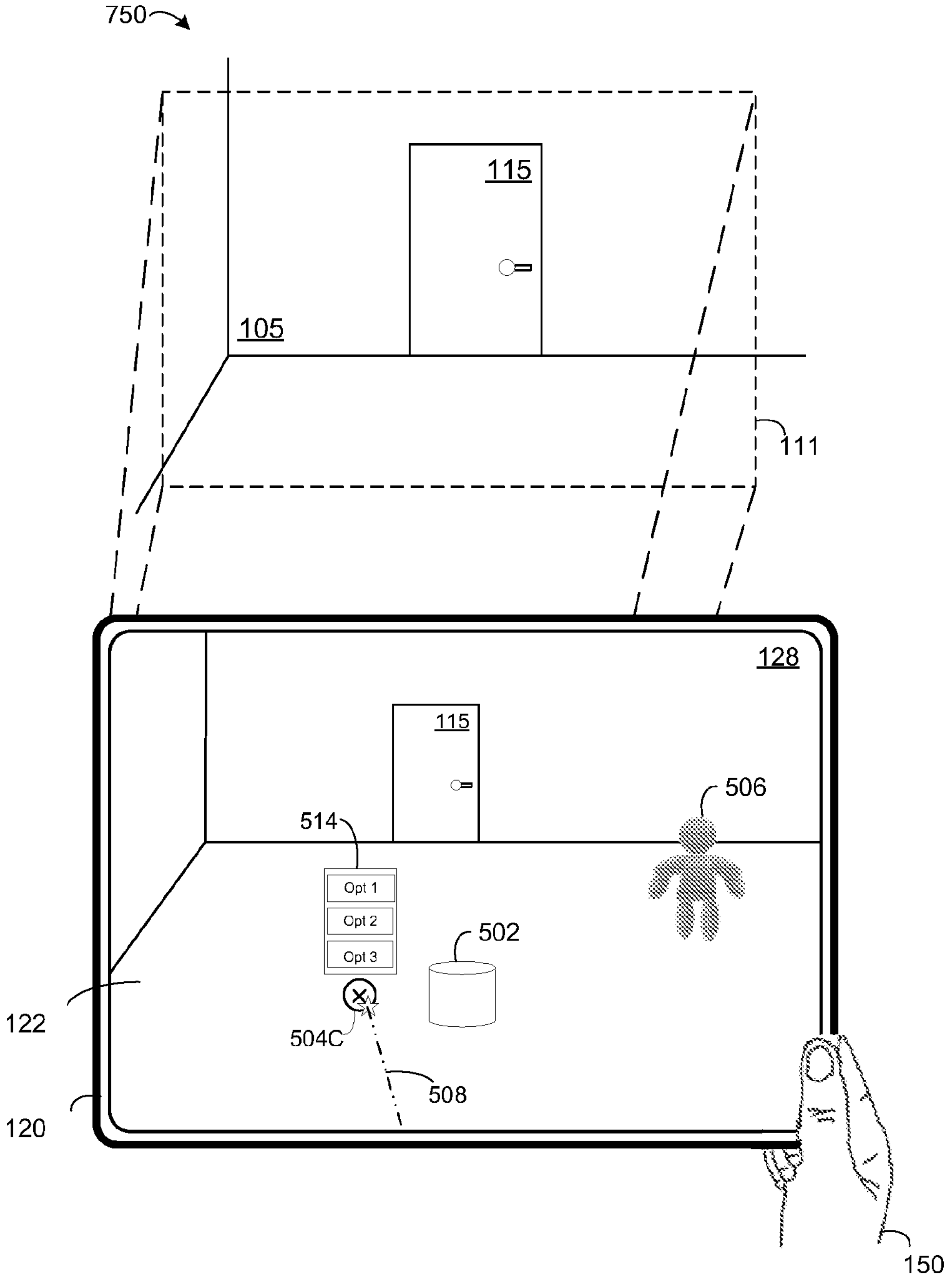

In response to determining that the displacement value 724C exceeds the threshold displacement metric 526, the electronic device 120 activates the UI element 504A or, in other words, performs an operation associated with the UI element 504A. As shown in FIG. 7E, during the instance 750 (e.g., associated with time $T_5$) of the content delivery scenario, the electronic device 120 presents the XR environment 128 including the set of options 514 associated with the UI element 504A.

While FIGS. 5A-E, 6A-D, and 7A-E show example focus indicators, it should be appreciated that other focus indicators that indicate the magnitude of change in the head pose of the user 150 can be used by modifying a visual, audible, haptic, or other state of the indicator in response to a change in head pose.

Figure 8:
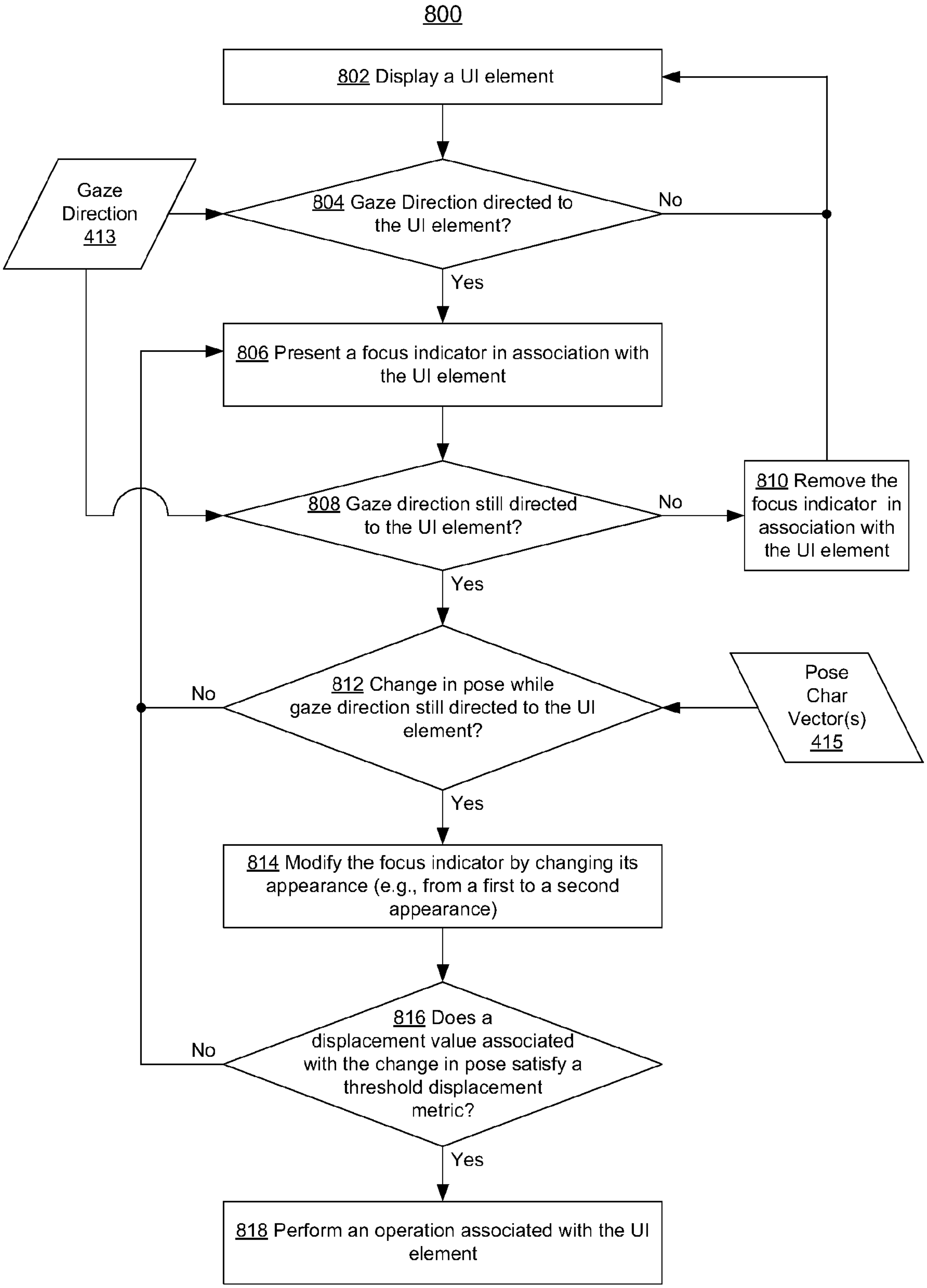
FIG. 8 is a flowchart representation of a method of visualizing multi-modal inputs in accordance with some implementations.

FIG. 8 is a flowchart representation of a method 800 of visualizing multi-modal inputs in accordance with some implementations. In various implementations, the method 800 is performed at a computing system including non-transitory memory and one or more processors, wherein the computing system is communicatively coupled to a display device and one or more input devices (e.g., the electronic device 120 shown in FIGS. 1 and 3: the controller 110 in FIGS. 1 and 2: or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As represented by block 802, the method 800 includes displaying a user interface (UI) element. As represented by block 804, the method 800 includes determining whether a gaze direction (e.g., the eye tracking vector 413 in FIG. 4B) is directed to the UI element (for at least X seconds). If the gaze direction 413 is directed to the UI element ("Yes" branch from block 804), the method 800 continues to block 806. If the gaze direction (e.g., the eye tracking vector 413 in FIG. 4B) is not directed to the UI element ("No" branch from block 804), the method 800 continues to block 802.

As represented by block 806, the method 800 includes presenting a focus indicator in associated with the UI element. As one example, FIG. 5B illustrates a focus indicator 512A (e.g., a slide bar) with a first appearance surrounding the UI element 504A. As another example, FIG. 7B illustrates a focus indicator 712A (e.g., a bounding box) with a first appearance surrounding the UI element 504A. In other examples, other visual, audible, haptic, or other focus indicator can be presented. In some implementations, the focus indicator corresponds to an additional user interface element, and wherein the additional user interface element is at least one of surrounding the first user interface element, adjacent to the first user interface element, or overlaid on the first user interface element.

As represented by block 808, the method 800 includes determining whether the gaze direction is still directed to the UI element. If the gaze direction (e.g., the eye tracking vector 413 in FIG. 4B) is still directed to the UI element ("Yes" branch from block 808), the method 800 continues to block 812. If the gaze direction (e.g., the eye tracking vector 413 in FIG. 4B) is not directed to the UI element ("No" branch from block 808), the method 800 continues to block 810. As represented by block 810, the method 800 includes removing the focus indicator in association with the UI element. As one example, FIGS. 6B and 6C illustrate a sequence in which the electronic device 120 removes the focus indicator 612A (e.g., a slide bar) surrounding the UI element 504A from the XR environment 128 when the gaze direction changes from the first gaze direction 508A in FIG. 6B to the second gaze direction 508B in FIG. 6C.

As represented by block 812, the method 800 includes determining whether a change in pose (e.g., the body and/or head pose of the user 150) is detected (based on the pose characterization vector(s) 415) while the gaze direction (e.g., the eye tracking vector 413 in FIG. 4B) is still directed to the UI element. If the change in pose is detected ("Yes" branch from block 812), the method 800 continues to block 814. As one example, FIGS. 5B-5D illustrate a sequence in which the electronic device 120 detects downward head pose movement from the head pitch value 528A in FIG. 5B to the head pitch value 528C in FIG. 5D. One of ordinary skill in the art will appreciate that the head pose movement may alternatively be associated with upward head pose movement, side-to-side head pose movement, head pose movement according to a predefined pattern (e.g., a cross motion pattern), and/or the like. One of ordinary skill in the art will appreciate that the head pose movement may be replaced with other body pose movement such as arm movement, torso twisting, and/or the like. If the change in pose is not detected ("No" branch from block 812), the method 800 continues to block 806.

As represented by block 814, the method 800 includes modifying the focus indicator by changing its appearance, sound, haptics, or the like. As one example, in response to the change in the head pose of the user 150, FIGS. 5B and 5C illustrate a sequence in which the electronic device 120 changes the appearance of the focus indicator from the first appearance (e.g., a first (top) position relative to the UI element 504A) in FIG. 5B to the second appearance (e.g., a second (middle) position relative to the UI element 504A) in FIG. 5C. As another example, in response to the change in the head pose of the user 150, FIGS. 6B and 6C illustrate a sequence in which the electronic device 120 changes the appearance of the focus indicator from the first appearance (e.g., a first size) in FIG. 6B to the second appearance (e.g., a second size that is smaller than the first size) in FIG. 6C. In some implementations, the change to the focus indicator from the first appearance to the second appearance indicates a magnitude of the change in pose.

As represented by block 816, the method 800 includes determining whether a displacement value associated with the change in the pose satisfies a threshold displacement metric. If the change in the pose satisfies the threshold displacement metric ("Yes" branch from block 816), the method 800 continues to block 818. If the change in the pose does not satisfy the threshold displacement metric ("No" branch from block 816), the method 800 continues to block 806.

As represented by block 818, the method 800 includes performing an operation associated with the UI element. As one example, FIGS. 5D and 5E illustrate a sequence in which the electronic device 120 displays the set of options 514 associated with the UI element 504A in response to the displacement value 524C associated with the head pose of the user 150 exceeding the threshold displacement metric 526. As another example, FIGS. 7D and 7E illustrate a sequence in which the electronic device 120 displays the set of options 514 associated with the UI element 504A in response to the displacement value 724C associated with the head pose of the user 150 exceeding the threshold displacement metric 526.

Figure 9:
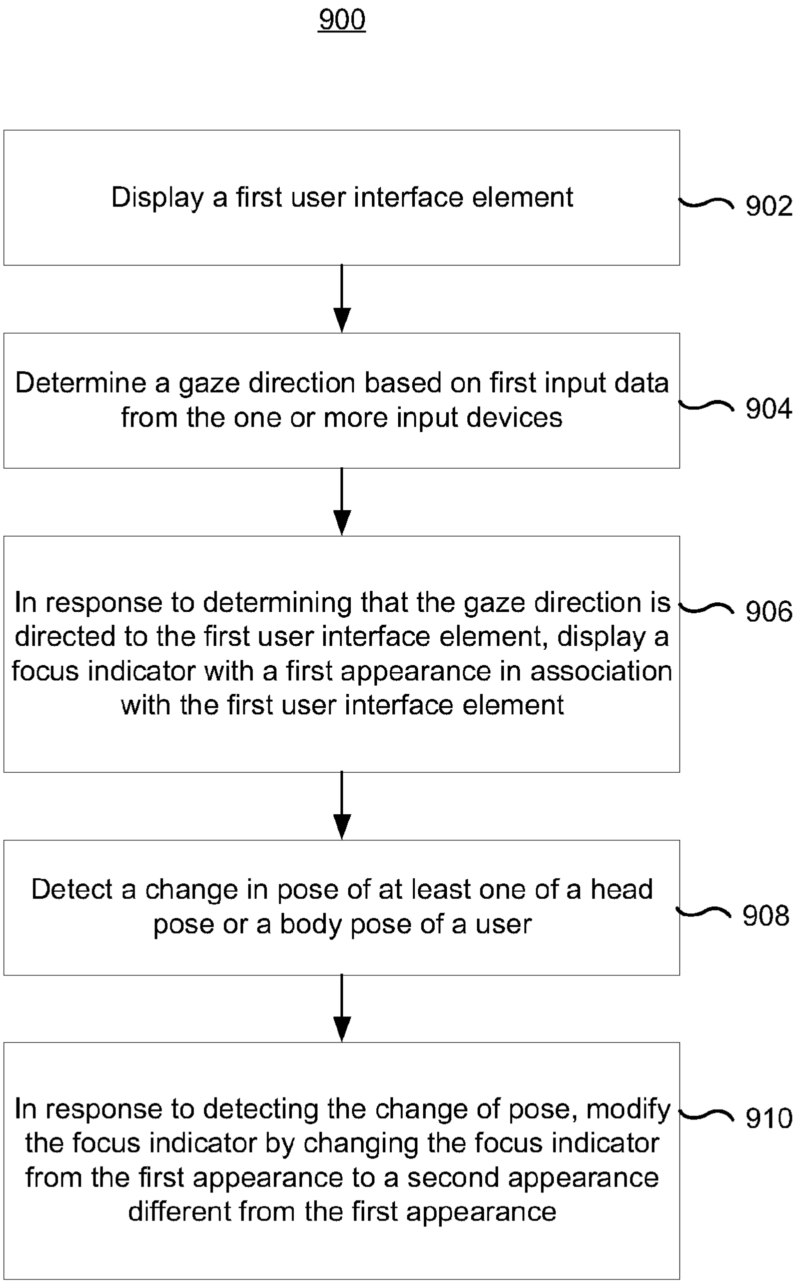
FIG. 9 is another flowchart representation of a method of visualizing multi-modal inputs in accordance with some implementations.

FIG. 9) is a flowchart representation of a method 900 of visualizing multi-modal inputs in accordance with some implementations. In various implementations, the method 900 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, various scenarios may involve selecting a user interface (UI) element by focusing a UI element (e.g., based on the gaze direction) and preforming a secondary action such as nodding. However, a user may not be aware that the nod input controls the UI element or that the nod input is successful. As such, in various implementations, an abstraction of the nod (e.g., a dynamic visual slide bar) is displayed in association with the UI element to indicate the progress and completion of the nod input.

As represented by block 902, the method 900 includes displaying, via the display device, a first user interface element within an extended reality (XR) environment. In some implementations, the XR environment includes the first user interface element and at least one other user interface element. In some implementations, the XR environment includes XR content, and the first user interface element is associated with performing a first operation on the XR content. For example, FIGS. 5A-5E illustrate a sequence of instances in which the electronic device 120 presents an XR environment 128 including: a virtual agent 506, XR content 502 (e.g., a 3D cylinder), and UI elements 504A, 504B, and 504C associated with the XR content 502.

In some implementations, the first UI element is associated with XR content that is also overlaid on the physical environment. For example, the first UI element is operable to perform an operation on the XR content, manipulate the XR content, change/modify the XR content, and/or the like. In some implementations, the UI element is one of world-locked (e.g., anchored to a physical object in the physical environment 105), head-locked (e.g., anchored to a predefined position in the user's FOV), body-locked, and/or the like. As one example, if the UI element is head-locked, the UI element remains in the FOV 111 of the user 150 when he/she locomotes about the physical environment 105. As another example, if the UI element is world-locked, the UI element remains anchored to a physical object in the physical environment 105 when the user 150 locomotes about the physical environment 105. In some implementations, the UI element is one of world-locked (e.g., anchored to a physical object in the physical environment 105), head-locked (e.g., anchored to a predefined position in the user's FOV), body-locked, and/or the like.

For example, with reference to FIG. 4A, the computing system or a component thereof (e.g., the content selector 422) obtains (e.g., receives, retrieves, etc.) XR content 427 from the content library 425 based on one or more user inputs 421 (e.g., selecting the XR content 427 from a menu of XR content items). Continuing with this example, the computing system or a component thereof (e.g., the pose determiner 452) determines a current camera pose of the electronic device 120 and/or the user 150 relative to an origin location for the XR content 427. Continuing with this example, the computing system or a component thereof (e.g., the renderer 454) renders the XR content 427 and the first user interface element according to the current camera pose relative thereto. According to some implementations, the pose determiner 452 updates the current camera pose in response to detecting translational and/or rotational movement of the electronic device 120 and/or the user 150. Continuing with this example, in video pass-through scenarios, the computing system or a component thereof (e.g., the compositor 464) obtains (e.g., receives, retrieves, etc.) one or more images of the physical environment 105 captured by the image capture device 370 and composites the rendered XR content 427 with the one or more images of the physical environment 105 to produce one or more rendered image frames. Finally, the computing system or a component thereof (e.g., the A/V presenter 470) presents or causes presentation of the one or more rendered image frames (e.g., via the one or more displays 312 or the like). One of ordinary skill in the art will appreciate that the operations of the optional compositor 464 may not be applicable for fully virtual environments or optical see-through scenarios.

In some implementations, the display device includes a transparent lens assembly, and wherein the XR content and the first user interface element is projected onto the transparent lens assembly. In some implementations, the display device includes a near-eye system, and wherein presenting the XR content and the first user interface element includes compositing the XR content and the first user interface element with one or more images of a physical environment captured by an exterior-facing image sensor. In some implementations, the XR environment corresponds to AR content overlaid on the physical environment. In one example, the XR environment is associated with an optical see-through configuration. In another example, the XR environment is associated with a video pass-through configuration. In some implementations, the XR environment corresponds a VR environment with VR content.

In some implementations, the method 900 includes: displaying, via the display device, a gaze indicator within the XR environment associated with the gaze direction. For example, FIGS. 5A-5E illustrate a sequence of instances in which the electronic device 120 presents the XR environment 128 with the visualization 508 of the gaze direction of the user 150 is directed to the UI element 504A. One of ordinary skill in the art will appreciate that the visualization 508 may be removed in various implementations or replaced with other forms or configurations in various other implementations.

As represented by block 904, the method 900 includes determining a gaze direction based on first input data from the one or more input devices. For example, the first input data corresponds to images from one or more eye tracking cameras. In some implementations, the computing system determines that the first UI element is the intended focus/ROI from among a plurality of UI elements based on that the gaze direction. In some implementations, the computing system or a component thereof (e.g., the eye tracking engine 412 in FIGS. 2 and 4A) determines a gaze direction (e.g., the eye tracking vector 413 in FIG. 4B) based on the input data and updates the gaze direction over time.

For example, FIGS. 5A-5E illustrate a sequence of instances in which the gaze direction is directed to the UI element 504A. For example, the gaze direction (e.g., the eye tracking vector 413 in FIG. 4B) indicates a point (e.g., associated with x, y, and z coordinates relative to the physical environment 105 or the world at-large), a physical object, or a region of interest (ROI) in the physical environment 105 at which the user 150 is currently looking. As another example, the gaze direction (e.g., the eye tracking vector 413 in FIG. 4B) indicates a point (e.g., associated with x, y, and z coordinates relative to the XR environment 128), an XR object, or a region of interest (ROI) in the XR environment 128 at which the user 150 is currently looking.

As represented by block 906, in response to determining that the gaze direction is directed to the first user interface element, the method 900 includes displaying, via the display device, a focus indicator with a first appearance in association with the first user interface element. In some implementations, the computing system also determines whether the gaze direction has been directed to the first user interface element for at least a predefined amount of time (e.g., X seconds). In some implementations, the computing system or a component thereof (e.g., the focus visualizer 432 in FIGS. 2 and 4A) generates a focus indicator in association with a respective UI element when the gaze direction (e.g., the eye tracking vector 413 in FIG. 4B) is directed to the respective UI element. For example, the first appearance corresponds to a first state of the focus indicator. In some implementations, the focus indicator corresponds to an additional user interface element, and wherein the additional user interface element is at least one of surrounding the first user interface element, adjacent to the first user interface element, or overlaid on the first user interface element. For example, the focus indicator surrounds or is otherwise displayed adjacent to the first UI element as shown in FIGS. 5B-5D.

As one example, FIG. 5B illustrates a focus indicator 512A (e.g., a slide bar) with a first appearance surrounding the UI element 504A. As another example, FIG. 7B illustrates a focus indicator 712A (e.g., a bounding box) with a first appearance surrounding the UI element 504A.

As represented by block 909, the method 900 includes detecting, via the one or more input devices, a change in pose of at least one of a head pose or a body pose of a user of the computing system. In some implementations, the computing system or a component thereof (e.g., the body/head pose tracking engine 414 in FIGS. 2 and 4A) determines a pose characterization vector 415 based on the input data and update the pose characterization vector 415 over time. The pose characterization vector 415 is described in more detail above with reference to FIG. 4B. In some implementations, the computing system or a component thereof (e.g., the pose displacement determiner 434 in FIGS. 2 and 4A) detects a change in pose of at least one of a head pose or a body pose of the user 150 and determine an associated displacement value or difference between pose characterization vectors 415 over time. As one example, with reference to FIGS. 5B and 5C, the computing system detects a change in head pose of the user from a head pitch value 528A in FIG. 5B (e.g., near 90) degrees) to a head pitch value 528B in FIG. 5C (e.g., approximately 60 degrees). As such, in FIGS. 5B-5D, the electronic device 120 detects downward head pose movement from the head pitch value 528A in FIG. 5B to the head pitch value 528C in FIG. 5D. One of ordinary skill in the art will appreciate that the head pose movement may alternatively be associated with upward head pose movement, side-to-side head pose movement, head pose movement according to a predefined pattern (e.g., a cross motion pattern), and/or the like. One of ordinary skill in the art will appreciate that the head pose movement may be replaced with other body pose movement such as arm movement, shoulder movement, torso twisting, and/or the like.

As represented by block 910, in response to detecting the change of pose, the method 900 includes modifying the focus indicator in pose by changing the focus indicator from the first appearance to a second appearance different from the first appearance. In some implementations, in response to the change in pose of at least one of a head pose or a body pose of the user 150, the computing system or a component thereof (e.g., the content updater 436 in FIGS. 2 and 4A) modify an appearance of the focus indicator from a first appearance to a second appearance to indicate a magnitude of the change in pose. As one example, the focus indicator moves up based on an upward head tilt. As another example, the focus indicator moves down based on a downward head tilt. In some implementations, the computing system modifies the focus indicator by moving the focus indicator in one preset direction/dimension. In some implementations, the computing system modifies the focus indicator by moving the focus indicator in two or more directions/dimensions.

In some implementations, the first appearance corresponds to a first position within the XR environment and the second appearance corresponds to a second position within the XR environment different from the first position. For example, the computing system moves the first UI element relative to one axis such up/down or left/right. For example, the computing system moves the first UI element relative to two or mor axes. As one example, in response to the change in the head pose of the user 150, FIGS. 5B and 5C illustrate a sequence in which the electronic device 120 changes the appearance of the focus indicator from the first appearance (e.g., a first (top) position relative to the UI element 504A) in FIG. 5B to the second appearance (e.g., a second (middle) position relative to the UI element 504A) in FIG. 5C.

In some implementations, the first appearance corresponds to a first size for the focus indicator and the second appearance corresponds to a second size for the focus indicator different from the first size. For example, the computing system increases or decreases the size of the focus indicator. As another example, in response to the change in the head pose of the user 150, FIGS. 6B and 6C illustrate a sequence in which the electronic device 120 changes the appearance of the focus indicator from the first appearance (e.g., a first size) in FIG. 6B to the second appearance (e.g., a second size that is smaller than the first size) in FIG. 6C. In some implementations, the first and second appearances corresponds to a morphing shape such has from square to circle, or vice versa. In some implementations, the first and second appearances corresponds to a changing color such as from red to green.

In some implementations, modifying the focus indicator includes movement of the focus indicator based on the magnitude of the change in pose. In some implementations, a sensitivity value for the movement be preset or adjusted by the user 150, which corresponds to the proportionality or mapping therebetween. As one example, 1 cm of head pose movement may correspond to 1 cm of focus indicator movement. As another example, 1 cm of head pose movement may correspond to 5 cm of focus indicator movement. As yet another example, 5 cm of head pose movement may correspond to 1 cm of focus indicator movement.

In some implementations, the movement of the focus indicator is proportional to the magnitude of the change in pose. For example, the computing system modifies the focus indicator based on one-to-one movement between head pose and focus indicator. In some implementations, the movement of the focus indicator is not proportional to the magnitude of the change in pose. For example, the movement between head pose and focus indicator is not one-to-one and corresponds to a function or mapping therebetween.

In some implementations, the method 900 includes: prior to detecting the change in pose, determining a first pose characterization vector based on second input data from the one or more input devices, wherein the first pose characterization vector corresponds to one of an initial head pose or an initial body pose of the user of the computing system: and (e.g., an initial body/head pose) after detecting the change in pose, determining a second pose characterization vector based on the second input data from the one or more input devices, wherein the second pose characterization vector corresponds to one of a subsequent head pose or a subsequent body pose of the user of the computing system.

In some implementations, the method 900 includes: determining a displacement value between the first and second pose characterization vectors: and in accordance with a determination that the displacement value satisfies a threshold displacement metric, performing an operation associated with the first user interface element within the XR environment. For example, the operation is performed on an associated XR content with the XR environment. In some implementations, the computing system or a component thereof (e.g., the pose displacement determiner 434 in FIGS. 2 and 4A) determines an associated displacement value or difference between pose characterization vectors 415 over time and, in response to determining that the displacement value satisfies a threshold displacement metric, cause an operation associated with the respective UI element to be performed.

As one example, FIGS. 5D and 5E illustrate a sequence in which the electronic device 120 displays the set of options 514 associated with the UI element 504A in response to the displacement value 524C associated with the head pose of the user 150 exceeding the threshold displacement metric 526. As another example, FIGS. 7D and 7E illustrate a sequence in which the electronic device 120 displays the set of options 514 associated with the UI element 504A in response to the displacement value 724C associated with the head pose of the user 150 exceeding the threshold displacement metric 526.

In some implementations, the method 900 includes: determining a change of the gaze direction based on first input data from the one or more input devices: and in response to determining that the gaze direction is not directed to the first user interface element due to the change of the gaze direction, ceasing display of the focus indicator in association with the first user interface element. In some implementations, the computing system or a component thereof (e.g., the pose displacement determiner 434 in FIGS. 2 and 4A) determines a gaze direction (e.g., the eye tracking vector 413 in FIG. 4B) based on the input data and updates the gaze direction over time. As one example, FIGS. 6B and 6C illustrate a sequence in which the electronic device 120 removes the focus indicator 612A (e.g., a slide bar) surrounding the UI element 504A from the XR environment 128 when the gaze direction (e.g., the eye tracking vector 413 in FIG. 4B) changes from the first gaze direction 508A in FIG. 6B to the second gaze direction 508B in FIG. 6C.

Figure 10A:
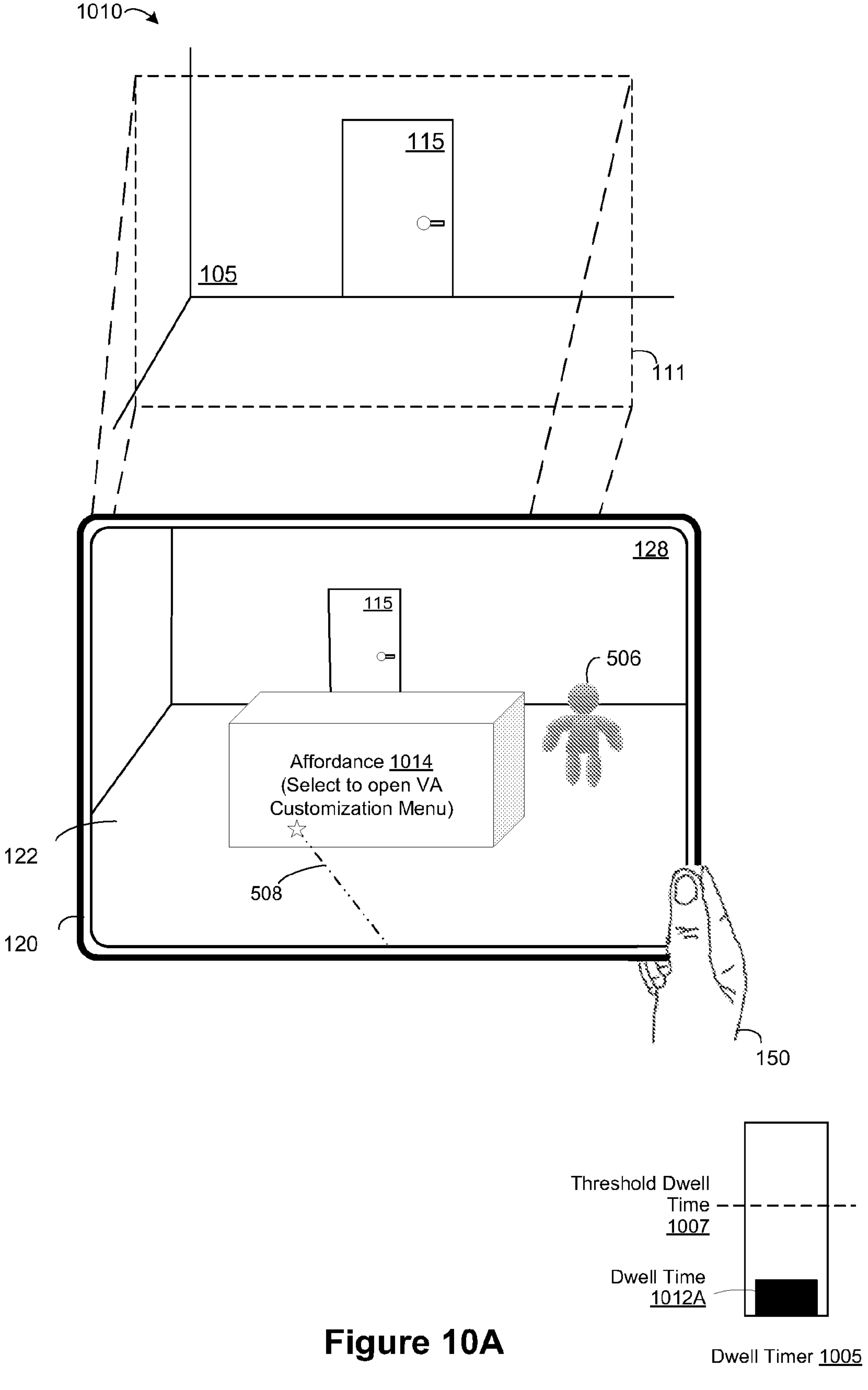
FIGS. 10A-10Q illustrate a sequence of instances for a content delivery scenario in accordance with some implementations.
Figure 10B:
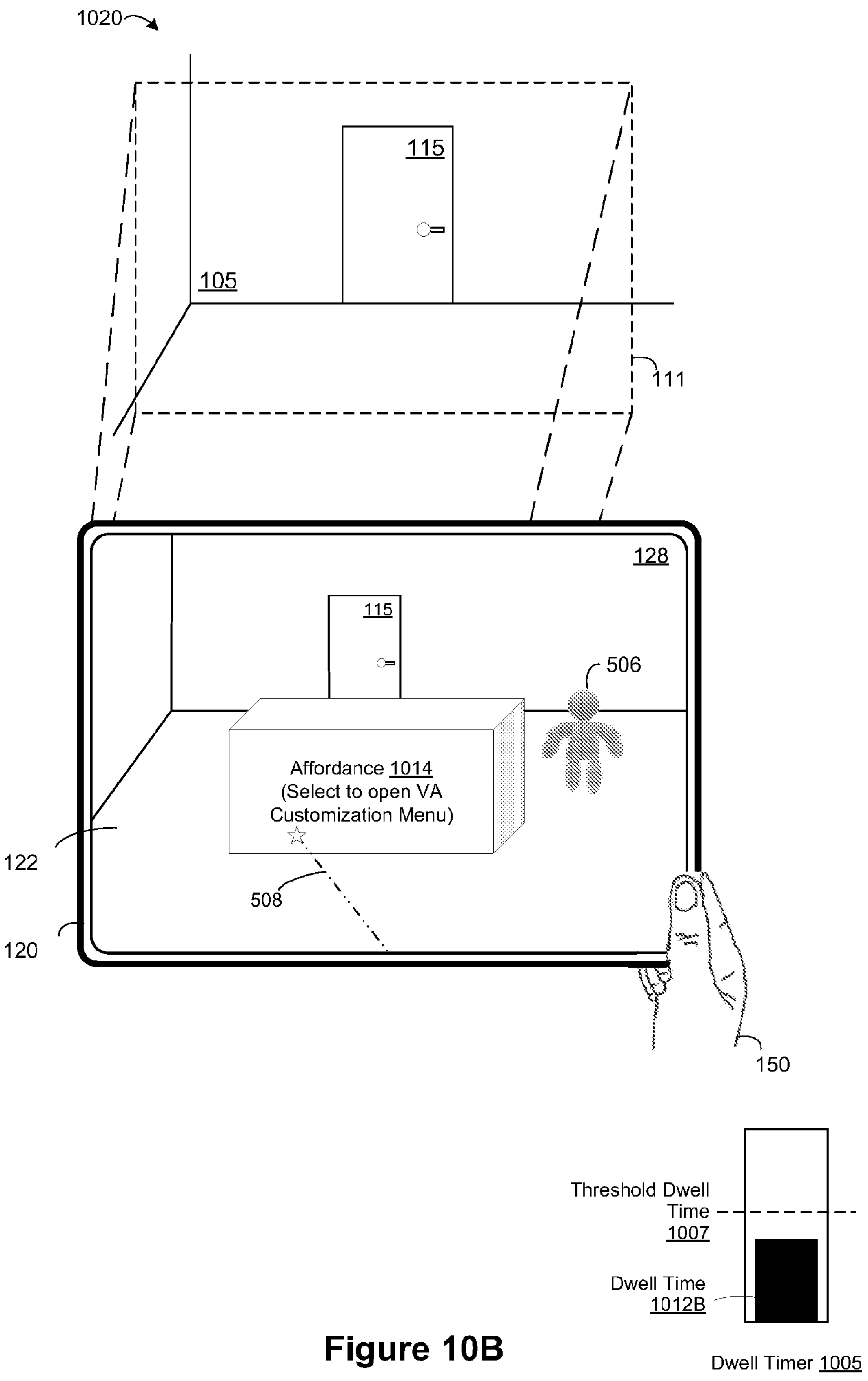
Figure 10C:
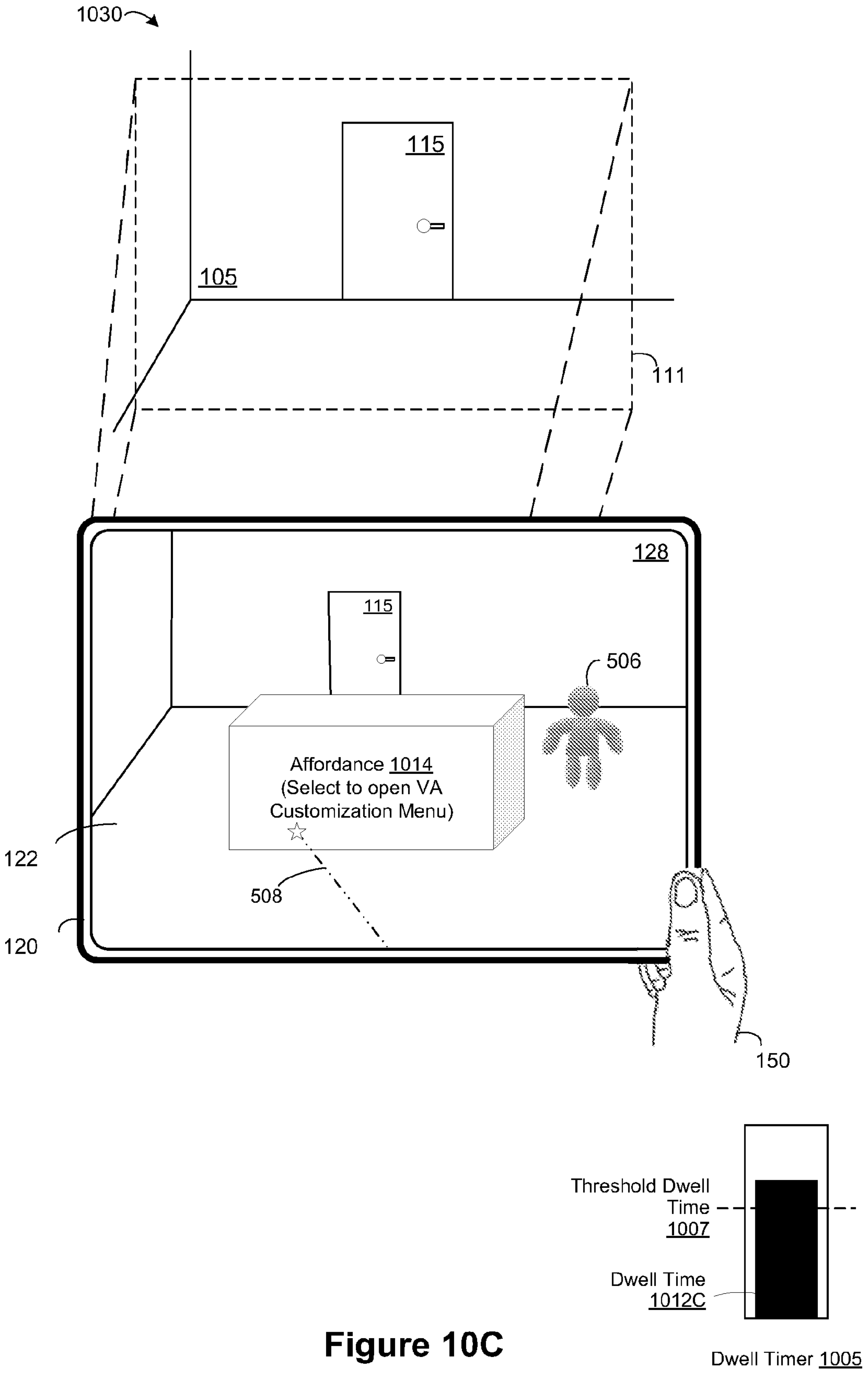
Figure 10D:
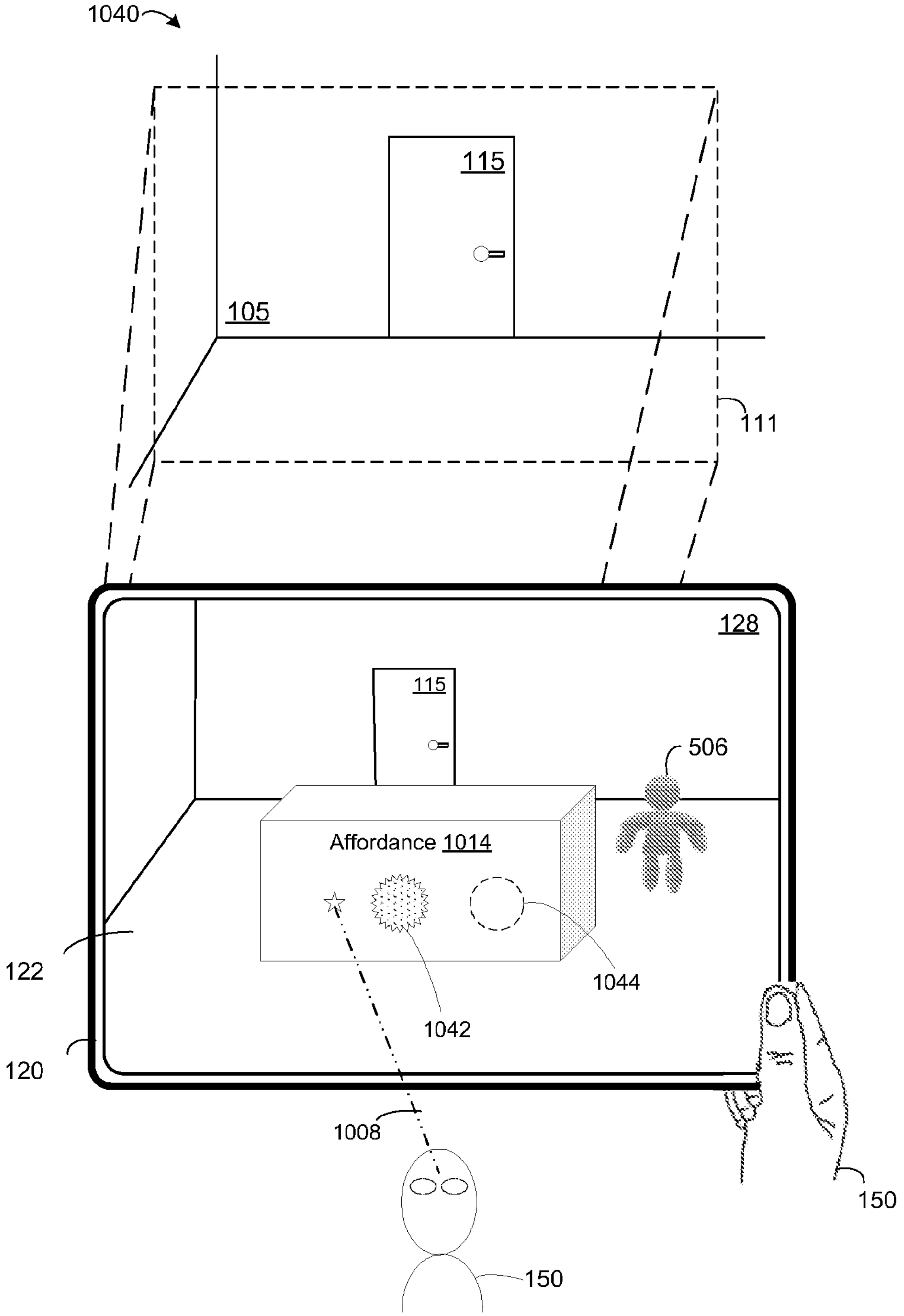
Figure 10E:
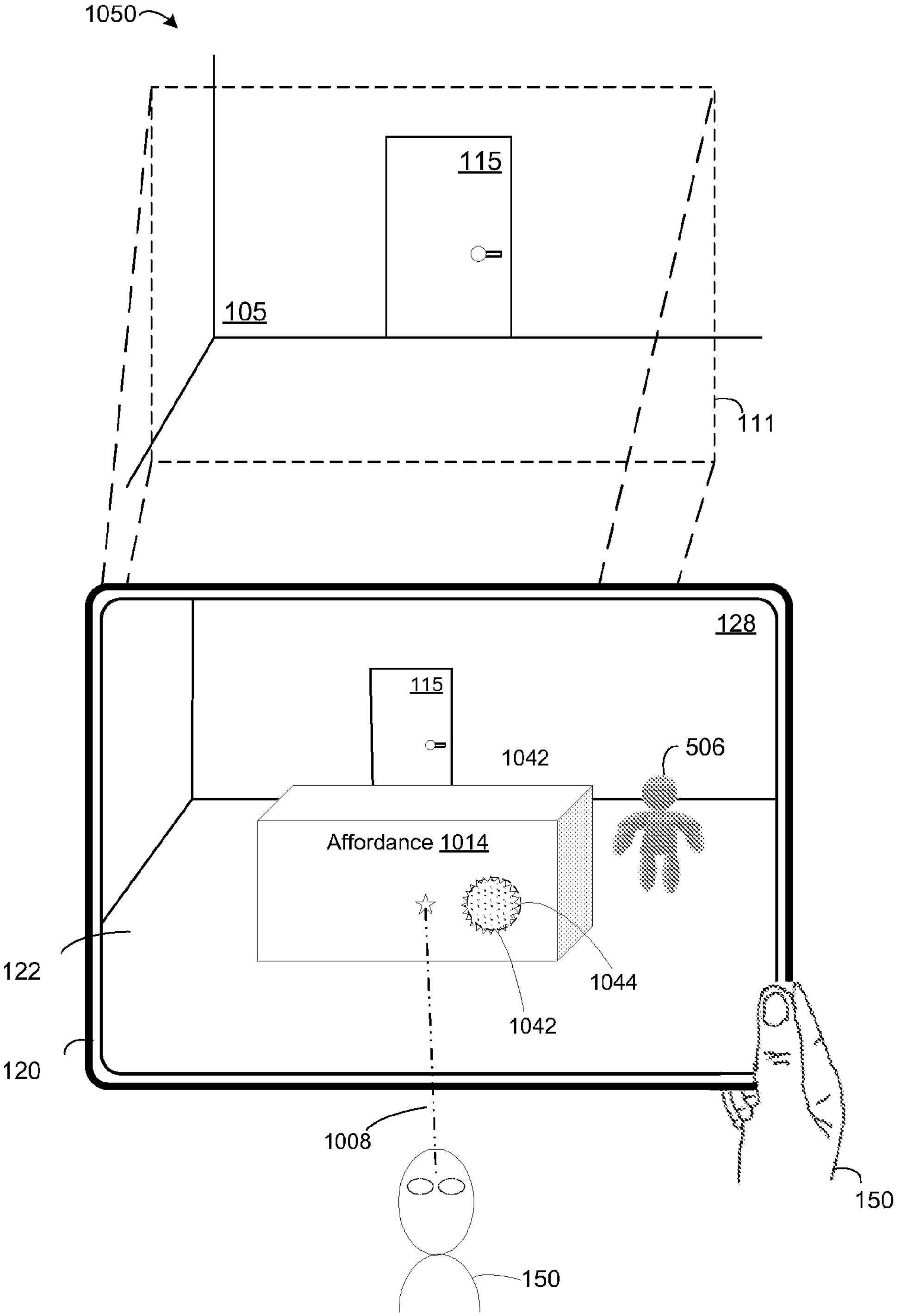
Figure 10F:
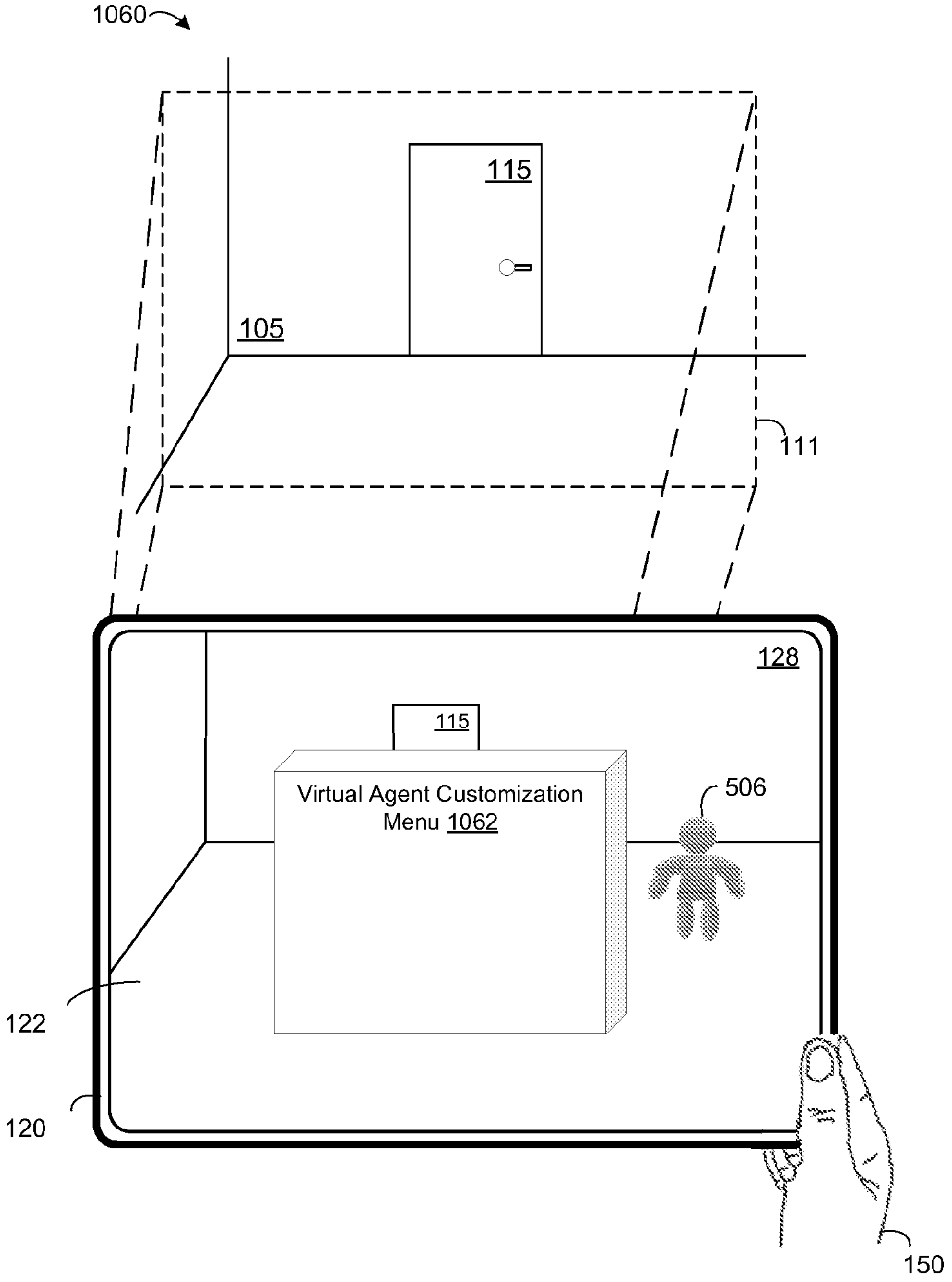
Figure 10G:
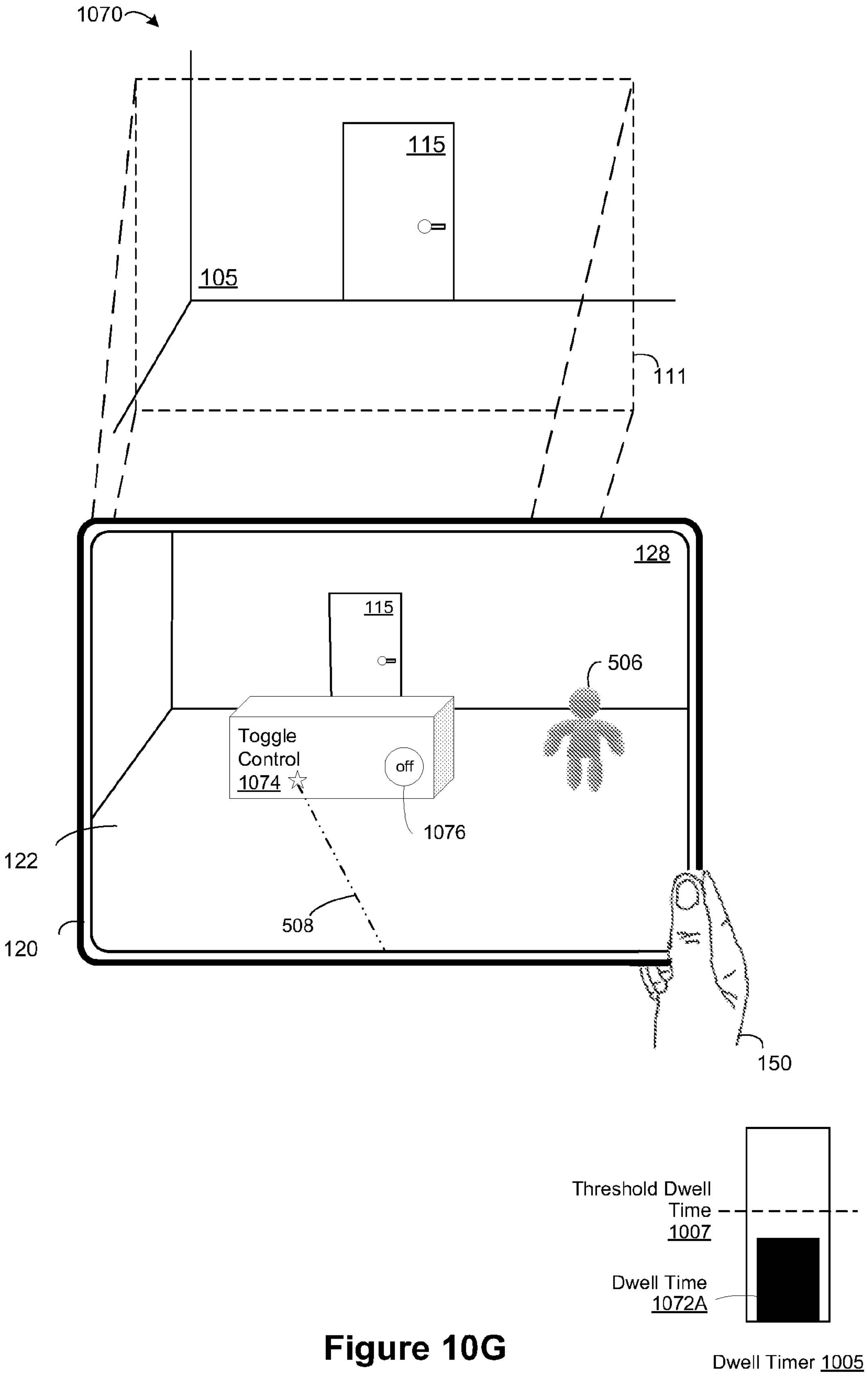
Figure 10H:
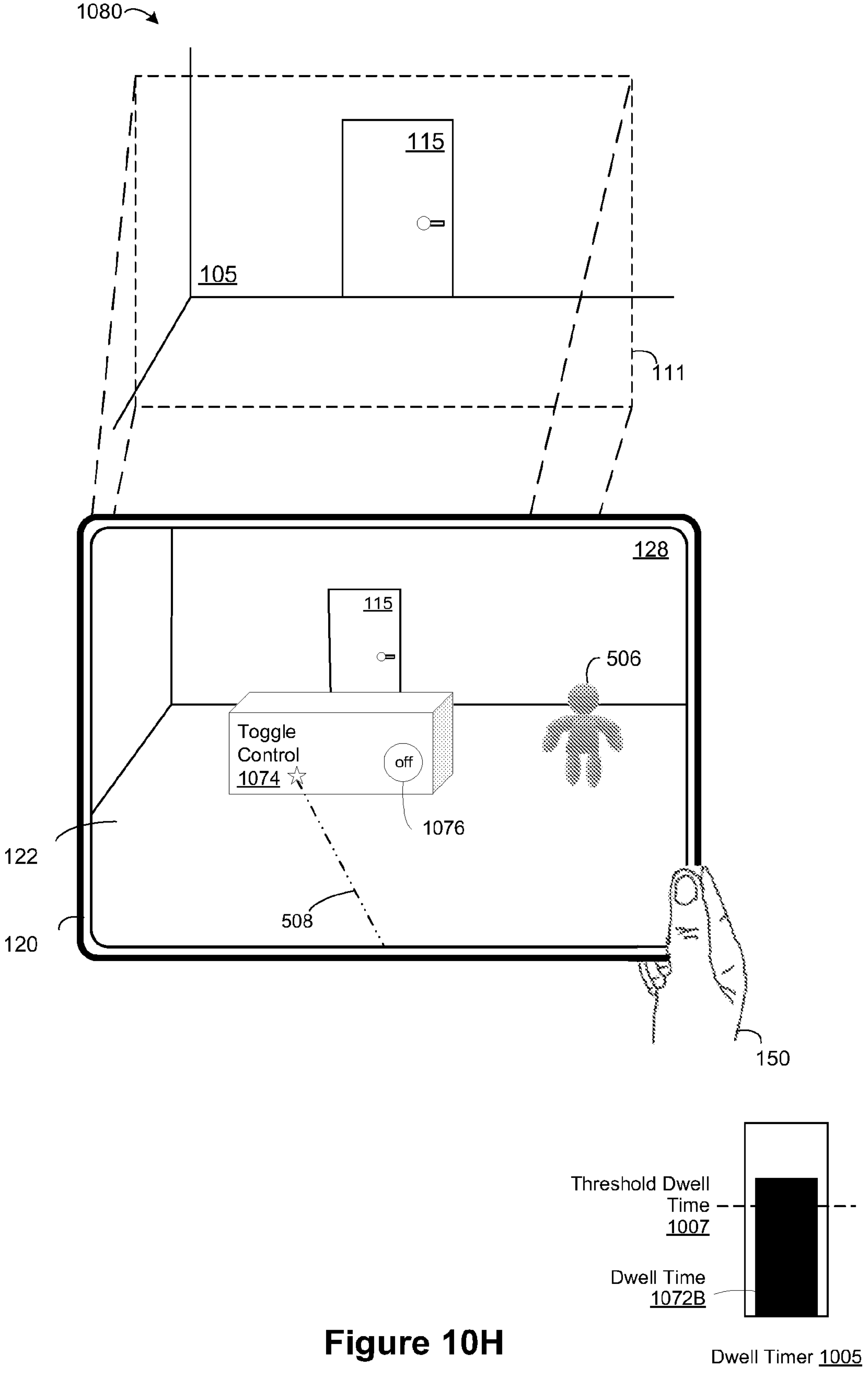
Figure 10I:
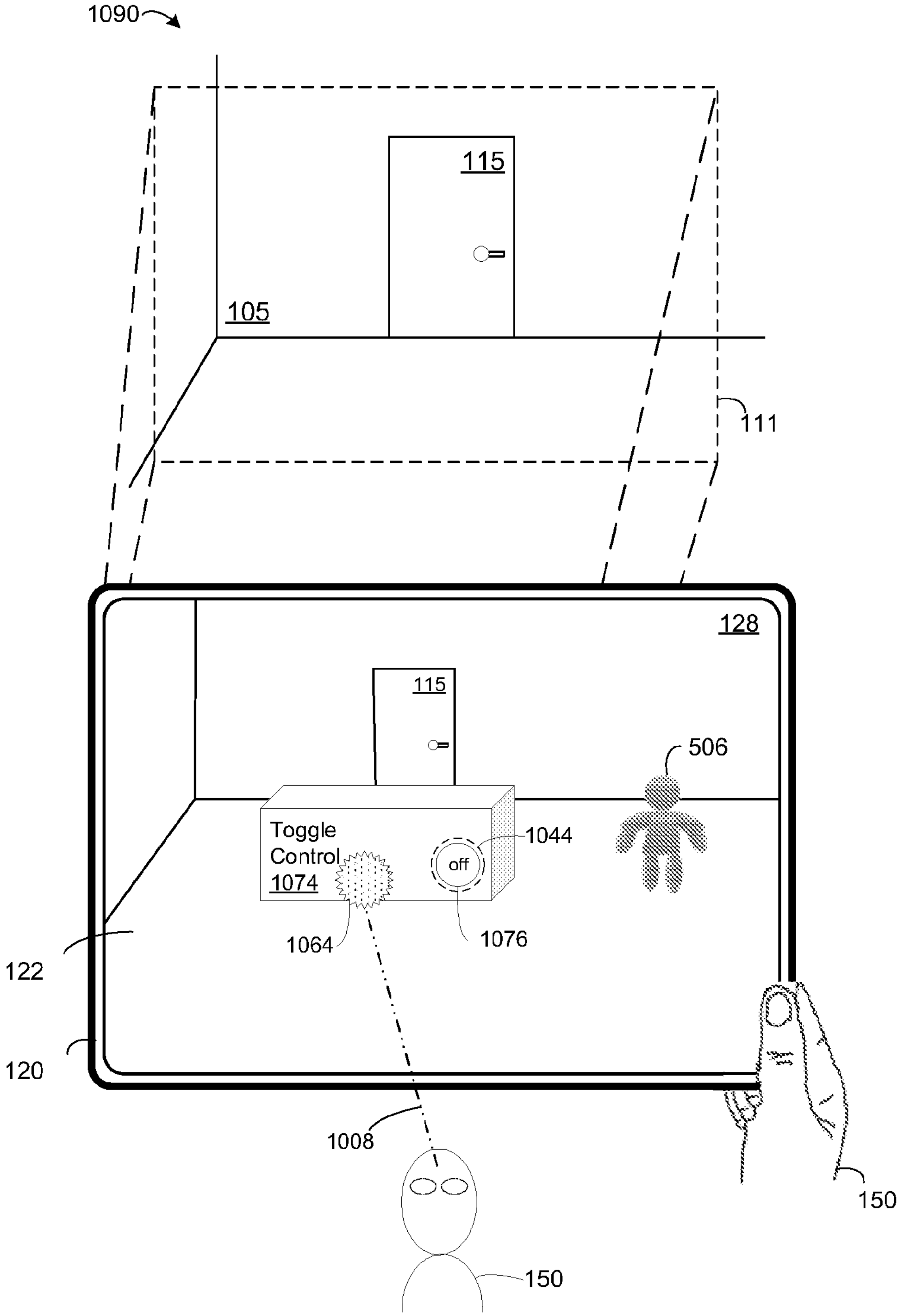
Figure 10J:
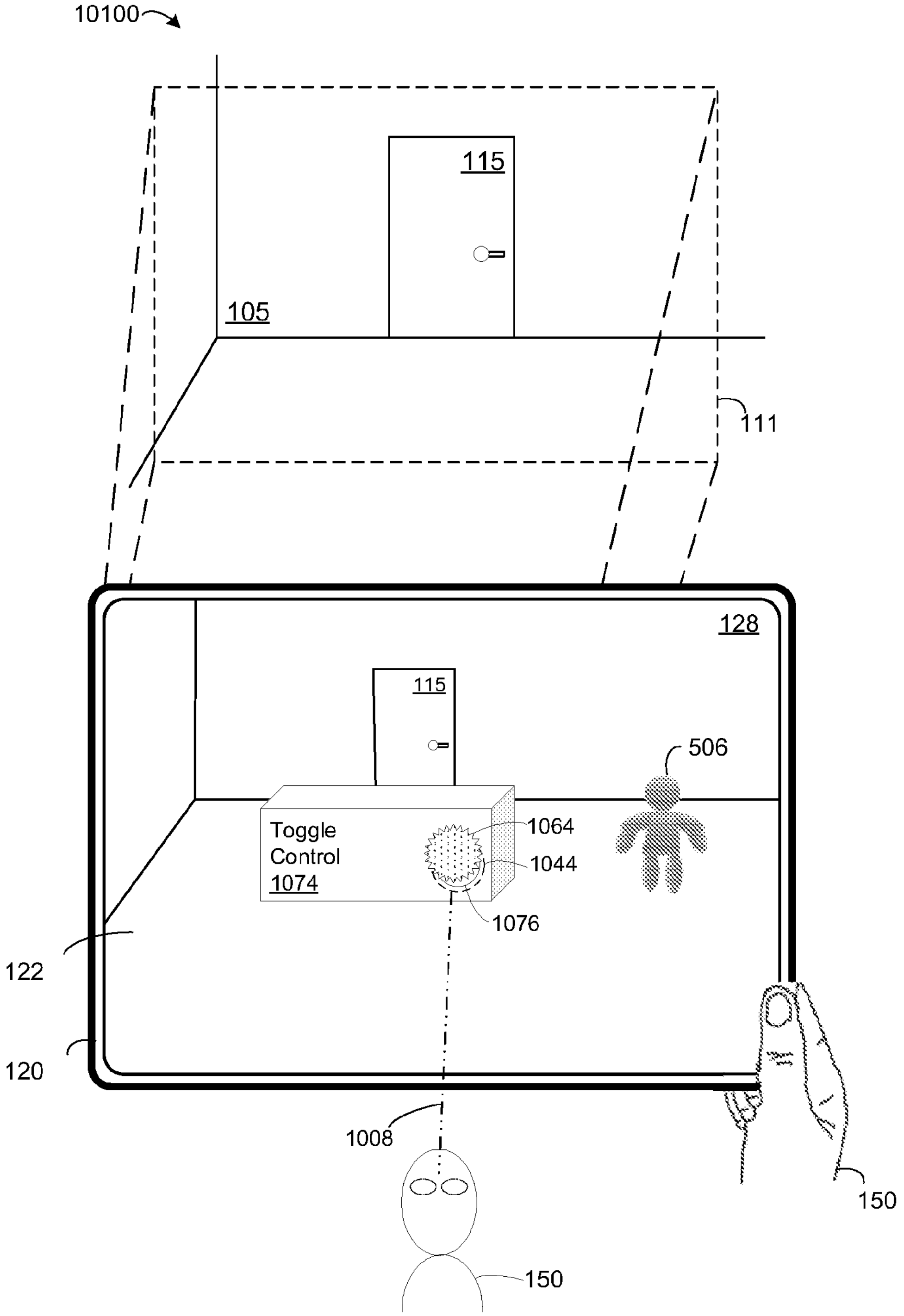
Figure 10K:
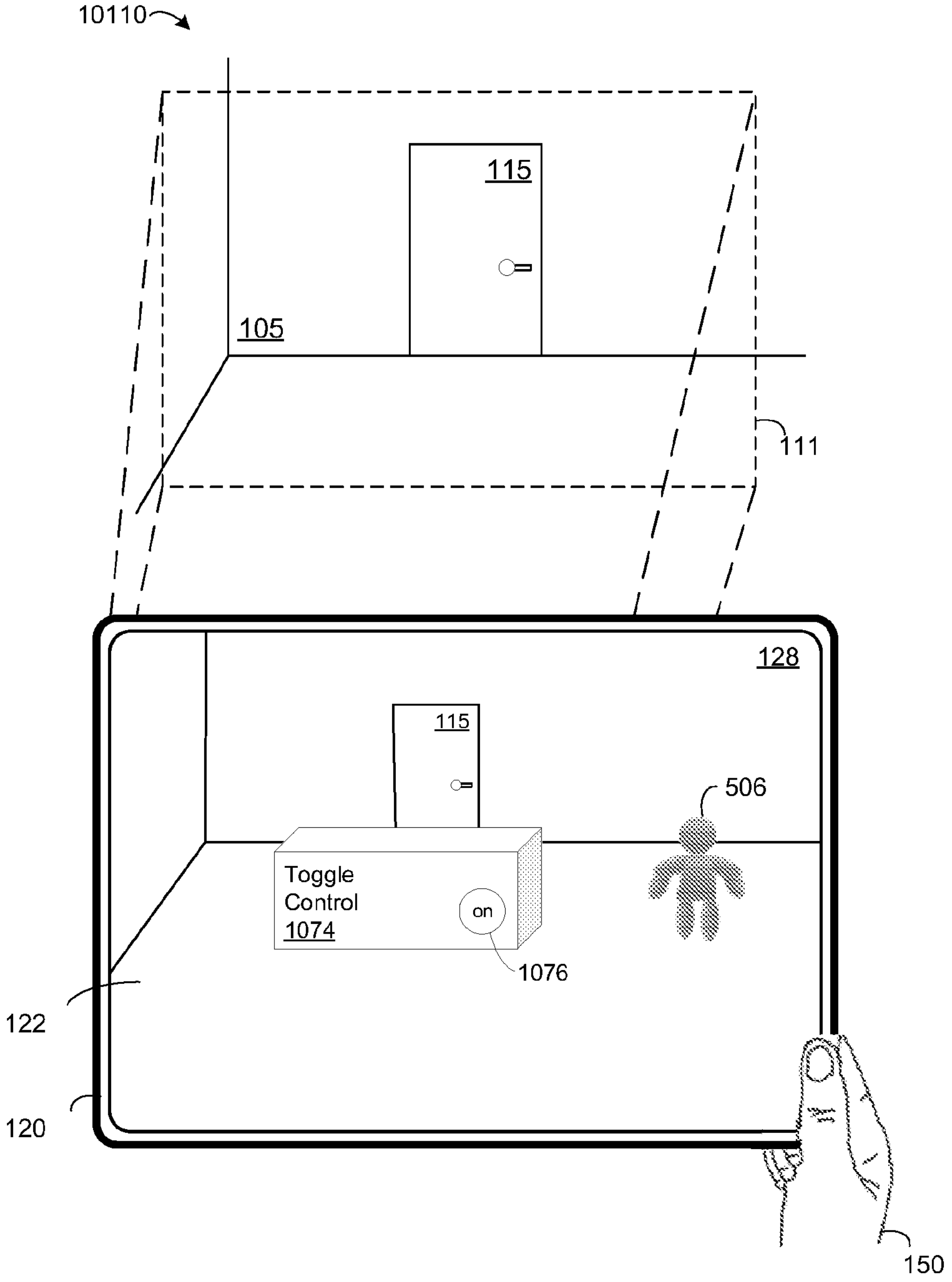
Figure 10L:
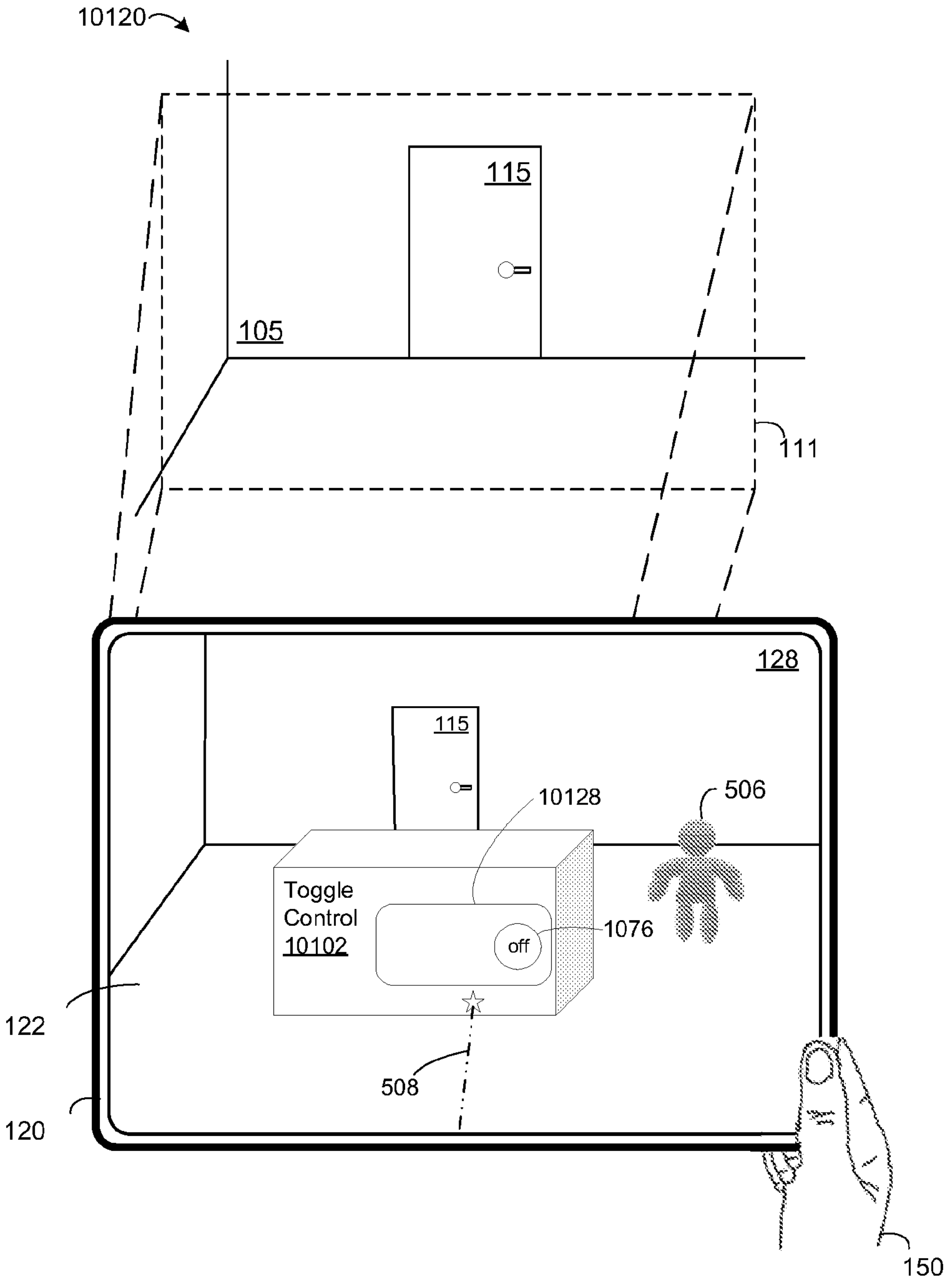
Figure 10L:
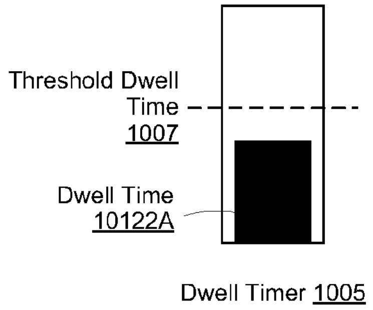
Figure 10M:
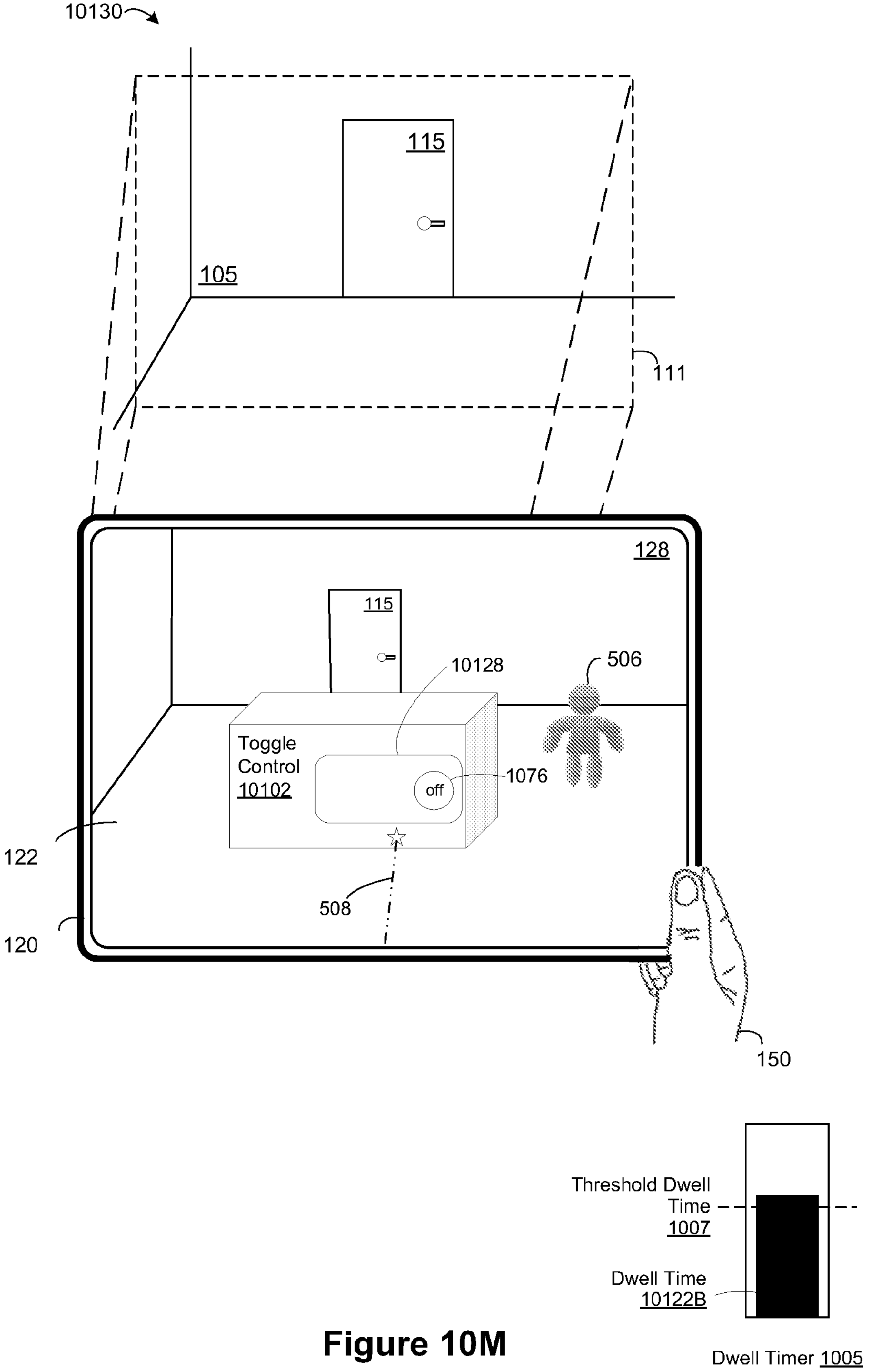
Figure 10N:
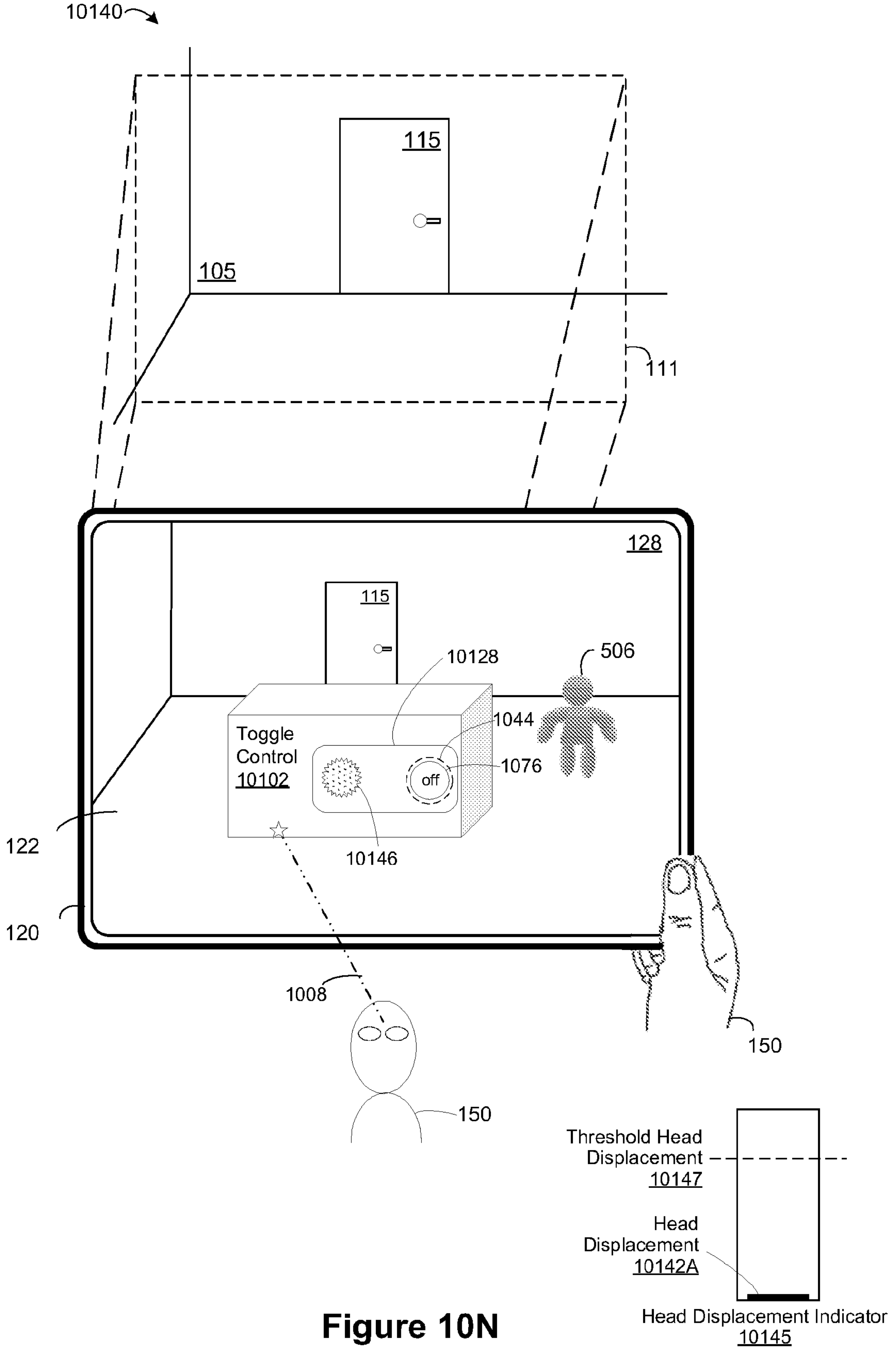
Figure 10O:
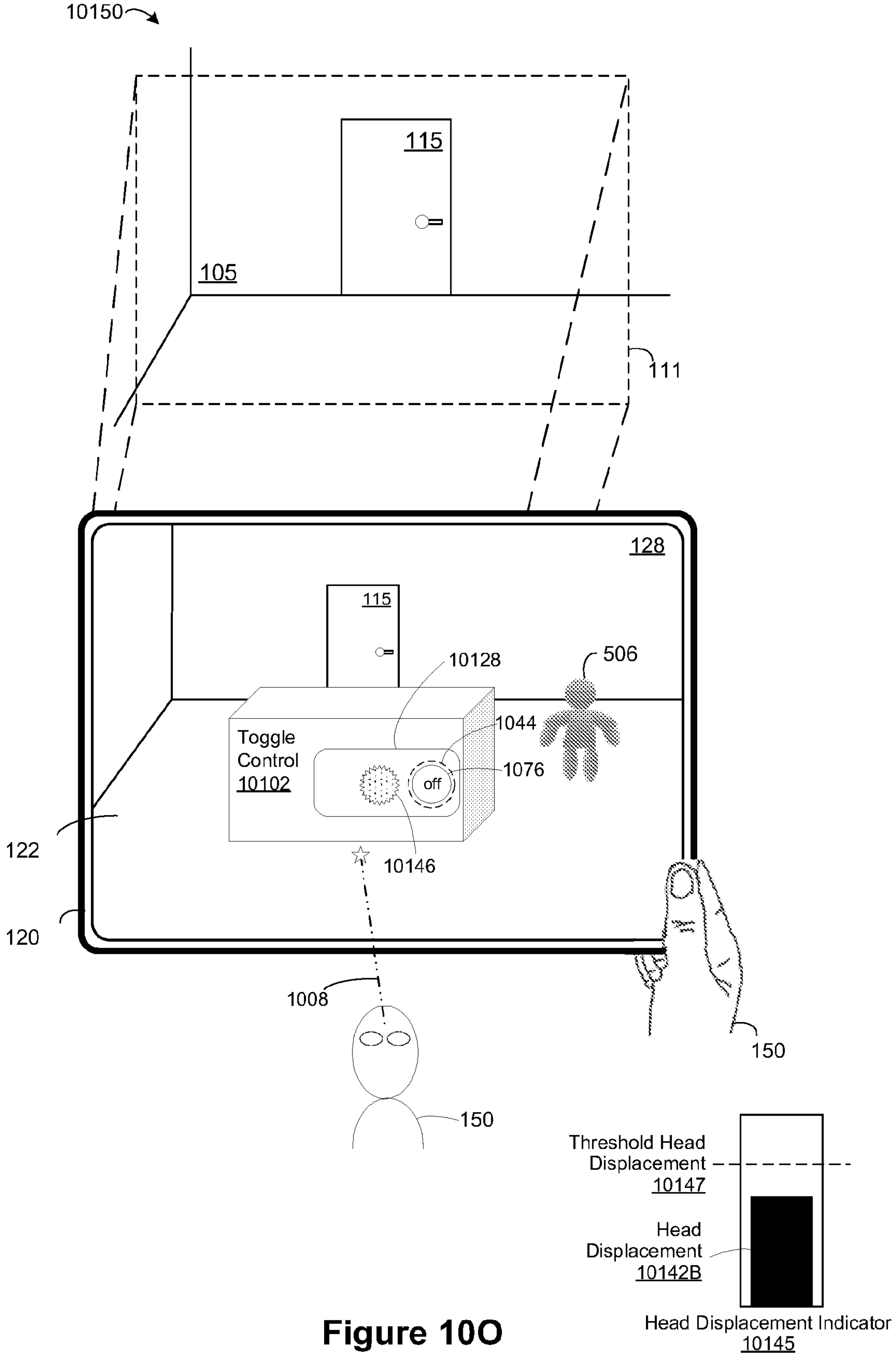
Figure 10P:
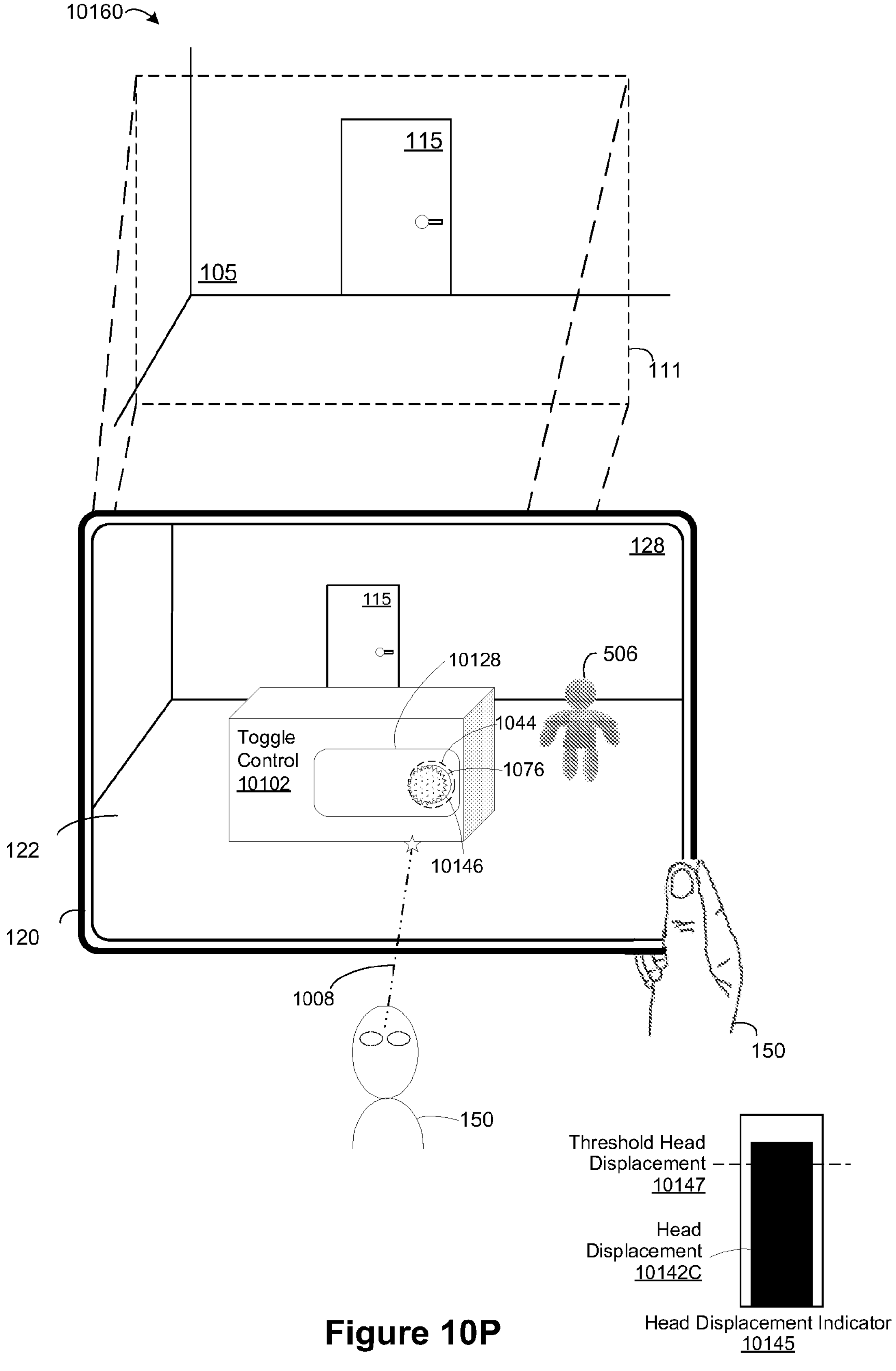
Figure 10Q:
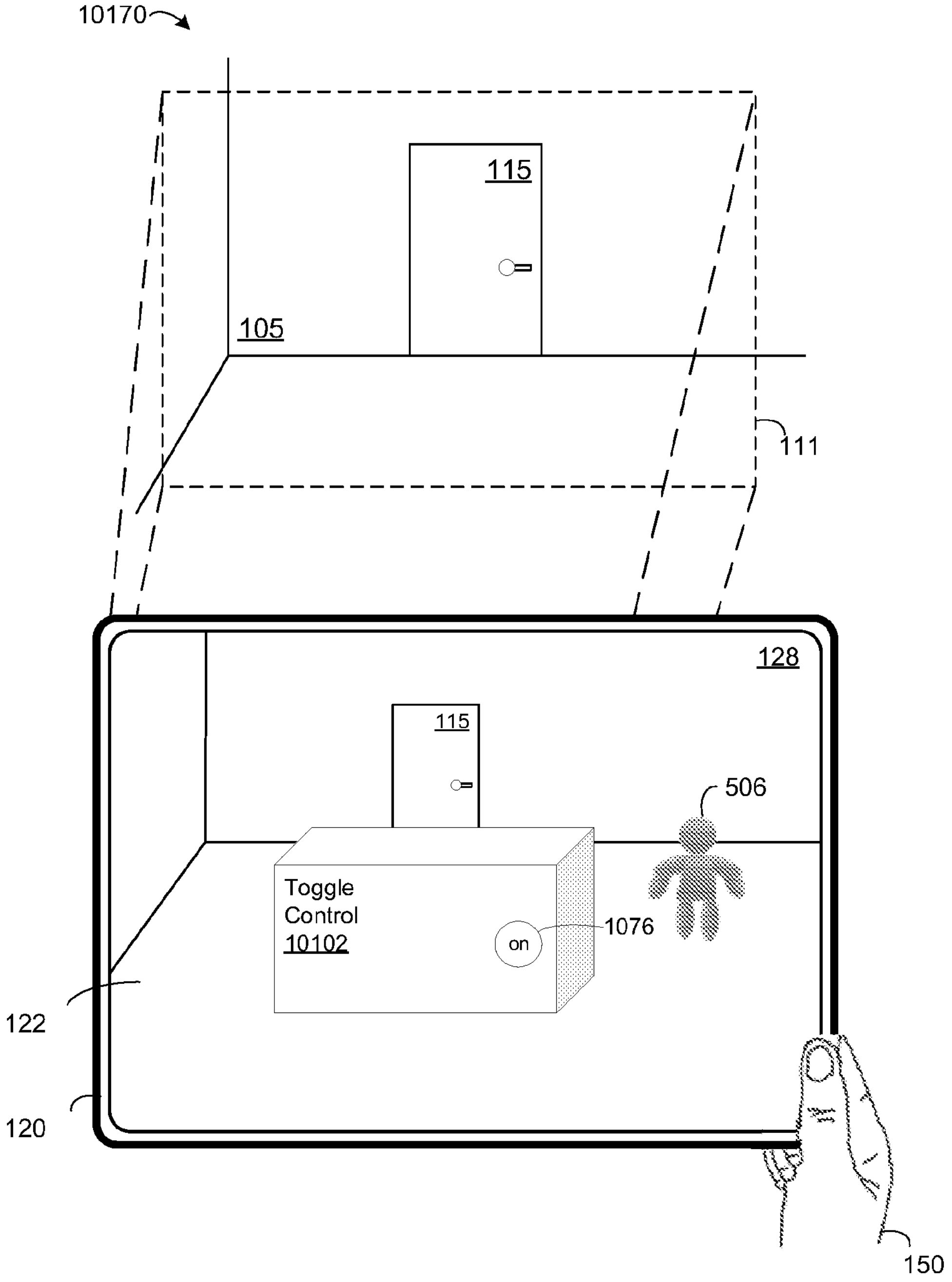

FIGS. 10A-10Q illustrate a sequence of instances 1010-10170 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 1010-10170 are rendered and presented by a computing system such as the controller 110 shown in FIGS. 1 and 2; the electronic device 120 shown in FIGS. 1 and 3: and/or a suitable combination thereof.

As shown in FIGS. 10A-10Q, the content delivery scenario includes a physical environment 105 and an XR environment 128 displayed on the display 122 of the electronic device 120 (e.g., associated with the user 150). The electronic device 120 presents the XR environment 128 to the user 150 while the user 150 is physically present within the physical environment 105 that includes a door 115, which is currently within the FOV 111 of an exterior-facing image sensor of the electronic device 120. As such, in some implementations, the user 150 holds the electronic device 120 in their hand(s) similar to the operating environment 100 in FIG. 1.

In other words, in some implementations, the electronic device 120 is configured to present XR content and to enable optical see-through or video pass-through of at least a portion of the physical environment 105 on the display 122 (e.g., the door 115). For example, the electronic device 120 corresponds to a mobile phone, tablet, laptop, near-eye system, wearable computing device, or the like.

FIGS. 10A-10F illustrate a first sequence of instances associated with activating an affordance 1014 (e.g., an interactive UI element without a persistent state such as a selection affordance, an activation affordance, a button or the like) with a head position indicator 1042. As shown in FIG. 10A, during the instance 1010 (e.g., associated with time T1) of the content delivery scenario, the electronic device 120 presents an XR environment 128 including the VA 506 and an affordance 1014, which, when selected (e.g., with a hand tracking input or a combined gaze and head position input), causes presentation of a VA customization menu 1062 for customizing the appearance, behavior, etc. of the VA 506.

As shown in FIG. 10A, the XR environment 128 also includes a visualization 508 of the gaze direction or gaze vector of the user 150. One of ordinary skill in the art will appreciate that the visualization 508 may be removed in various implementations or replaced with other forms or configurations in various other implementations. As shown in FIG. 10A, during the instance 1010, the visualization 508 of the gaze direction of the user 150 is directed to the affordance 1014. FIG. 10A also illustrates a dwell timer 1005 with a current dwell time 1012A associated a first length of time that the gaze direction of the user 150 has been directed to the affordance 1014. In some implementations, in accordance with a determination that the gaze direction of the user 150 has been directed to the affordance 1014 for at least a threshold dwell time 1007, the electronic device 120 presents a head position indicator 1042 (e.g., as shown in FIG. 10D).

As shown in FIG. 10B, during the instance 1020 (e.g., associated with time $T_2$) of the content delivery scenario, the visualization 508 of the gaze direction of the user 150 remains directed to the affordance 1014. FIG. 10B also illustrates the dwell timer 1005 with a current dwell time 1012B associated a second length of time that the gaze direction of the user 150 has been directed to the affordance 1014, which is greater than the dwell time 1012A in FIG. 10A but still below the threshold dwell time 1007.

As shown in FIG. 10C, during the instance 1030 (e.g., associated with time $T_3$) of the content delivery scenario, the visualization 508 of the gaze direction of the user 150 remains directed to the affordance 1014. FIG. 10C also illustrates the dwell timer 1005 with a current dwell time 1012C associated a third length of time that the gaze direction of the user 150 has been directed to the affordance 1014, which is greater than the dwell time 1012B in FIG. 10B and above the threshold dwell time 1007.

As shown in FIG. 10D, during the instance 1040 (e.g., associated with time $T_4$) of the content delivery scenario, the electronic device 120 presents a head position indicator 1042 at a first location on the affordance 1014 and an activation region 1044 in accordance with a determination that the gaze direction of the user 150 has been directed to the affordance 1014 for at least the threshold dwell time 1007 as shown in FIGS. 10A-10C. As shown in FIG. 10D, the XR environment 128 also includes a visualization 1008 of the head vector of the user 150. In some implementations, the head vector corresponds to a ray emanating from a predefined portion of the head of the user such as their chin, nose, center of forehead, centroid of face, center point between eyes, or the like.

One of ordinary skill in the art will appreciate that the visualization 1008 may be removed in various implementations or replaced with other forms or configurations in various other implementations. As shown in FIG. 10D, during the instance 1040, the visualization 1008 of the head vector of the user 150 is directed to the affordance 1014. In FIG. 10D, for example, the visualization 1008 of the head vector corresponds to a ray emanating from a center of the forehead of the user 150. As shown in FIG. 10D, the first location for the head position indicator 1042 is not collocated with the location at which the head vector intersects the affordance 1014. According to some implementations, the first location for the head position indicator 1042 corresponds to a default location on the affordance 1014 such as the center of the affordance 1014. According to some implementations, the first location for the head position indicator 1042 corresponds to a rotational or positional offset relative to the head vector. According to some implementations, the first location for the head position indicator 1042 corresponds to a rotational or positional offset relative to the gaze vector.

As shown in FIG. 10E, during the instance 1050 (e.g., associated with time $T_5$) of the content delivery scenario, the electronic device 120 presents the head position indicator 1042 at a second location associated with the activation region 1044 (e.g., the selectable region) of the affordance 1014 based on a change to one or more values of the head vector (e.g., displacement in x, y, and/or z positional values or displacement in roll, pitch, and/or yaw rotational values relative to the first location in FIG. 10D). In some implementations, in accordance with a determination that the second location for the head position indicator 1042 coincides with the activation region 1044 of the affordance 1014, the electronic device 120 performs an operation associated with the affordance 1014 such as presenting a VA customization menu 1062 for customizing the appearance, behavior, etc. of the VA 506 (e.g., as shown in FIG. 10F).

According to some implementations, the second location for the head position indicator 1042 coincides with the activation region 1044 (e.g., the selectable region) of the affordance 1014 (e.g., the UI element) in accordance with a determination that at least a portion of the head position indicator 1042 breaches the activation region 1044 (e.g., the selectable region) of the affordance 1014. According to some implementations, the second location for the head position indicator 1042 coincides with the activation region 1044 of the affordance 1014 (e.g., the UI element) in accordance with a determination that the head position indicator 1042 is fully within the activation region 1044.

As shown in FIG. 10F, during the instance 1060 (e.g., associated with time $T_6$) of the content delivery scenario, the electronic device 120 performs the operation associated with the affordance 1014 by presenting the VA customization menu 1062 within the XR environment 128 in accordance with a determination that the second location for the head position indicator 1042 coincides with the activation region 1044 of the affordance 1014 in FIG. 10E.

FIGS. 10G-10K illustrate a second sequence of instances associated with activating a toggle control 1074 or a selectable region 1076 of the toggle control 1074 (e.g., an interactive UI element with a persistent state such as a radio button, a button, or the like) with a head position indicator 1064. As shown in FIG. 10G, during the instance 1070 (e.g., associated with time $T_7$) of the content delivery scenario, the electronic device 120 presents the XR environment 128 including the VA 506 and the toggle control 1074. As shown in FIG. 10G, the toggle control 1074 includes a selectable region 1076 (e.g., a radio button or the like) indicating that an associated feature (e.g., playback of an animation associated with the VA 506 or the like) is currently in an "off" state. In some implementations, the electronic device 120 presents the selectable region 1076 before the dwell timer 1005 has been satisfied. In some implementations, the electronic device 120 presents the selectable region 1076 according to a determination that the dwell timer 1005 has been satisfied.

As shown in FIG. 10G, the XR environment 128 also includes the visualization 508 of the gaze direction or gaze vector of the user 150. One of ordinary skill in the art will appreciate that the visualization 508 may be removed in various implementations or replaced with other forms or configurations in various other implementations. As shown in FIG. 10G, during the instance 1070, the visualization 508 of the gaze direction of the user 150 is directed to the toggle control 1074. FIG. 10G also illustrates the dwell timer 1005 with a current dwell time 1072A associated a first length of time that the gaze direction of the user 150 has been directed to the toggle control 1074. In some implementations, in accordance with a determination that the gaze direction of the user 150 has been directed to the toggle control 1074 for at least a threshold dwell time 1007, the electronic device 120 presents a head position indicator 1064 (e.g., as shown in FIG. 10I).

As shown in FIG. 10H, during the instance 1080 (e.g., associated with time T8) of the content delivery scenario, the visualization 508 of the gaze direction of the user 150 remains directed to the toggle control 1074. FIG. 10H also illustrates the dwell timer 1005 with a current dwell time 1072B associated a second length of time that the gaze direction of the user 150 has been directed to the toggle control 1074, which is greater than the dwell time 1072A in FIG. 10A and above the threshold dwell time 1007.

As shown in FIG. 10I, during the instance 1090 (e.g., associated with time T9) of the content delivery scenario, the electronic device 120 presents a head position indicator 1064 at a first location on the toggle control 1074 in accordance with a determination that the gaze direction of the user 150 has been directed to the toggle control 1074 for at least the threshold dwell time 1007 as shown in FIGS. 10G and 10H. As shown in FIG. 10I, the electronic device 120 also presents an optional visualization for an activation region 1044 surrounding the selectable region 1076 to indicate its selectable nature as well as a size of its collider/hit region in accordance with a determination that the gaze direction of the user 150 has been directed to the toggle control 1074 for at least the threshold dwell time 1007 as shown in FIGS. 10G and 10H.

As shown in FIG. 10I, the XR environment 128 also includes a visualization 1008 of the head vector of the user 150. One of ordinary skill in the art will appreciate that the visualization 1008 may be removed in various implementations or replaced with other forms or configurations in various other implementations. As shown in FIG. 10I, during the instance 1090, the visualization 1008 of the head vector of the user 150 is directed to the toggle control 1074. In FIG. 10I, for example, the visualization 1008 of the head vector corresponds to a ray emanating from a center of the forehead of the user 150. As shown in FIG. 10I, the first location for the head position indicator 1064 is collocated with the location at which the head vector intersects the toggle control 1074. As such, in some implementations, the head position indicator 1064 tracks the head vector as shown in FIGS. 101 and 10J.

As shown in FIG. 10J, during the instance 10100 (e.g., associated with time $T_{10}$) of the content delivery scenario, the electronic device 120 presents the head position indicator 1064 at a second location within the activation region 1044 of the toggle control 1074 based on a change to one or more values of the head vector (e.g., displacement in x, y, and/or z positional values relative to the first location in FIG. 10I). In some implementations, in accordance with a determination that the second location for the head position indicator 1064 coincides with the selectable region 1076 of the toggle control 1074 (or is within the activation region 1044), the electronic device 120 performs an operation associated with the toggle control 1074 (or a portion thereof) such as toggling on/off the radio button or the like (e.g., as shown in FIG. 10K).

As shown in FIG. 10K, during the instance 10110 (e.g., associated with time $T_{11}$) of the content delivery scenario, the electronic device 120 performs the operation associated with the toggle control 1074 (or a portion thereof) (e.g., toggling the radio button from the “off” state to the “on” state) in accordance with a determination that the second location for the head position indicator 1064 coincides with the selectable region 1076 of the toggle control 1074 (or is within the activation region 1044) in FIG. 10J.

FIGS. 10L-10Q illustrate a third sequence of instances associated with activating a toggle control 10102 or a selectable region 1076 of the toggle control 10102 (e.g., an interactive UI element with a persistent state such as a radio button, a button, or the like) with a head position indicator 10146 constrained to a bounding box 10128. As shown in FIG. 10L, during the instance 10120 (e.g., associated with time $T_{12}$) of the content delivery scenario, the electronic device 120 presents the XR environment 128 including the VA 506 and the toggle control 10102. As shown in FIG. 10L, the toggle control 10102 includes a selectable region 1076 (e.g., a radio button or the like) within a bounding box 10128, wherein the selectable region 1076 indicates that an associated feature (e.g., playback of an animation associated with the VA 506 or the like) is currently in an “off” state.

In some implementations, the electronic device 120 presents the selectable region 1076 before the dwell timer 1005 has been satisfied. In some implementations, the electronic device 120 presents the selectable region 1076 according to a determination that the dwell timer 1005 has been satisfied. In some implementations, the electronic device 120 presents the bounding box 10128 within the XR environment 128 before the dwell timer 1005 has been satisfied. In some implementations, the electronic device 120 presents the bounding box 10128 within the XR environment 128 according to a determination that the dwell timer 1005 has been satisfied.

As shown in FIG. 10L, the XR environment 128 also includes the visualization 508 of the gaze direction or gaze vector of the user 150. One of ordinary skill in the art will appreciate that the visualization 508 may be removed in various implementations or replaced with other forms or configurations in various other implementations. As shown in FIG. 10L, during the instance 10120, the visualization 508 of the gaze direction of the user 150 is directed to the toggle control 10102. FIG. 10L also illustrates the dwell timer 1005 with a current dwell time 10122A associated a first length of time that the gaze direction of the user 150 has been directed to the toggle control 10102. In some implementations, in accordance with a determination that the gaze direction of the user 150 has been directed to the toggle control 10102 for at least a threshold dwell time 1007, the electronic device 120 presents a head position indicator 10146 within the bounding box 10128 (e.g., as shown in FIG. 10N).

As shown in FIG. 10M, during the instance 10130 (e.g., associated with time $T_{13}$) of the content delivery scenario, the visualization 508 of the gaze direction of the user 150 remains directed to the toggle control 10102. FIG. 10M also illustrates the dwell timer 1005 with a current dwell time 10122B associated a second length of time that the gaze direction of the user 150 has been directed to the toggle control 10102, which is greater than the dwell time 10122A in FIG. 10N and above the threshold dwell time 1007.

As shown in FIG. 10N, during the instance 10140 (e.g., associated with time $T_{14}$) of the content delivery scenario, the electronic device 120 presents a head position indicator 10146 at a first location within the bounding box 10128 of the toggle control 10102 in accordance with a determination that the gaze direction of the user 150 has been directed to the toggle control 10102 for at least the threshold dwell time 1007 as shown in FIGS. 10L and 10M. As shown in FIG. 10N, the electronic device 120 also presents an optional visualization for an activation region 1044 surrounding the selectable region 1076 to indicate its selectable nature as well as a size of its collider/hit region in accordance with a determination that the gaze direction of the user 150 has been directed to the toggle control 10102 for at least the threshold dwell time 1007 as shown in FIGS. 10L and 10M. According to some implementations, the head position indicator 10146 is constrained to the bounding box 10128 and movable based on a change in one or more values of the head vector (e.g., change of head rotational values such as angular yaw displacement). As such, in these implementations, changes to one or more values of the head vector in other directions may be ignored (e.g., change of head rotational values such as angular pitch displacement).

FIG. 10N also illustrates a head displacement indicator 10145 with a current head displacement value 10142A, which corresponds to an angular difference between a current yaw value associated with the head vector and an origin yaw value. In this example, the head displacement value 10142A is near zero. In some implementations, in accordance with a determination that the head displacement value (e.g., a magnitude of the change to the yaw value of the head vector) is above a threshold head displacement 10147 (e.g., a displacement criterion), the electronic device 120 performs an operation associated with the toggle control 10102 such as toggling on/off the radio button or the like (e.g., as shown in FIG. 10Q).

As shown in FIG. 10O, during the instance 10150 (e.g., associated with time $T_{15}$) of the content delivery scenario, the electronic device 120 presents the head position indicator 10146 at a second location within the bounding box 10128 of the toggle control 10102 based on a change to the one or more values of the head vector (e.g., a change to the yaw value of the head vector relative to FIG. 10N). FIG. 10O also illustrates the head displacement indicator 10145 with a current head displacement value 10142B based on the change to the one or more values of the head vector, which is greater than the head displacement value 10142A in FIG. 10N but still below the threshold head displacement 10147.

As shown in FIG. 10P, during the instance 10160 (e.g., associated with time $T_{16}$) of the content delivery scenario, the electronic device 120 presents the head position indicator 10146 at a third location within the bounding box 10128 of the toggle control 10102 based on a change to the one or more values of the head vector (e.g., a change to the yaw value of the head vector relative to FIG. 10O). FIG. 10P also illustrates the head displacement indicator 10145 with a current head displacement value 10142C based on the change to the one or more values of the head vector, which is greater than the head displacement value 10142B in FIG. 10O and above the threshold head displacement 10147.

As shown in FIG. 10Q, during the instance 10170 (e.g., associated with time $T_{17}$) of the content delivery scenario, the electronic device 120 performs the operation associated with the toggle control 10102 (or a portion thereof) (e.g., toggling the radio button from the "off" state to the "on" state) in accordance with a determination that the head displacement value 10142C in FIG. 10P (e.g., a magnitude of the change to the yaw value of the head vector over FIGS. 10N-10P) is above the threshold head displacement 10147 (e.g., the displacement criterion).

Figure 11A:
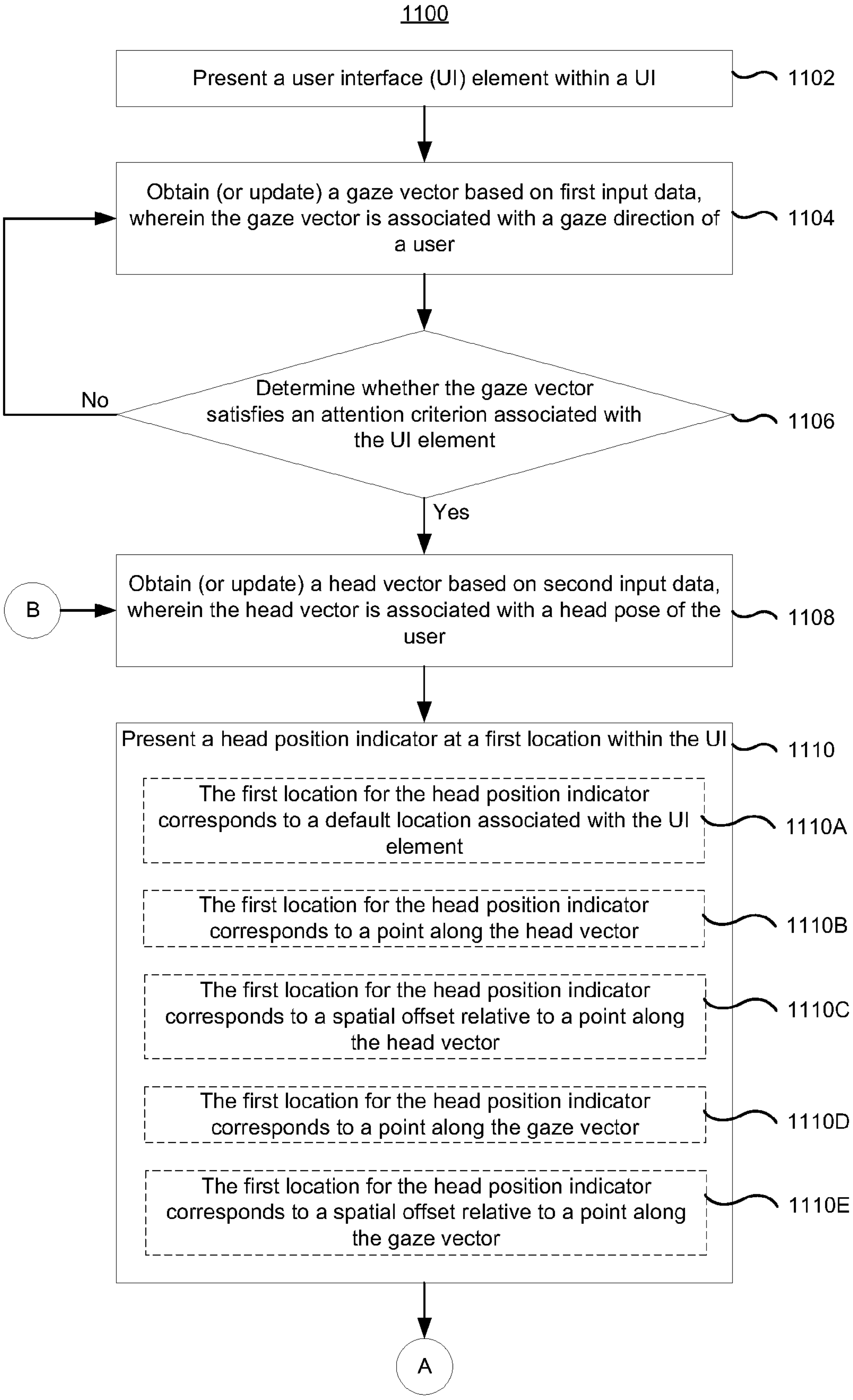
FIGS. 11A and 11B illustrate a flowchart representation of a method of visualizing multi-modal inputs in accordance with some implementations.
Figure 11B:
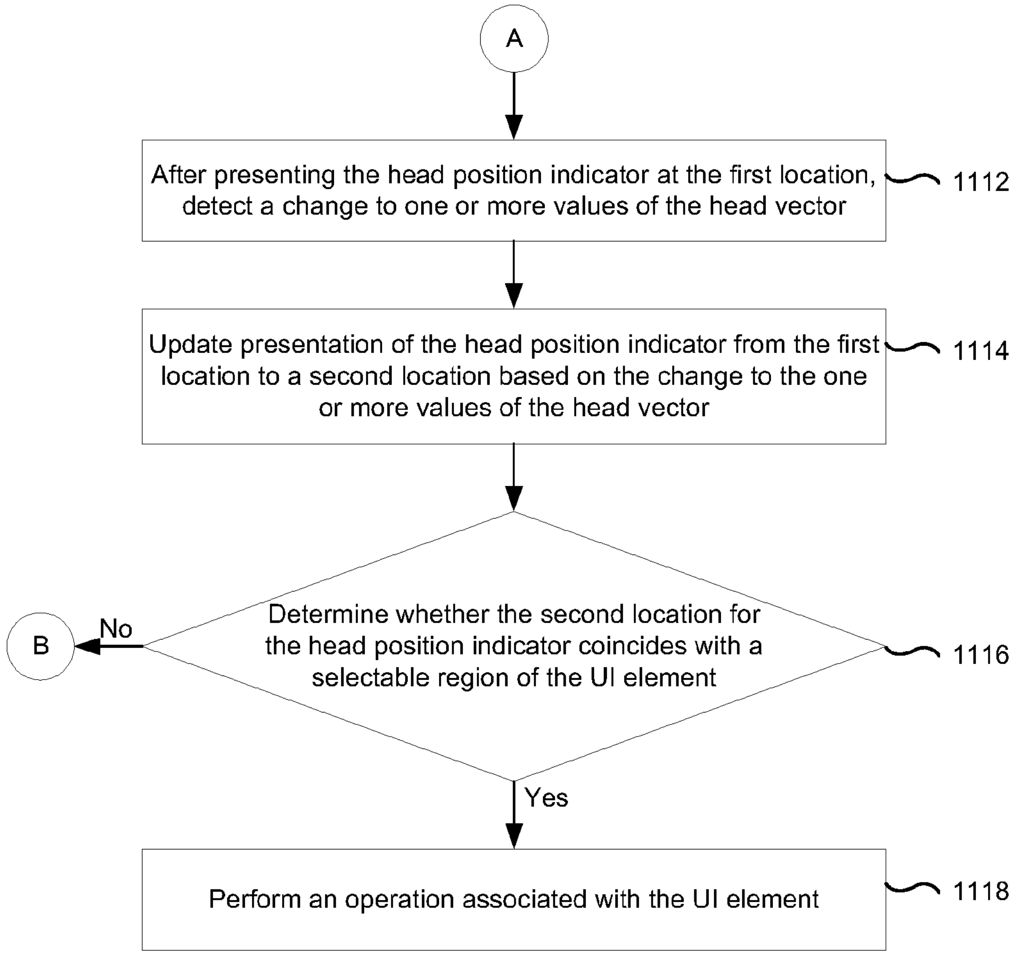

FIGS. 11A and 11B illustrate a flowchart representation of a method 1100 of visualizing multi-modal inputs in accordance with some implementations. In various implementations, the method 1100 is performed at a computing system including non-transitory memory and one or more processors, wherein the computing system is communicatively coupled to a display device and one or more input devices (e.g., the electronic device 120 shown in FIGS. 1 and 3: the controller 110 in FIGS. 1 and 2; or a suitable combination thereof). In some implementations, the method 1100 is performed by processing logic, including hardware, firmware, software, or a combination thereof. In some implementations, the method 1100 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

Various scenarios involve selecting a user interface element based on gaze direction and/or the like. However, using gaze alone as an input modality, which is inherently jittery and inaccurate, may lead to false positives when interacting with a user interface (UI) and also with UI elements therein. As such, in various implementations, when a gaze direction satisfies a dwell timer, a head position indicator is provided which may directly track a current head vector or indirectly track the current head vector with some offset therebetween. Thereafter, the head position indicator may be used as a cursor to activate user interface elements and/or otherwise interact with an XR environment. As such, as described herein, a user may activate a UI element and/or otherwise interact with the UI using a head position indicator (e.g., a head position cursor or focus indicator) that surfaces in response to satisfying a gaze-based dwell timer associated with the UI element.

As represented by block 1102, the method 1100 includes presenting, via the display device, a user interface (UI) element within a UI. For example, the UI element includes one or more selectable regions such as a selectable affordance, an activation affordance, a radio button, a slider, a knob/dial, and/or the like. As one example, FIGS. 10A-10F illustrate a sequence of instances in which the electronic device 120 presents an affordance 1014 which, when selected (e.g., with a hand tracking input or a combined gaze and head position input), causes presentation of a VA customization menu 1062 for customizing the appearance, behavior, etc. of the VA 506 (e.g., as shown in FIG. 10F). As another example, FIGS. 10G-10K illustrate a sequence of instances in which the electronic device 120 presents a toggle control 1074 (e.g., the UI element) with a selectable region 1076 (e.g., a radio button or the like) indicating that an associated feature (e.g., playback of an animation associated with the VA 506 or the like) is currently in an "off" state. As yet another example, FIGS. 10L-10Q illustrate a sequence of instances in which the electronic device 120 presents a toggle control 10102 with the selectable region 1076 (e.g., a radio button or the like) within a bounding box 10128, wherein the selectable region 1076 indicates that an associated feature (e.g., playback of an animation associated with the VA 506 or the like) is currently in an "off" state.

In some implementations, the UI element is presented within an extended reality (XR) environment. As shown in FIGS. 10A-10F, for example, the electronic device 120 presents the affordance 1014 (e.g., the UI element) within the XR environment 128, which is overlaid on or composited with the physical environment 105. As shown in FIGS. 10G-10K, for example, the electronic device 120 presents the toggle control 1074 (e.g., the UI element) within the XR environment 128, which is overlaid on or composited with the physical environment 105. In some implementations, the UI element is associated with XR content that is also overlaid on or composited with the physical environment. In some implementations, the display device includes a transparent lens assembly, and wherein the XR environment is projected onto the transparent lens assembly. In some implementations, the display device includes a near-eye system, and wherein presenting the XR environment includes compositing the XR environment with one or more images of a physical environment captured by an exterior-facing image sensor.

For example, the UI element is operable to perform an operation on the XR content, manipulate the XR content, animate the XR content, change/modify the XR content, and/or the like. In some implementations, the UI element is one of world-locked (e.g., anchored to a physical object in the physical environment 105), body-locked (e.g., anchored to a predefined portion of the user's body), and/or the like. As one example, if the UI element is world-locked, the UI element remains anchored to a physical object or a point within the physical environment 105 when the user 150 locomotes about the physical environment 105.

As represented by block 1104, the method 1100 includes obtaining (e.g., receiving, retrieving, or generating/determining) a gaze vector based on first input data from the one or more input devices, wherein the gaze vector is associated with a gaze direction of a user. In some implementations, as represented by block 1104, the method 1100 includes updating a pre-existing gaze vector based on the first input data from the one or more input devices, wherein the gaze vector is associated with the gaze direction of the user. For example, with reference to FIG. 4A, the computing system or a component thereof (e.g., the eye tracking engine 412) obtains (e.g., receives, retrieves, or determines/generates) an eye tracking vector 413 (sometimes also referred to herein as a "gaze vector" or a "gaze direction") as shown in FIG. 4B based on the input data and updates the eye tracking vector 413 over time.

For example, FIG. 10A includes a visualization 508 of the gaze direction or gaze vector of the user 150. One of ordinary skill in the art will appreciate that the visualization 508 may be removed in various implementations or replaced with other forms or configurations in various other implementations.

For example, the first input data corresponds to images from one or more image sensors or eye tracking cameras integrated with or separate from the computing system. In some implementations, the computing system includes an eye tracking engine that maintains the gaze vector (sometimes also referred to herein as an "eye tracking vector") based on images that include the pupils of the user from one or more interior-facing image sensors. In some implementations, the gaze vector corresponds to an intersection of rays emanating from each of the eyes of the user or a ray emanating from a center point between the user's eyes.

As represented by block 1106, the method 1100 includes determining whether the gaze satisfies an attention criterion associated with the UI element. In some implementations, the attention criterion is satisfied according to a determination that the gaze vector satisfies an accumulator threshold associated with the UI element. In some implementations, the attention criterion is satisfied according to a determination that the gaze vector is directed to the UI element for at least a threshold time period. As one example, the threshold time period corresponds to a predefined dwell timer. As another example, the threshold time period corresponds to a non-deterministic dwell timer that is dynamically determined based on user preferences, usage information, eye gaze confidence, and/or the like. For example, FIG. 10A also illustrates a dwell timer 1005 with a current dwell time 1012A associated a first length of time that the gaze direction of the user 150 has been directed to the toggle control 1074.

If the gaze vector satisfies the attention criterion associated with the UI element ("Yes" branch from block 1106), the method 1100 continues to block 1108. If the gaze vector does not satisfy the attention criterion associated with the UI element ("No" branch from block 1106), the method 1100 continues to block 1104 and updates the gaze vector for a next frame, instance, iteration, time period, cycle, or the like. As such, in some implementations, in accordance with the determination that the gaze vector does not satisfy the attention criterion associated with the UI element, the method 1100 includes forgoing presenting the head position indicator at the first location.

As represented by block 1108, in accordance with the determination that the gaze vector satisfies the attention criterion associated with the UI element, the method 1100 includes obtaining (e.g., receiving, retrieving, or generating/determining) a head vector based on second input data from the one or more input devices, wherein the head vector is associated with a head pose of the user. In some implementations, as represented by block 1108, the method 1100 includes updating a pre-existing head vector based on the input data from the one or more input devices, wherein the head vector is associated with a head pose of the user. In some implementations, the method 1100 includes updating at least one of the gaze vector or the head vector in response to a change in the input data from the one or more input devices. For example, with reference to FIG. 4A, the computing system or a component thereof (e.g., the body/head pose tracking engine 414) obtains (e.g., receives, retrieves, or determines/generates) a head vector associated with the pose characterization vector 415 shown in FIG. 4B based on the input data and updates the head vector over time.

For example, the second input data corresponds to IMU data, accelerometer data, gyroscope data, magnetometer data, image data, etc. from sensors integrated with or separate from the computing system. In some implementations, the head vector corresponds to a ray emanating from a predefined portion of the head of the user such as their chin, nose, center of forehead, centroid of face, center point between eyes, or the like. For example, FIG. 10D includes a visualization 1008 of the head vector of the user 150. One of ordinary skill in the art will appreciate that the visualization 1008 may be removed in various implementations or replaced with other forms or configurations in various other implementations.

In some implementations, the computing system obtains the first and second input data from at least one overlapping sensor. In some implementations, the computing system obtains the first and second input data from different sensors. In some implementations, the first and second input data include overlapping data. In some implementations, the first and second input data include mutually exclusive data.

As represented by block 1110, in accordance with the determination that the gaze vector satisfies the attention criterion associated with the UI element, the method 1100 includes presenting, via the display device, a head position indicator at a first location within the UI. For example, with reference to FIG. 4A, the computing system or a component thereof (e.g., the focus visualizer 432) obtains (e.g., receives, retrieves, or determines/generates) a head position indicator based on a head vector associated with the pose characterization vector 415 when the gaze direction (e.g., the eye tracking vector 413 in FIG. 4B also referred to herein as a "gaze vector") satisfies a threshold time period relative to a UI element. In some implementations, the computing system presents the head position indicator in accordance with the determination that the gaze vector lingers on the UI element (or a volumetric region associated therewith) for at least the threshold time period.

As one example, with reference to FIG. 10D, the electronic device 120 presents a head position indicator 1042 at a first location on the affordance 1014 in accordance with a determination that the gaze direction of the user 150 has been directed to the affordance 1014 for at least the threshold dwell time 1007 as shown in FIGS. 10A-10C. As another example, with reference to FIG. 10I, the electronic device 120 presents a head position indicator 1064 at a first location on the toggle control 1074 in accordance with a determination that the gaze direction of the user 150 has been directed to the toggle control 1074 for at least the threshold dwell time 1007 as shown in FIGS. 10G and 10H.

In some implementations, the head position indicator corresponds to XR content presented within the XR environment. In some implementations, the computing system presents the head position indicator at a default location relative to the UI element such as the center of the UI element, an edge of the UI element, or the like. In some implementations, the computing system presents the head position indicator at a location where the head vector intersects with the UI element or another portion of the UI. Thus, for example, the head position indicator may start outside of or exit a volumetric region associated with the UI element.

In some implementations, the computing system ceases display of the head position indicator according to a determination that a disengagement criterion has been satisfied. As one example, the disengagement criterion is satisfied when the gaze vector is no longer directed to the UI element (e.g., quick deselection, but may accidentally trigger with jittery gaze tracking). As another example, the disengagement criterion is satisfied when the gaze vector is no longer directed to the UI element for at least the threshold time period. As yet another example, the disengagement criterion is satisfied when the gaze vector no longer fulfills an accumulator threshold for the UI element.

According to some implementations, as represented by block 1110A, the first location for the head position indicator corresponds to a default location associated with the UI element. As one example, the default location corresponds to a center or centroid of the UI element. As another example, the default location corresponds to an edge of the UI element. As shown in FIG. 10D, the first location for the head position indicator 1042 is not collocated with the location at which the head vector intersects the toggle control 1074. As one example, the first location for the head position indicator 1042 in FIG. 10D corresponds to a default location on the toggle control 1074 such as the center of the toggle control 1074.

According to some implementations, as represented by block 1110B, the first location for the head position indicator corresponds to a point along the head vector. In some implementations, the head position indicator tracks the head vector. For example, while the head vector is directed to the UI element, the first location corresponds to an intersection between the head vector and the UI element. As shown in FIG. 10I, the first location for the head position indicator 1064 is collocated with the location at which the head vector intersects the toggle control 1074. As such, in some implementations, the head position indicator 1064 tracks the head vector as shown in FIGS. 101 and 10J.

According to some implementations, as represented by block 1110C, the first location for the head position indicator corresponds to a spatial offset relative to a point along the head vector. According to some implementations, as represented by block 1110D, the first location for the head position indicator corresponds to a point along the gaze vector. According to some implementations, as represented by block 1110E, the first location for the head position indicator corresponds to a spatial offset relative to a point along the gaze vector.

In some implementations, in accordance with the determination that the gaze vector satisfies the attention criterion associated with the UI element, the method 1100 also includes presenting, via the display device, an activation region associated with the selectable region of the UI element. For example, the activation region corresponds to a collider/hit area associated with the UI element (or a portion thereof). As such, in some implementations, the computing system presents the activation region in accordance with the determination that the gaze vector lingers on the UI element (or a volumetric region associated therewith) for at least the threshold time period.

As one example, in FIG. 10D, the electronic device 120 presents an activation region 1044 (e.g., the selectable region) associated with the affordance 1014 in accordance with a determination that the gaze direction of the user 150 has been directed to the affordance for at least the threshold dwell time 1007 as shown in FIGS. 10A-10C. As another example, in FIG. 10N, the electronic device 120 presents an optional visualization for an activation region 1044 surrounding the selectable region 1076 to indicate its selectable nature as well as a size of its collider/hit region in accordance with a determination that the gaze direction of the user 150 has been directed to the toggle control 10102 for at least the threshold dwell time 1007 as shown in FIGS. 10L and 10M. As another example, FIG. 10G includes an optional visualization for an activation region 1044 surrounding the selectable region 1076 to indicate its selectable nature as well as a size of its collider/hit region.

As represented by block 1112, after presenting the head position indicator at the first location, the method 1100 includes detecting, via the one or more input devices, a change to one or more values of the head vector. For example, the change to one or more values of the head vector corresponds to displacement in x, y, and/or z positional values and/or in pitch, roll, and/or yaw rotational values. As one example, the computing system detects a change to one or more values of the head vector between FIGS. 10D and 10E (e.g., left-to-right head rotation). As another example, the computing system detects a change to one or more values of the head vector between FIGS. 101 and 10J (e.g., left-to-right head rotation).

As represented by block 1114, the method 1100 includes updating presentation of the head position indicator from the first location to a second location within the UI based on the change to the one or more values of the head vector. In some implementations, while the head vector intersects with the UI element, the head position indicator tracks the location of the head vector. In some implementations, the head position indicator is offset is one or more spatial dimensions relative to the head vector, and the head position indicator moves at the head vector changes while preserving the offset.

As one example, with reference to FIG. 10E, the electronic device 120 presents the head position indicator 1042 at a second location associated with the activation region 1044 (e.g., the selectable region) of the affordance 1014 based on a change to one or more values of the head vector (e.g., displacement in x, y, and/or z positional values and/or displacement in roll, pitch, and/or yaw rotational values relative to the first location in FIG. 10D). As another example, with reference to FIG. 10J, the electronic device 120 presents the head position indicator 1064 at a second location within the activation region 1044 of the toggle control 1074 based on a change to one or more values of the head vector (e.g., displacement in x, y, and/or z positional values and/or displacement in roll, pitch, and/or yaw rotational values relative to the first location in FIG. 10I).

As represented by block 1116, the method 1100 includes determining whether the second location for the head position indicator coincides with the selectable region of the UI element. As one example, in FIGS. 10D-10F, the activation region 1044 corresponds to the selectable region. As another example, in FIGS. 10I-10K, the activation region 1044 is associated with (e.g., surrounds) to the selectable region 1076. In some implementations, the second location for the head position indicator coincides with the selectable region of the UI element in accordance with a determination that at least a portion of the head position indicator breaches the selectable region of the UI element. In some implementations, the second location for the head position indicator coincides with the selectable region of the UI element in accordance with a determination that the head position indicator is fully within the selectable region of the UI element.

If the second location for the head position indicator coincides with the selectable region of the UI element ("Yes" branch from block 1116), the method 1100 continues to block 1118. If the second location for the head position indicator does not coincide with the selectable region of the UI element ("No" branch from block 1116), the method 1100 continues to block 1108 and updates the head vector for a next frame, instance, iteration, time period, cycle, or the like. As such, in some implementations, in accordance with a determination that the second location for the head position indicator does not coincide with the selectable region of the UI element, the method 1100 includes foregoing performance of the operation associated with the UI element.

As represented by block 1118, in accordance with a determination that the second location for the head position indicator coincides with the selectable region of the UI element, the method 1100 includes performing an operation associated with the UI element (or a portion thereof). As one example, the operation corresponds to one of toggling on/off a setting if the selectable region corresponds to a radio button, displaying XR content within the XR environment (e.g., the VA customization menu 1062 in FIG. 10F) if the selectable region corresponds to an affirmative presentation affordance, or the like. As one example, with reference to FIG. 10K, the electronic device 120 performs the operation associated with the selectable region 1076 of the toggle control 1074 (e.g., toggling the radio button from the "off" state to the "on" state) in accordance with a determination that the second location for the head position indicator 1064 coincides with the selectable region 1076 of the toggle control 1074 in FIG. 10J.

In some implementations, the operation associated with the UI element (or the portion thereof) is performed in accordance with the determination that the second location for the head position indicator coincides with the selectable region of the UI element and in accordance with a determination that the change to the one or more values of the head vector corresponds to a movement pattern. As one example, the movement pattern corresponds to a predefined pattern such as a substantially diagonal movement, a substantially z-like movement, a substantially v-like movement, a substantially upside-down v-like movement, or the like. As another example, the movement pattern corresponds to a non-deterministic movement pattern that is dynamically determined based on user preferences, usage information, head pose confidence, and/or the like.

In some implementations, the method 1100 includes: in accordance with a determination that a magnitude of the change to the one or more values of the head vector satisfies a displacement criterion, performing the operation associated with the UI element; and in accordance with a determination that the magnitude of the change to the one or more values of the head vector does not satisfy the displacement criterion, foregoing performance of the operation associated with the UI element. In some implementations, the displacement criterion corresponds to a predefined or non-deterministic amount of horizontal head movement. In some implementations, the displacement criterion corresponds to a predefined or non-deterministic amount of vertical head movement. In some implementations, the displacement criterion corresponds to a predefined or non-deterministic amount of diagonal (e.g., vertical and horizontal) head movement. In some implementations, the displacement criterion corresponds to a predefined pattern of head movement.

FIGS. 10L-10Q illustrate a sequence of instances associated with activating the selectable region 1076 of the toggle control 10102 (e.g., an interactive UI element with a persistent state such as a radio button) with a head position indicator 10146 constrained to a bounding box 10128. With reference to FIG. 10Q, for example, the electronic device 120 performs the operation associated with the toggle control 10102 (e.g., toggling the radio button from the "off" state to the "on" state) in accordance with a determination that the head displacement value 10142C in FIG. 10P (e.g., a magnitude of the change to the yaw value of the head vector over FIGS. 10N-10P) is above the threshold head displacement 10147 (e.g., the displacement criterion).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a computing system including non-transitory memory and one or more processors, wherein the computing system is communicatively coupled to a display device and one or more input devices:

displaying, via the display device, a first user interface element associated with performance of an operation upon selection;

determining a gaze direction based on first input data from the one or more input devices;

in response to determining that the gaze direction is directed to the first user interface element, displaying, via the display device, a focus indicator with a first appearance in association with the first user interface element;

detecting, via the one or more input devices while the gaze direction is maintained at the first user interface element, a change in pose of at least one of a head pose or a body pose of a user of the computing system; and in response to detecting the change of pose while the gaze direction is maintained at the first user interface element, prior to registering a selection of the first user interface element and prior to performance of the operation associated with the first user interface element, modifying the focus indicator by changing the focus indicator from the first appearance indicative of a first magnitude of a displacement value associated with the change in pose to a second appearance different from the first appearance, the second appearance indicative of a second magnitude of the displacement value different from the first magnitude, and wherein maintaining the gaze direction at the first user interface element comprises determining that, during the change in pose, the gaze direction remains directed to the first user interface element without traversing away from the first user interface element toward another user interface element.

2. The method of claim 1, wherein the first appearance corresponds to a first position for the focus indicator and the second appearance corresponds to a second position for the focus indicator different from the first position.

3. The method of claim 1, wherein the first appearance corresponds to a first size for the focus indicator and the second appearance corresponds to a second size for the focus indicator different from the first size.

4. The method of claim 1, wherein modifying the focus indicator includes moving the focus indicator based on a magnitude of the change in the pose.

5. The method of claim 4, wherein the movement of the focus indicator is proportional to a magnitude of the change in the pose.

6. The method of claim 4, wherein the movement of the focus indicator is not proportional to the magnitude of the change in the pose.

7. The method of claim 1, wherein the focus indicator corresponds to an additional user interface element, and wherein the additional user interface element is at least one of surrounding the first user interface element, adjacent to the first user interface element, or overlaid on the first user interface element.

8. The method of claim 1, further comprising:

prior to detecting the change in pose, determining a first pose characterization vector based on second input data from the one or more input devices, wherein the first pose characterization vector corresponds to one of an initial head pose or an initial body pose of the user of the computing system; and after detecting the change in pose, determining a second pose characterization vector based on the second input data from the one or more input devices, wherein the second pose characterization vector corresponds to one of a subsequent head pose or a subsequent body pose of the user of the computing system.

9. The method of claim 8, further comprising:

determining a displacement value between the first and second pose characterization vectors; and in accordance with a determination that the displacement value satisfies a threshold displacement metric, performing an operation associated with the first user interface element.

10. The method of claim 1, further comprising:

determining a change of the gaze direction based on first input data from the one or more input devices; and in response to determining that the gaze direction is not directed to the first user interface element due to the change of the gaze direction, ceasing display of the focus indicator in association with the first user interface element.

11. The method of claim 1, further comprising:

displaying, via the display device, a gaze indicator associated with the gaze direction.

12. The method of claim 1, wherein the display device includes a transparent lens assembly, and wherein the first user interface element is projected onto the transparent lens assembly.

13. The method of claim 1, wherein the display device includes a near-eye system, and wherein presenting the first user interface element includes compositing the first user interface element with one or more images of a physical environment captured by an exterior-facing image sensor.

14. The method of claim 1, wherein the first user interface element is displayed within an extended reality (XR) environment.

15. The method of claim 14, wherein the XR environment includes the first user interface element and at least one other user interface element.

16. The method of claim 14, wherein the XR environment includes XR content, and wherein the first user interface element is associated with performing a first operation on the XR content.

17. A device comprising:

one or more processors;

a non-transitory memory;

an interface for communicating with a display device and one or more input devices; and one or more programs stored in the non-transitory memory, which, when executed by the one or more processors, cause the device to:

display, via the display device, a first user interface element associated with performance of an operation upon selection;

determine a gaze direction based on first input data from the one or more input devices;

in response to determining that the gaze direction is directed to the first user interface element, display, via the display device, a focus indicator with a first appearance in association with the first user interface element;

detect, via the one or more input devices while the gaze direction is maintained at the first user interface element, a change in pose of at least one of a head pose or a body pose of a user of the device; and in response to detecting the change of pose while the gaze direction is maintained at the first user interface element, prior to registering a selection of the first user interface element and prior to performance of the operation associated with the first user interface element, modify the focus indicator by changing the focus indicator from the first appearance indicative of a first magnitude of a displacement value associated with the change in pose to a second appearance different from the first appearance, the second appearance indicative of a second magnitude of the displacement value different from the first magnitude, and wherein maintaining the gaze direction at the first user interface element comprises determining that, during the change in pose, the gaze direction remains directed to the first user interface element without traversing away from the first user interface element toward another user interface element.

18. The device of claim 17, wherein the first appearance corresponds to a first position for the focus indicator and the second appearance corresponds to a second position for the focus indicator different from the first position.

19. The device of claim 17, wherein the first appearance corresponds to a first size for the focus indicator and the second appearance corresponds to a second size for the focus indicator different from the first size.

20. A non-transitory memory storing one or more programs, which, when executed by one or more processors of a device with an interface for communicating with a display device and one or more input devices, cause the device to:

display, via the display device, a first user interface element associated with performance of an operation upon selection;

determine a gaze direction based on first input data from the one or more input devices;

in response to determining that the gaze direction is directed to the first user interface element, display, via the display device, a focus indicator with a first appearance in association with the first user interface element;

detect, via the one or more input devices while the gaze direction is maintained at the first user interface element, a change in pose of at least one of a head pose or a body pose of a user of the device; and in response to detecting the change of pose while the gaze direction is maintained at the first user interface element, prior to registering a selection of the first user interface element and prior to performance of the operation associated with the first user interface element, modify the focus indicator by changing the focus indicator from the first appearance indicative of a first magnitude of a displacement value associated with the change in pose to a second appearance different from the first appearance, the second appearance indicative of a second magnitude of the displacement value different from the first magnitude, and wherein maintaining the gaze direction at the first user interface element comprises determining that, during the change in pose, the gaze direction remains directed to the first user interface element without traversing away from the first user interface element toward another user interface element.

21. The non-transitory memory of claim 20, wherein the first appearance corresponds to a first position for the focus indicator and the second appearance corresponds to a second position for the focus indicator different from the first position.

22. The non-transitory memory of claim 20, wherein the first appearance corresponds to a first size for the focus indicator and the second appearance corresponds to a second size for the focus indicator different from the first size.

23. The method of claim 1, wherein the focus indicator comprises a slide bar surrounding the first user interface element that changes position based on the displacement value.

24. The device of claim 17, wherein the focus indicator comprises a slide bar surrounding the first user interface element that changes position based on the displacement value.

25. The non-transitory memory of claim 20, wherein the focus indicator comprises a slide bar surrounding the first user interface element that changes position based on the displacement value.

* * * * *